United States Patent
Aston et al.

(10) Patent No.: US 10,198,193 B2
(45) Date of Patent: Feb. 5, 2019

(54) COMPUTER PROGRAM PRODUCT, METHOD, APPARATUS AND DATA STORAGE SYSTEM FOR CONTROLLING WRITE OPERATIONS IN THE DATA STORAGE SYSTEM

(71) Applicant: HITACHI DATA SYSTEMS ENGINEERING UK LIMITED, Bracknell, Berkshire (GB)

(72) Inventors: Christopher James Aston, Worcester (GB); Trevor Edward Willis, High Wycombe (GB)

(73) Assignee: Hitachi Data Systems Engineering UK Limited, Bracknell, Berkshire (GB)

( * ) Notice: Subject to any disclaimer, the term of this patent is extended or adjusted under 35 U.S.C. 154(b) by 117 days.

(21) Appl. No.: 15/124,843

(22) PCT Filed: Mar. 11, 2014

(86) PCT No.: PCT/EP2014/054709
§ 371 (c)(1),
(2) Date: Sep. 9, 2016

(87) PCT Pub. No.: WO2015/135574
PCT Pub. Date: Sep. 17, 2015

(65) Prior Publication Data
US 2017/0017413 A1    Jan. 19, 2017

(51) Int. Cl.
*G06F 15/16* (2006.01)
*G06F 3/06* (2006.01)
*H04L 29/06* (2006.01)

(52) U.S. Cl.
CPC ............ *G06F 3/0613* (2013.01); *G06F 3/064* (2013.01); *G06F 3/067* (2013.01); *G06F 3/0638* (2013.01);

(Continued)

(58) Field of Classification Search
CPC ...... G06F 3/0613; G06F 3/0638; G06F 3/064; G06F 3/0643; G06F 3/0659; G06F 3/067; H04L 67/42

(Continued)

(56) References Cited

U.S. PATENT DOCUMENTS 6,978,283 B1    12/2005    Edwards et al.
7,457,822 B1 *  11/2008    Barrall ............... G06F 12/0246
8,495,111 B1    7/2013     Wang et al.

OTHER PUBLICATIONS

International Search Report of PCT/EP2014/054709 dated Nov. 26, 2014.

* cited by examiner

*Primary Examiner* — Kristie D Shingles
(74) *Attorney, Agent, or Firm* — Mattingly & Malur, PC

(57) ABSTRACT

The data storage system includes one or more storage apparatuses and a file system server connected to the one or more storage apparatuses and to one or more host computers. Write operations are controlled by providing a free space object which stores a plurality of indicators, each indicator being associated with one of a plurality of storage units for storing data units in the one or more storage apparatuses and each indicator indicating whether the associated storage unit is free or used, executing a read-ahead examination which comprises examining a set of indicators of the free space object for identifying one or more used storage units associated with indicators of the set, in particular for observing a fragmentation status of the storage units associated with the indicators of the set, and executing an allocation examination which comprises examining one or more indicators.

19 Claims, 39 Drawing Sheets

(52) U.S. Cl.
CPC .......... *G06F 3/0643* (2013.01); *G06F 3/0659* (2013.01); *H04L 67/42* (2013.01)

(58) Field of Classification Search
USPC ........................................................ 709/219
See application file for complete search history.

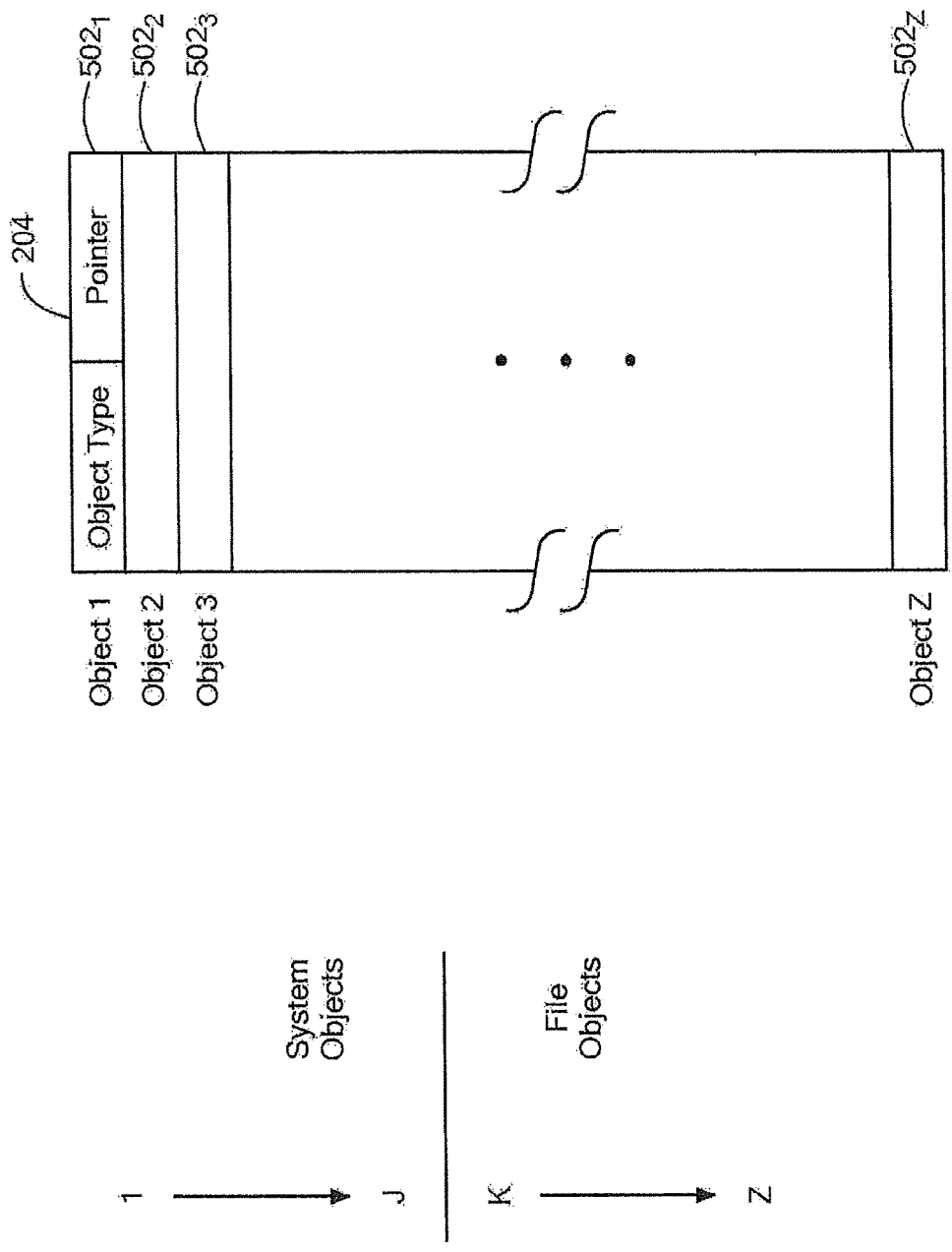

read-ahead distance maximum read-ahead distance read-ahead reset distance minimum read-ahead distance minimum read-ahead distance

Fig. 39A FSO_1
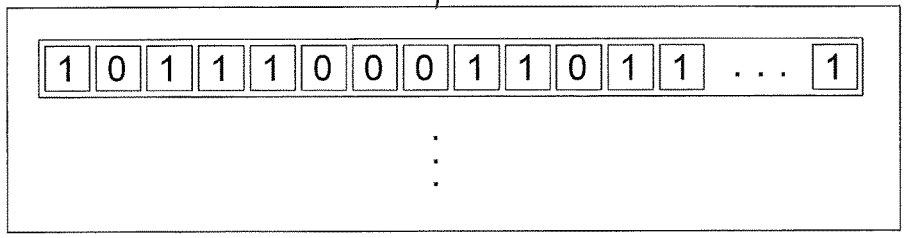
Fig. 39B FSO_2
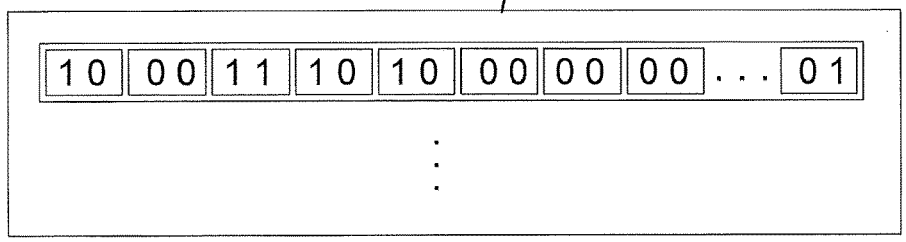
Fig. 39C FSO_3
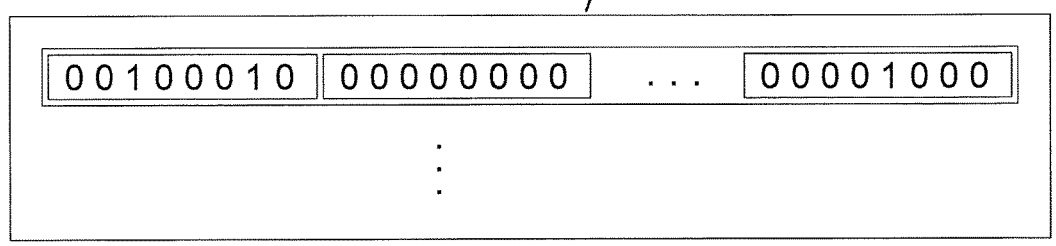
Fig. 39D FSO_4
| #SA | #SD | #block | Status |
|-----|-----|--------|--------|
| 001 | 001 | 0001 | used |
| 001 | 001 | 0002 | free |
| 001 | 001 | 0003 | used |
| 001 | 001 | 0004 | used |
| 001 | 001 | 0005 | used |
| | | ⋮ | |

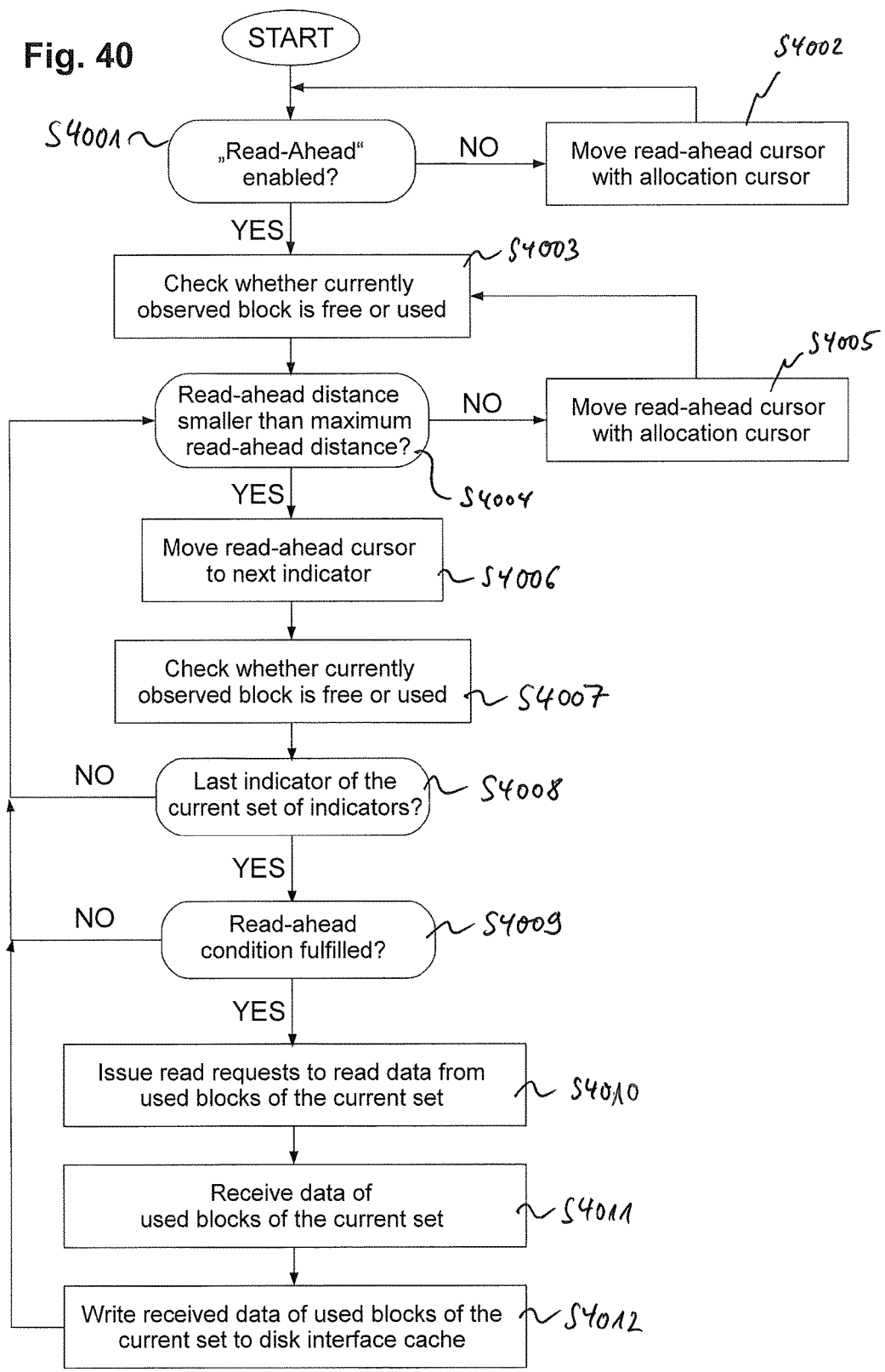

COMPUTER PROGRAM PRODUCT, METHOD, APPARATUS AND DATA STORAGE SYSTEM FOR CONTROLLING WRITE OPERATIONS IN THE DATA STORAGE SYSTEM

The present invention relates to performing write operations in a data storage system, and in particular to controlling write operations in a data storage system comprising one or more storage apparatuses and a file system server connected to the one or more storage apparatuses and to one or more host computers.

BACKGROUND

In today's information age, data storage systems often are configured to manage file systems that include huge amounts of storage space. It is common for file systems to include many terabytes of storage space spread over multiple storage devices. In a dynamic file system environment, blocks of storage space (storage blocks) often get used, freed, and re-used over time as files are created, modified and deleted. It is common for such file systems to include mechanisms for identifying, freeing, and re-using storage blocks that are no longer being used in the file system. Traditional storage block re-use schemes, which may search through the file system storage space sequentially in order to locate free storage blocks for re-use, and data writes to areas of fragmented used and re-used storage blocks may lead to situations in which write operation performance is reduced due to the necessity of small-sized fragmented writes to fragmented areas of storage.

In view of the above, it is an object of the invention to improve write operation performance and efficiency, and to improve write operation performance in particular to fragmented areas of storage space, in particular in storage systems that have different performance for small sized fragmented writes and larger sized writes contiguously to non-fragmented areas of storage space.

SUMMARY

According to an aspect of embodiments, a computer program product is proposed, the computer program product comprising computer-readable program instructions which, when running on or loaded into a file system server or computer connected to the file system server or when being executed by one or more processors or processing units of the file system server or the computer, cause the file system server to execute a method for controlling write operations in a data storage system comprising one or more storage apparatuses and the file system server connected to the one or more storage apparatuses and to one or more host computers.

The method may comprise: providing a free space object which stores a plurality of indicators, each indicator being associated with one of a plurality of storage units (units of storage such as storage blocks) for storing data units (units of data such as data blocks) in the one or more storage apparatuses and each indicator indicating whether the associated storage unit is free or used; executing a read-ahead examination which comprises examining a set of indicators of the free space object for identifying one or more used storage units associated with indicators of the set, in particular for observing a fragmentation status of the storage units associated with the indicators of the set; executing an allocation examination which comprises examining one or more indicators of the set of the free space map object for identifying one or more free storage units to be allocated upon receiving one or more write instructions from one of the one or more host computers at the file system server; and/or controlling one or more write operations to the one or more storage apparatuses on the basis of the read-ahead examination and/or the allocation examination.

It is to be noted that such computer program product may also represent software as well as firmware, program updates such as software updates and firmware updates, in particular for computers, file system servers or one or more programmable components of a computer or file system server, for example, representing or including potentially firmware for one or more FPGAs (or other programmable ICs) of a file system server or other computers.

The method may further comprise executing a read-ahead operation which comprises reading, from the one or more storage apparatuses, one or more data units stored in used storage units being associated with indicators of the set based on the read-ahead examination, and/or storing the read data units in a memory of the file system server.

In preferred aspects, controlling one or more write operations may comprises storing write data units to the memory of the file system server based on the one or more received write instructions; executing an allocation operation which comprises allocating, for each of the stored write data units, one of the one or more free storage units being associated with indicators of the set based on the allocation examination; and/or executing a combined flush write operation of contiguously writing to all storage units associated with indicators of the set including writing the write data units from the file system server to the thereto allocated free storage units and re-writing the read data units from the file system server to the thereto allocated used storage units.

In preferred aspects, executing the read-ahead examination may further comprise determining whether a read-ahead condition is fulfilled for the examined set of indicators, in particular based on the observed fragmentation status of the storage units associated with the indicators of the set, and, if the read-ahead condition is fulfilled for the examined set of indicators, the method may further comprise: executing a read-ahead condition which comprises reading, from the one or more storage apparatuses, one or more data units stored in used storage units being associated with indicators of the set based on the read-ahead examination; and/or storing the read data units to the memory of the file system server.

In preferred aspects, reading, from the one or more storage apparatuses, one or more data units stored in used storage units may comprise executing a combined read-ahead operation of contiguously reading data units of a plurality of storage units and/or concurrently issuing a plurality of read instructions (read requests) to the one or more storage apparatuses.

In preferred aspects, a number of data units being read in the combined read-ahead operation may be controlled based on at least one of a target read number parameter, a minimum read number parameter, and a maximum read number parameter.

In preferred aspects, a number of concurrently issued read instructions is controlled based on at least one of a target read request number parameter, a minimum read request number parameter, and a maximum read request number parameter.

In preferred aspects, controlling one or more write operations may comprise storing write data units to the memory of the file system server based on the one or more received write instructions; executing an allocation operation comprising allocating, for each of the stored write data units, one of the one or more free storage units being associated with indicators of the set based on the allocation examination; and/or executing, if a flush write condition is fulfilled for the examined set of indicators, a combined flush write operation of contiguously writing to all storage units associated with indicators of the set including writing the write data units from the file system server to the thereto allocated free storage units and re-writing the read data units from the file system server to the thereto allocated used storage units, or executing, if the flush write condition is not fulfilled for the examined set of indicators, a write operation of writing the write data units from the file system server to the thereto allocated free storage units. Preferably, controlling one or more write operations may comprise checking whether the flush write operation is fulfilled, wherein the flush write operation is preferably fulfilled if all data units associated with storage units being associated with indicators of the examined set are stored in the memory of the file system server.

In preferred aspects, if the flush write condition is not fulfilled for the examined set of indicators and all indicators of the set indicate a free storage unit, the write operation may be a combined flush write operation of contiguously writing to all storage units associated with indicators of the set.

In preferred aspects, the read-ahead condition for the examined set of indicators may comprise at least one of the number of indicators of the set indicating a free storage unit is equal to or larger than a first threshold the first threshold being one or more; the number of indicators of the set indicating a used storage unit is equal to or larger than a second threshold, the second threshold being one or more; the set of indicators comprises a chain of successive indicators indicating free storage units having a length being equal to or larger than a third threshold, the third threshold being two or more; and the set of indicators comprises a chain of successive indicators indicating used storage units having a length being equal to or larger than a fourth threshold, the fourth threshold being two or more.

In preferred aspects, the free space object may comprise at least one of: a free space table, each row or column of the free space table represents one of the indicators; and a free space bitmap, each indicator being represented by one bit or each indicator being represented by a set of two or more bits.

In preferred aspects, the method may comprise providing an allocation cursor indicating a position of the allocation examination in the free space object; providing a read-ahead cursor indicating a position of the read-ahead examination in the free space object; and controlling the read-ahead cursor so as to be positioned ahead of the allocation cursor in the free space object.

In preferred aspects, controlling the read-ahead cursor to be positioned ahead of the allocation cursor may comprise: controlling a distance between the read-ahead cursor and the allocation cursor in the free space object based on a target distance parameter; controlling a distance between the read-ahead cursor and the allocation cursor in the free space object based on a minimum distance parameter, and/or controlling a distance between the read-ahead cursor and the allocation cursor in the free space object based on a maximum distance parameter.

In preferred aspects, the method may further comprise setting the target distance parameter, the minimum distance parameter and/or the maximum distance parameter on the basis of at least one of a total storage capacity of the memory, a total amount of available storage space of the memory and a filling ratio of the memory, In preferred aspects, controlling the read-ahead cursor to be positioned ahead of the allocation cursor may comprise: detecting whether the read-ahead cursor is positioned ahead of the allocation cursor; and/or resetting, if it is determined that the read-ahead cursor is not positioned ahead of the allocation cursor, the position of the read-ahead cursor to the position of the allocation cursor or to a position ahead of the allocation cursor.

In preferred aspects, the method may further comprise enabling the execution of the read-ahead examination and/or disabling the execution of the read-ahead examination, and, when execution of the read-ahead examination is disabled, the read-ahead cursor is moved through the free space object together with the movement of the allocation cursor.

In preferred aspects, the method may further comprise: setting a size of the set of indicators.

According to another aspect, there may be provided a method for controlling write operations in a data storage system comprising one or more storage apparatuses and a file system server connected to the one or more storage apparatuses and to one or more host computers, the method comprising: providing a free space object which stores a plurality of indicators, each indicator being associated with one of a plurality of storage units for storing data units in the one or more storage apparatuses and each indicator indicating whether the associated storage unit is free or used; executing a read-ahead examination which comprises examining a set of indicators of the free space object for identifying one or more used storage units associated with indicators of the set, in particular for observing a fragmentation status of the storage units associated with the indicators of the set; executing an allocation examination which comprises examining one or more indicators of the set of the free space map object for identifying one or more free storage units to be allocated upon receiving one or more write instructions from one of the one or more host computers at the file system server; and/or controlling one or more write operations to the one or more storage apparatuses on the basis of the read-ahead examination and the allocation examination.

According to another aspect, there may be provided an apparatus, in particular a file system server, being connectable to one or more storage apparatuses and to one or more host computers, the apparatus being adapted for use in a data storage system comprising the one or more storage apparatuses and the apparatus connected to the one or more storage apparatuses and to the one or more host computers, the apparatus may comprise: a memory storing a free space object which stores a plurality of indicators, each indicator being associated with one of a plurality of storage units for storing data units in the one or more storage apparatuses and each indicator indicating whether the associated storage unit is free or used; and/or a controller adapted to control one or more write operations to the one or more storage apparatuses; wherein the controller may be adapted to execute a read-ahead examination which comprises examining a set of indicators of the free space object for identifying one or more used storage units associated with indicators of the set, in particular for observing a fragmentation status of the storage units associated with the indicators of the set; and executing an allocation examination which comprises examining one or more indicators of the set of the free space map object for identifying one or more free storage units to be allocated upon receiving one or more write instructions from one of the one or more host computers at the file system server, so as to preferably control the one or more write operations to the one or more storage apparatuses on the basis of the read-ahead examination and the allocation examination.

According to another aspect, there may be provided a data storage system comprising one or more storage apparatuses, and an apparatus as described above being connected to the one or more storage apparatuses and being connectable to one or more host computers.

BRIEF DESCRIPTION OF DRAWINGS

FIG. 15 shows an exemplary representation of object number assignments for an exemplary embodiment of the present invention;

FIG. 16 is an exemplary schematic block diagram showing the general format of the indirection object in accordance with an exemplary embodiment of the present invention;

FIGS. 39A to 39D show examples of free space objects according to exemplary embodiments of the invention;

FIG. 40 exemplarily shows a flow chart of a process of performing a read-ahead examination and a read-ahead operation according to exemplary embodiments of the invention.

DETAILED DESCRIPTION OF DRAWINGS AND OF PREFERRED EMBODIMENTS

Figure 1:
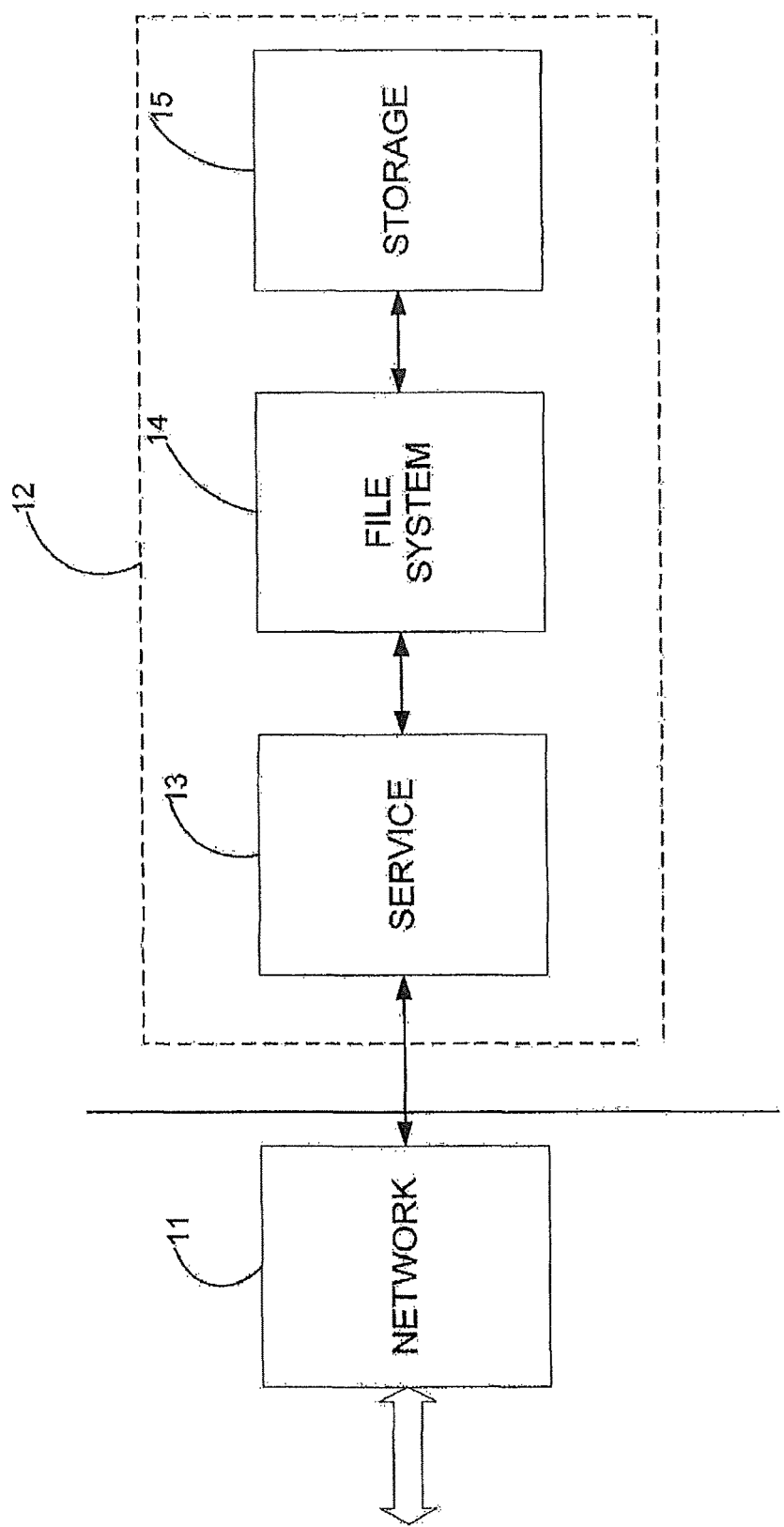
FIG. 1 is an exemplary logical block diagram of an embodiment of a file server to which various aspects of the present invention are applicable.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "range" is composed of either a primary SD on its own or a primary/secondary SD pair that are supposed to contain identical data and therefore offer the same storage capacity as a single SD.

A "stripeset" is composed of one or more ranges.

A "span" is composed of one or more stripesets. Thus, a span is ultimately composed of one or more SDs (typically four to fifty SDs). A span can be divided into one or more file systems, with each file system having a separate name and identifier and potentially different characteristics (e.g., one file system may be formatted with 32 KB blocks and another with 4 KB blocks, one file system may be Worm and another not, etc.). Each file system on the span is formatted, mounted, and unmounted separately. File systems may be created and deleted in any order and at any time. File systems typically can be configured to expand automatically (or alternatively to prevent or restrict auto-expansion) or can be expanded manually.

A "block" or "storage block" is a unit of storage in the file system that corresponds to portion of physical storage in which user data and/or system data is stored. A file system object (discussed below) generally includes one or more blocks. A "data block" is a unit of data (user data or metadata) to be written to one storage block.

FIG. 1 is a logical block diagram of an embodiment of a file server to which various aspects of the present invention are applicable. A file server of this type is described in U.S. Pat. No. 7,457,822, entitled "Apparatus and Method for Hardware-based File System" which is incorporated herein by reference and PCT application publication number WO 01/28179 A2, published Apr. 19, 2001, entitled "Apparatus and Method for Hardware Implementation or Acceleration of Operating System Functions" which is incorporated herein by reference. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. Further, each of the various modules may be hardware implemented or hardware accelerated.

Figure 2:
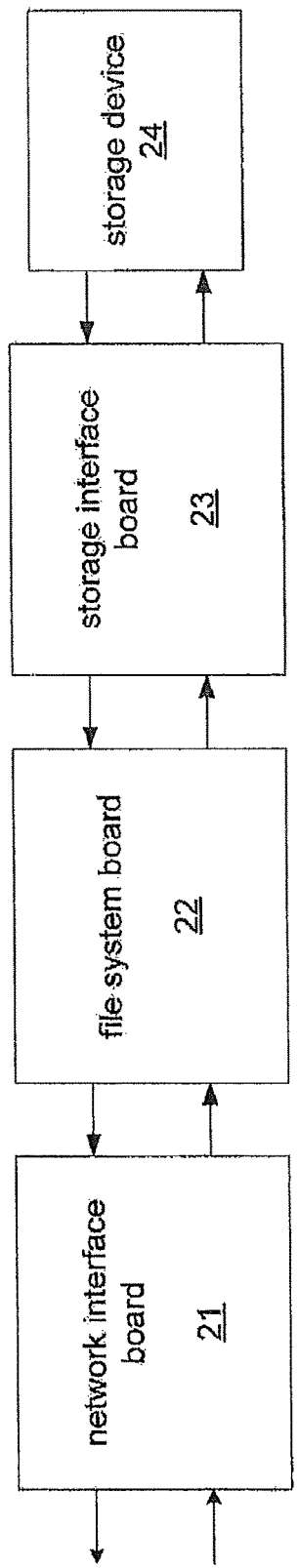
FIG. 2 is an exemplary logical block diagram of an implementation of the embodiment of FIG. 1.

FIG. 2 is a logical block diagram of an implementation of the embodiment of FIG. 1. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is incorporated herein by reference. However, in an alternative implementation, the service module 13, file system module 14, and storage module 15 of FIG. 1 can be implemented integrally on a singular board such as a board having a single field programmable array chip (FPGA). In yet another alternative implementation, the network interface board 21 can be configured on a first board which is separate from the file system board 22 and storage interface board 23 which are configured together on a second board. It should be noted that the present invention is in no way limited to these specific board configurations or any particular number of boards.

Figure 3:
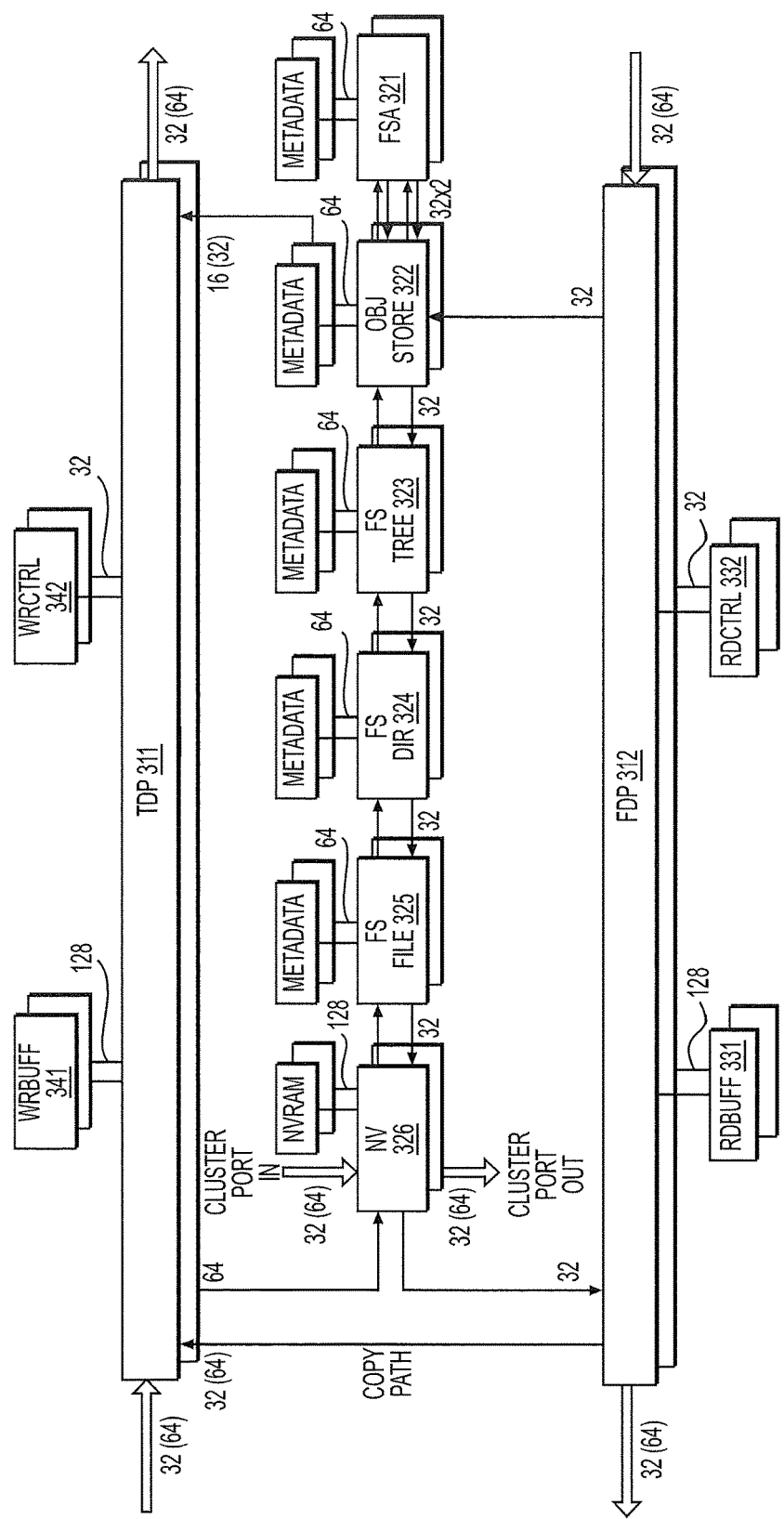
FIG. 3 is an exemplary block diagram of a file system module in accordance with an embodiment of the present invention.

FIG. 3 is a block diagram of an embodiment of a file system module in accordance with the present invention. The file system module embodiment may be used in systems of the type described in FIGS. 1 and 2. Exemplary bus widths for various interfaces are shown, although it should be noted that the present invention is in no way limited to these bus widths or to any particular bus so widths.

The data flow in this embodiment is shown by upper bus 311, which is labeled TDP, for To Disk Protocol, and by lower bus 312, which is labeled FDP, for From Disk Protocol, such Protocols referring generally to communication with the storage module 15 of FIG. 1 as may be implemented, for example, by storage interface board 23 of FIG. 2. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

Figure 4:
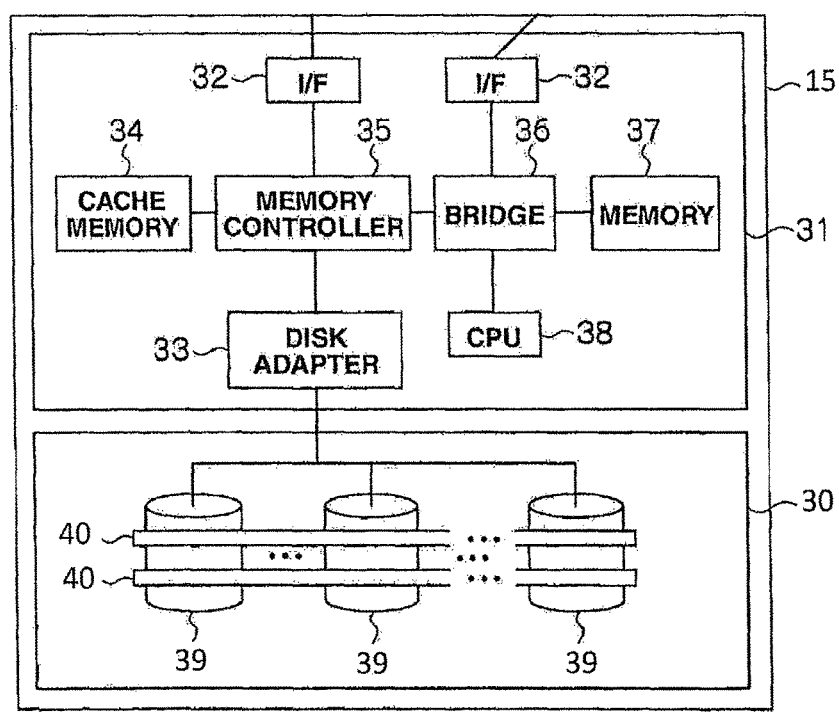
FIG. 4 is an exemplary physical block diagram showing the configuration of a storage system according to an embodiment of the present invention.

FIG. 4 shows a detailed physical block diagram of a storage module 15 according to an exemplary embodiment of the present invention. The storage module 15 is configured by a storage part 30 configured from a plurality of hard disk drives 39, and a control unit 31 for controlling the hard disk drives (otherwise referred to as a disk) 39 of the storage part 30.

The hard disk drive 39, for instance, is configured from an expensive disk drive such as an FC (Fibre Channel) disk, or an inexpensive disk such as a SATA (Serial AT Attachment) disk drive or an optical disk drive or the like. One or more logical volumes are defined in the storage areas (hereinafter referred to as "RAID groups") 40 provided by one or more of the hard disk drives 39. Data from the host system 2 is accessed (read from and written into) the logical volumes 26 in block units of a prescribed size.

A unique identifier (Logical Unit Number: LUN) is allocated to each logical volume 26. In the case of this embodiment, the input and output of data are performed by setting the combination of the foregoing identifier and a unique number (LBA: Logical Block Address) that is allocated to the respective logical blocks as the address, and designating this address.

The control unit 31 comprises a plurality of interfaces (I/F) 32, a disk adapter 33, a cache memory 34, a memory controller 35, a bridge 36, a memory 37, and a CPU 38.

The interface 32 is an external interface used for sending and receiving write data, read data and various commands to and from the storage system 15. The disk adapter 33 is an interface to the storage part 21, and, for example, is used for sending and receiving write data, read data or various commands to and from the storage part 30 according to a fibre channel protocol.

The cache memory 34, for instance, is configured from a nonvolatile semiconductor memory, and is used for temporarily storing commands and data to be read from and written into the storage part 30. The memory controller 35 controls the data transfer between the cache memory 34 and the memory 37, and the data transfer between the cache memory 34 and the disk adapter 33. The bridge 36 is used for sending and receiving read commands and write commands and performing filing processing and the like between the memory controller 36 and the CPU 38, or between the memory controller 36 and the memory 37.

In addition to being used for retaining various control programs and various types of control information, the memory 37 is also used as a work memory of the CPU 38. The CPU 38 is a processor for controlling the input and output of data to and from the storage part 30 in response to the read command or write command, and controls the interface 34, the disk adapter 33, the memory controller 35 and the like based on various control programs and various types of control information stored in the memory 37.

Returning to FIG. 3, a series of separate sub-modules of the file system module handle the tasks associated with file system management. Each of these sub-modules typically has its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit map.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files. File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name, this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

The Non-Volatile Storage Processing sub-module 326 interfaces with associated non-volatile storage (called NVRAM in FIG. 4) to provide a method for recovery in the event of power interruption or other event that prevents cached data—which is slated for being saved to disk—from actually being saved to disk. In particular, since, at the last checkpoint, a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

When file server systems are clustered, non-volatile storage may be mirrored using a switch to achieve a virtual loop.

Figure 7:
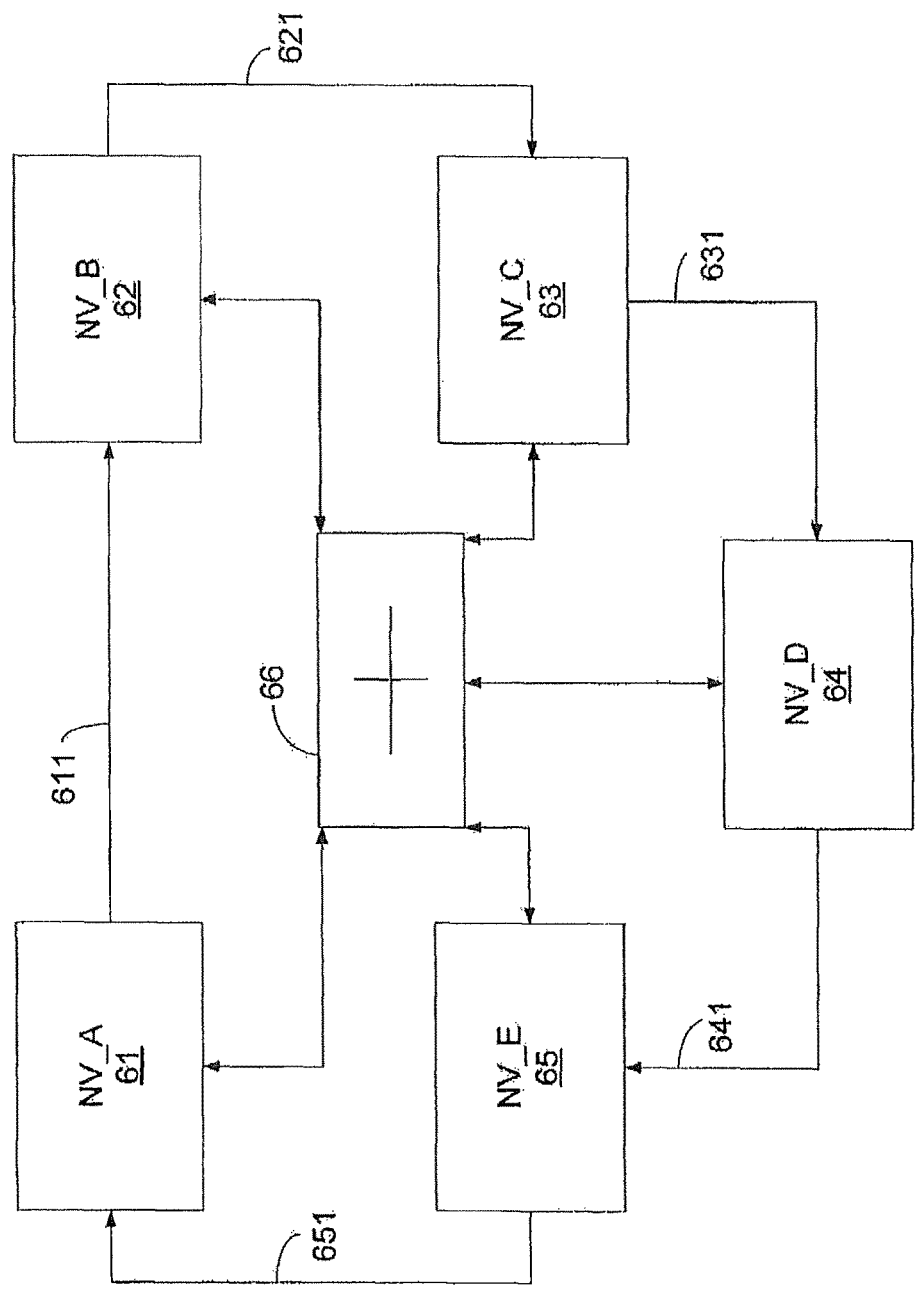
FIG. 7 is an exemplary block diagram of a clustered file server arrangement in accordance with an embodiment of the present invention wherein non-volatile memory is mirrored in a virtual loop configuration.

FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

Figure 5:
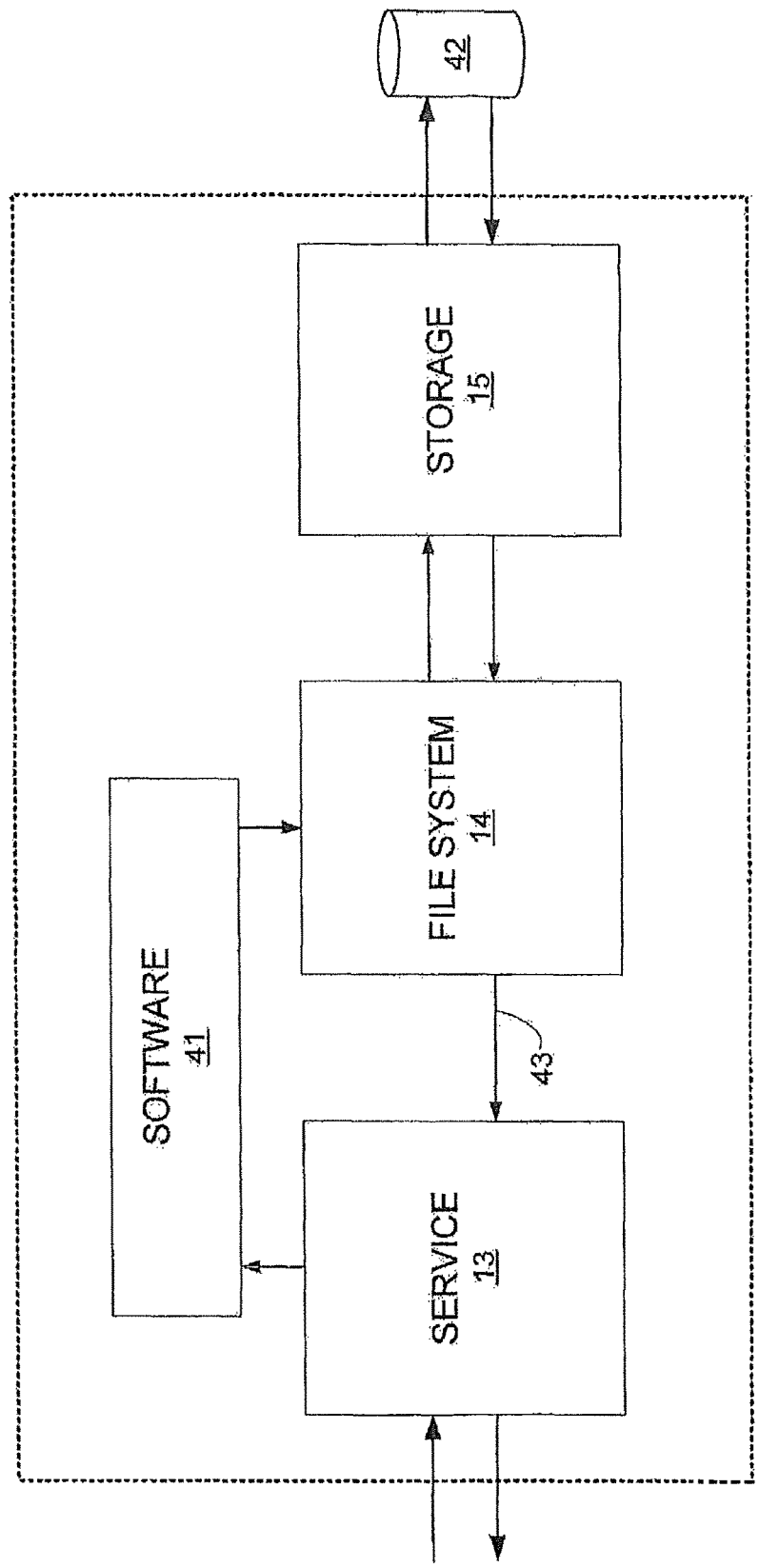
FIG. 5 is an exemplary block diagram showing how control flow may be used in embodiments of the present invention to permit automatic response by the file service module to a network request without intervention of software control.

FIG. 5 is a block diagram showing how control flow may be used in embodiments of the present invention to permit automatic response by the file service module to a network request without prior intervention of software control. In FIG. 5, there is shown service module 13, file system module 14, and storage module 15, as in FIG. 2, with service module 13 and file system module 14 under the control of software 41 and with storage module 15 in communication with storage arrangement 42. The connections between blocks represent control flows rather than data flows. On identification of a file service request by service module 13, the request is typically passed from the service module 13 to software control 41, for example, to handle security and other complex tasks. Then under software control 41, the request is processed by the file system module 14. On the other hand, the response to a file system request, which is not necessarily as complex, is routed from the file system module 14 directly back to the service module 13 over control flow 43 rather than being routed back through software control 41. The software control 41 is eventually informed that the request has been satisfied.

Figure 6:
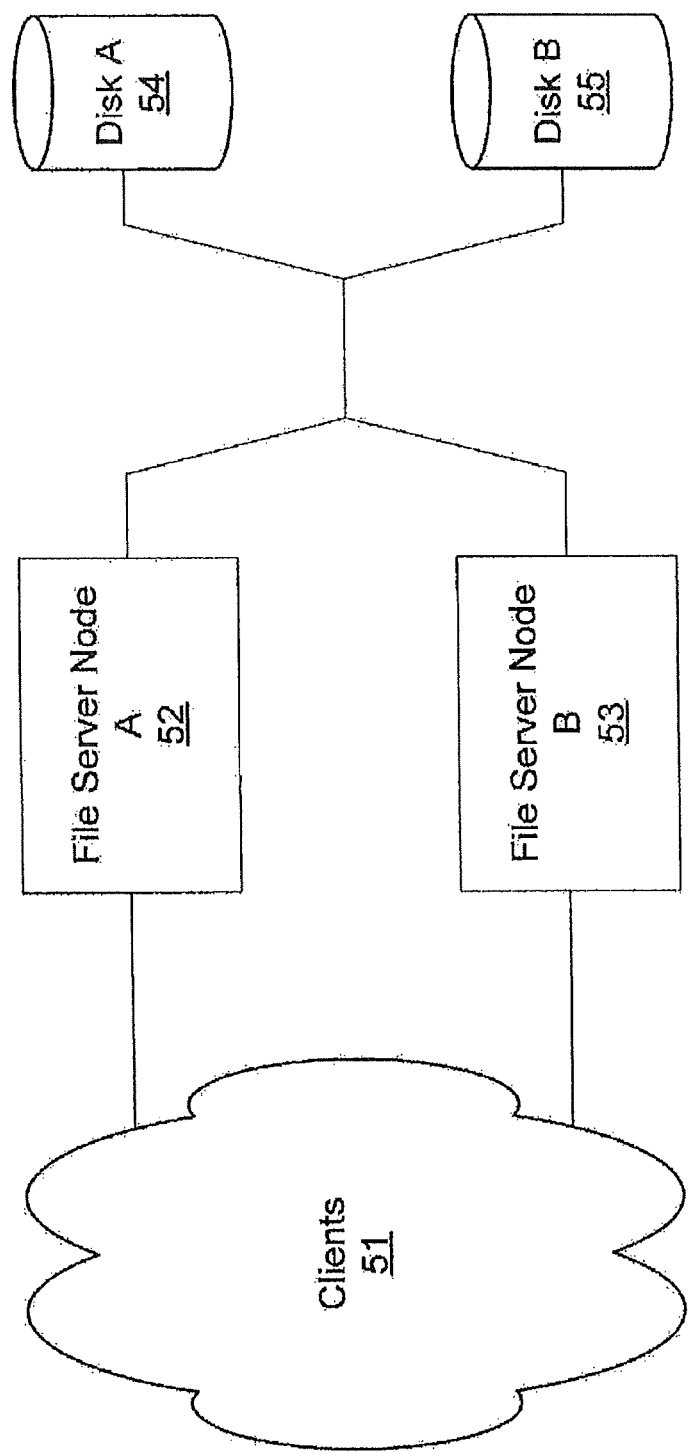
FIG. 6 is an exemplary block diagram of a clustered file server arrangement embodying sector cache locking in accordance with an embodiment of the present invention.

In a cluster of file server nodes accessing common storage, it is necessary to deal with instances wherein multiple nodes may seek to perform conflicting tasks with respect to a common storage location. FIG. 6 is a block diagram of a clustered file server arrangement having sector cache locking in accordance with one exemplary embodiment of the present invention. In this embodiment, file server node A (item 52) and file server node B (item 53), are both in communication with clients 51 and are configured so that each server node may access (that is, read from and write to) both disk A (item 54) and disk B (item 55). Disks A and B are arbitrary storage designators, and are not limited to single disks and also include the use of several disks, or a particular region on a single disk drive, and the mode of storage is any device suitable for, including but not limited to, magnetic and magneto-optical.

When file server systems are clustered, non-volatile storage may be mirrored using a switch to achieve a virtual loop. FIG. 7 is a block diagram of a clustered file server arrangement in accordance with an embodiment of the present invention wherein non-volatile memory is mirrored in a virtual loop configuration. In this figure, it is assumed that five file server nodes are clustered (although this technique works with any number of server nodes, and each server node has associated a file system module, and each file system module has a Non-Volatile Storage Processing sub-module 326, designated NV_A (item 61), NV_B (item 62), NV_C (item 63), NV_D (item 64), and NV_E (item 65). The Non-Volatile Storage Processing sub-modules 326 interface with associated non-volatile storage (called NVRAM in FIG. 4) to provide a method for recovery in the event of power interruption or other event that prevents cached data—which is slated for being saved to disk—from actually being saved to disk. Each of these sub-modules is coupled via the switch 66 to a different one of the sub-modules, to permit the coupled sub-module's associated NVRAM to retain a backup copy of the original file system request data stored in NVRAM associated with the corresponding sub-module. Couplings achieved by the switch 66 are shown in dashed lines, so that backup path 611 permits file system request data in NVRAM associated with sub-module NV_A to be backed up by NVRAM associated with sub-module NV_B. Similarly, backup path 621 permits file system request data in NVRAM associated with sub-module NV_B to be backed up by NVRAM associated with sub-module NV_C, and so on, until the last part of the loop is reached, wherein backup path 651 permits file system request data in NVRAM associated with sub-module NV_E to be backed up by NVRAM associated with sub-module NV_A. If a server node becomes non-operational, then the switch can reconfigure the loop among remaining nodes that are operational.

As described herein, a consistent file system image (termed a checkpoint) is stored on disk at regular intervals, and all filesystem changes that have been requested by the processor but have not yet been stored on disk in a checkpoint are stored in NVRAM by the Non-Volatile Storage Processing sub-module. In order to prevent overflow of NVRAM, a checkpoint is forced to occur, for example, whenever the amount of data in NVRAM has reached a pre-determined threshold. A checkpoint is only valid until the next checkpoint has been created, at which point the earlier checkpoint is no longer considered current.

Exemplary Filesystem

Figure 8:
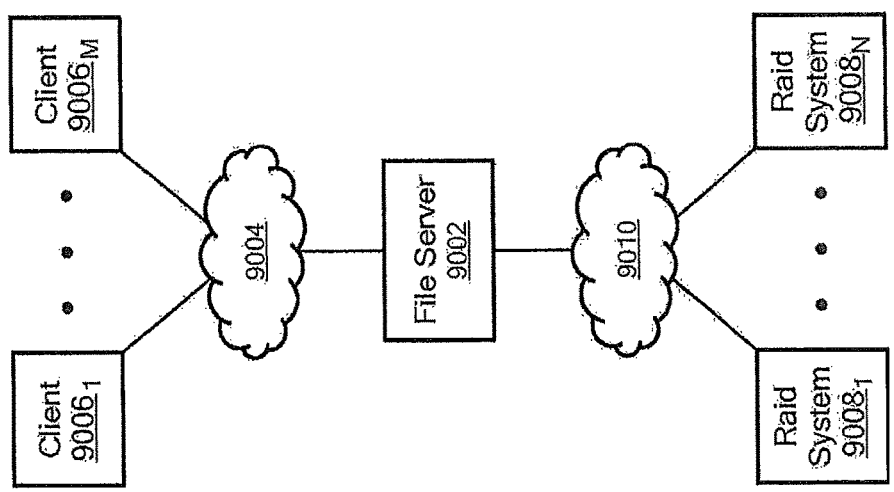
FIG. 8 is an exemplary schematic block diagram of a file storage system in accordance with an exemplary embodiment of the present invention.

FIG. 8 is a schematic block diagram of a file storage system in accordance with an exemplary embodiment of the present invention. The file storage system in FIG. 8 is also described in WO 2012/071335 and U.S. application Ser. No. 13/301,241 entitled "File Cloning and De-Cloning in a Data Storage System", which was filed on Nov. 21, 2011, and are incorporated herein by reference.

Among other things, the file storage system includes a number of file servers (a single file server 9002 is shown for the sake of simplicity and convenience) in communication with various client devices 90061-9006M over a communication network 9004 such as an Internet Protocol network (e.g., the Internet) and also in communication with various RAID systems 90081-9008N over a storage network 9010 such as a FibreChannel network. The client devices 90061-9006M and the file server 9002 communicate using one or more network file protocols, such as CIFS and/or NFS. The file server 9002 and the RAID systems 90081-9008N communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more).

Filesystem Tree Structure

The file server 9002 stores various types of objects in the filesystem. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the filesystem is managed using a tree structure having root node (referred to as a dynamic superblock or DSB) that is preferably stored at a fixed location within the storage system. Among other things, storing the DSB at a fixed location makes it easy for the file server 9002 to locate the DSB. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described in detail below), which in turn includes pointers to other objects.

Figure 9:
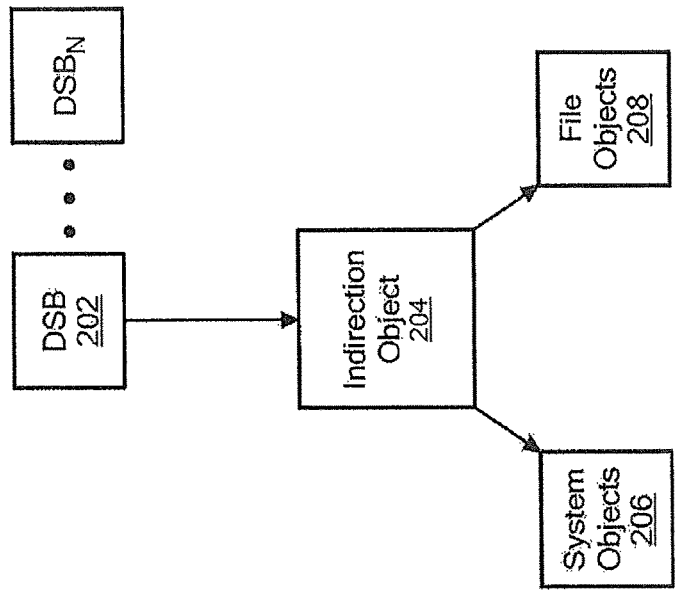
FIG. 9 is an exemplary schematic block diagram showing the general format of a filesystem in accordance with an exemplary embodiment of the present invention.

FIG. 9 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and file objects 208.

In embodiments of the present invention, N dynamic superblocks (N>2) are maintained for a filesystem, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the filesystem, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 10:
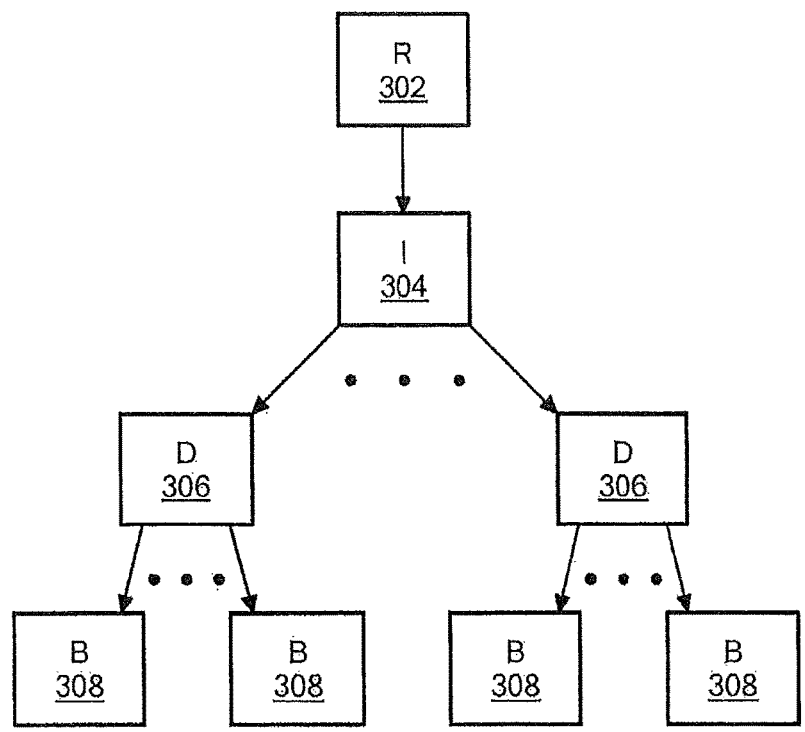
FIG. 10 is an exemplary schematic block diagram showing the general format of an object tree structure in accordance with an exemplary embodiment of the present invention.

FIG. 10 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 11:
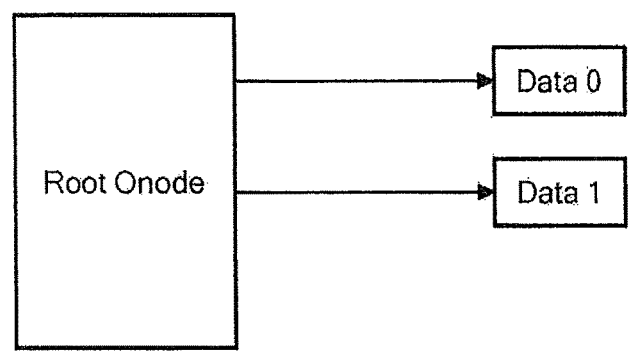
FIG. 11 is an exemplary block diagram showing use of a root onode with no other onodes in accordance with an exemplary embodiment of the present invention.

As data is added to the object, it is first of all put into data blocks pointed to directly from the root node. This is illustrated in the diagram of FIG. 11, showing use of a root node with no other nodes. Note that, for the sake of simplicity in this and all the following diagrams, the root node and direct node are shown as having only two data pointers, and the indirect node is shown as only having two indirect or direct node pointers.

Figure 12:
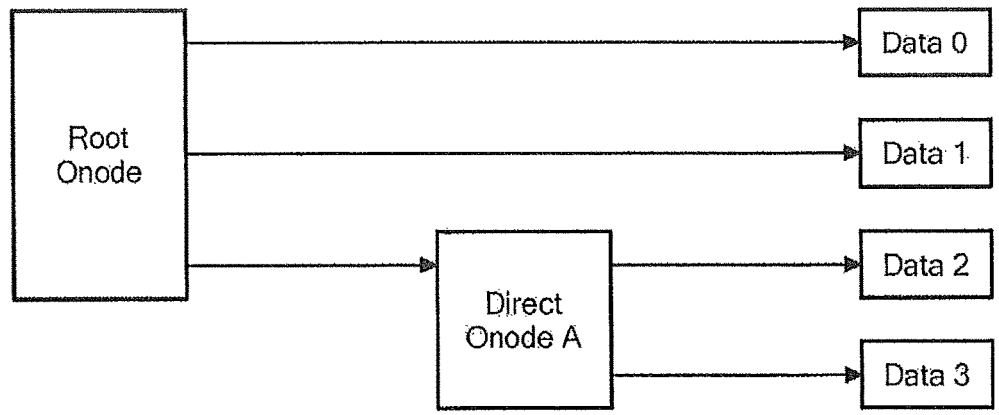
FIG. 12 is an exemplary block diagram showing employment of a root onode with a direct onode in accordance with an exemplary embodiment of the present invention.

Once all the direct block pointers in the root node are filled, then a direct node A is created with a pointer from the root node to the direct node. FIG. 12 shows employment of a root node with this direct node A. Note that the root node has multiple data block pointers but only a single pointer to either a direct or an indirect node.

Figure 13:
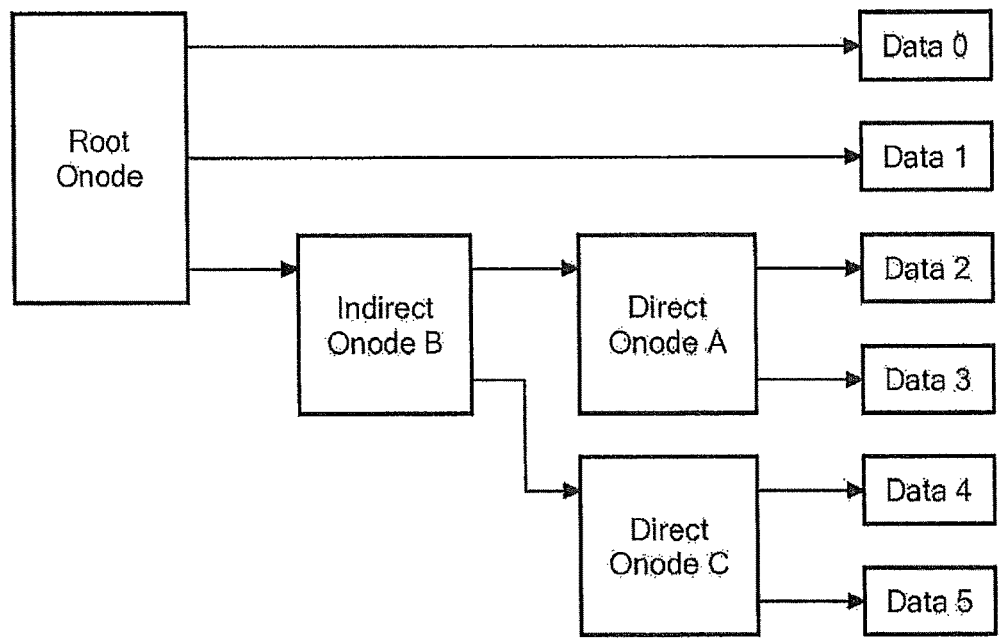
FIG. 13 is an exemplary block diagram showing employment of a root onode with an indirect onode as well as direct onodes in accordance with an exemplary embodiment of the present invention.

If the data in the object grows to fill all the data pointers in the direct node, then an indirect node B is created, as illustrated in FIG. 13. FIG. 13 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 14:
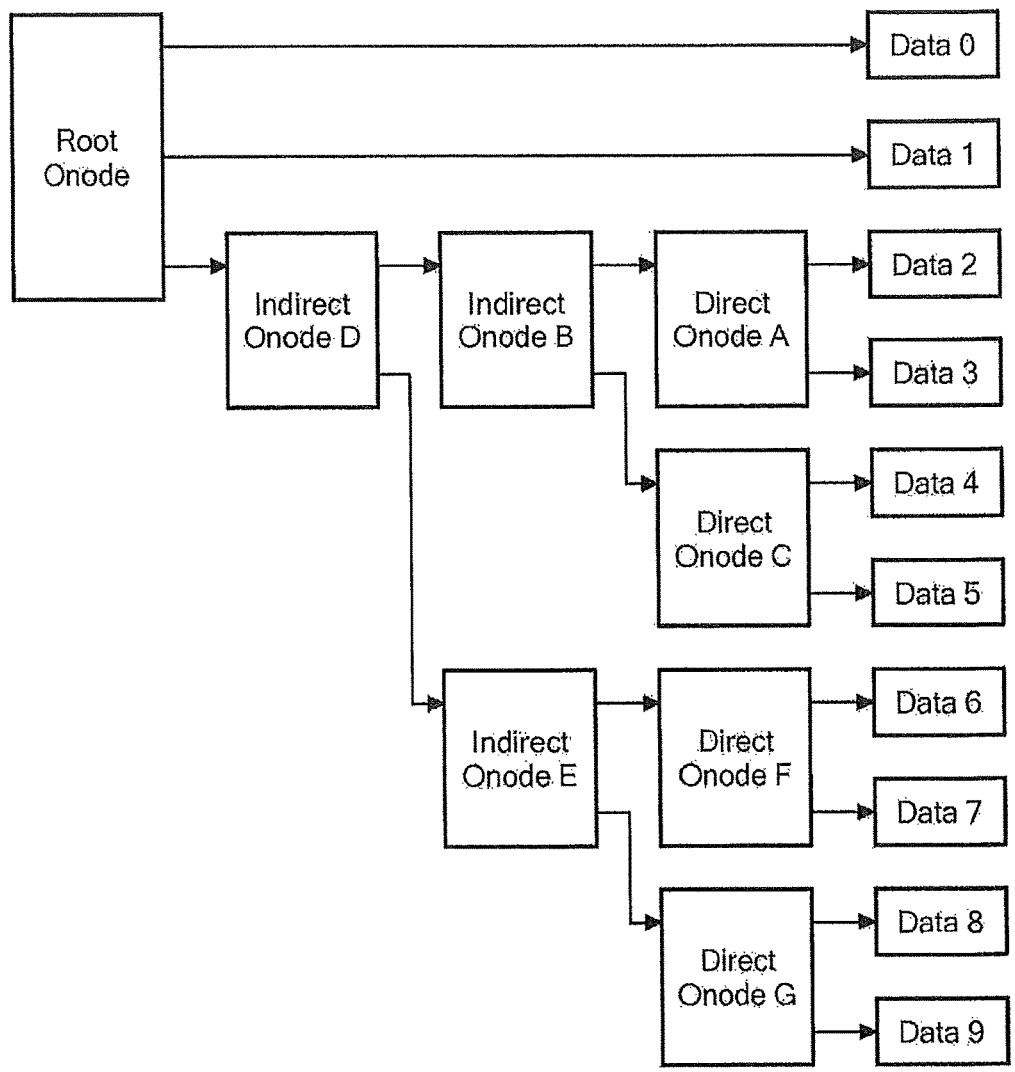
FIG. 14 is an exemplary block diagram illustrating use of multiple layers of indirect onodes placed between the root onode and the direct onodes in accordance with an exemplary embodiment of the present invention.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 14, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of a free space object, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment:
  enode (little overhead to update, limited capacity). This structure is defined in the object root node and is 128 bytes in an exemplary embodiment.
  software metadata object (expensive in overhead to update, near infinite capacity). This is a dedicated object for storage of metadata and therefore has its own storage locations on disk; the object is identified in the enode.

Thus, in an exemplary embodiment, each object root node stores the following types of information:

The checkpoint number.

The data length for this version of the object.

The number of levels of indirection used in the runlist for this object.

The type of the object. This is primarily used as a sanity check when a request comes in to access the object.

A pointer to an older root node version made for a retained checkpoint (if there is one).

A pointer to a newer root node version (will only be valid if this is a copy of a root node made for a retained checkpoint).

Up to 16 data block pointers per root onode. Each data block descriptor includes a pointer to a data block, the checkpoint number, and a bit to say whether the block is zero filled.

A single pointer to either a direct node or an indirect node.

The 128 bytes of enode data for this object.

A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:

The checkpoint number.

Pointers to either indirect or direct nodes (e.g., up to 60 such pointers).

A CRC and various sanity dwords to allow the indirect node to be checked for validity.

As discussed above, the direct node provides direct pointers to data blocks on the disk. The following information is stored in the direct node in an exemplary embodiment:

The checkpoint number.

A number of data block descriptors (e.g., up to 62 such descriptors). Each data block descriptor includes a pointer to a data block, the checkpoint number, and a bit to say whether the block is zero filled.

A CRC and various sanity dwords to allow the indirect node to be checked for validity.

As data is deleted from the object and data blocks and direct and indirect nodes are no longer required, they are returned to the free space allocation controller.

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

FIG. 15 shows a representation of object number assignments for an exemplary embodiment of the present invention. Specifically, the filesystem may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

In an exemplary embodiment, the indirection object 204 is logically organized as a table, with one table entry per object indexed by object number. As shown in FIG. 16, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

In an exemplary embodiment, the indirection object may be implemented as a "pseudo-file" in having no actual storage blocks. In an exemplary embodiment, instead of having pointers to actual data blocks in the object tree structure (e.g., as shown in FIG. 9), such pointers in the indirection object tree structure point to the root nodes of the corresponding objects. Thus, in an exemplary embodiment, the indirection object maps each object number to the sector address of the root node associated with the corresponding filesystem object. The indirection object tree structure can then be traversed based on an object number in order to obtain a pointer to the root node of the corresponding object.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 17:
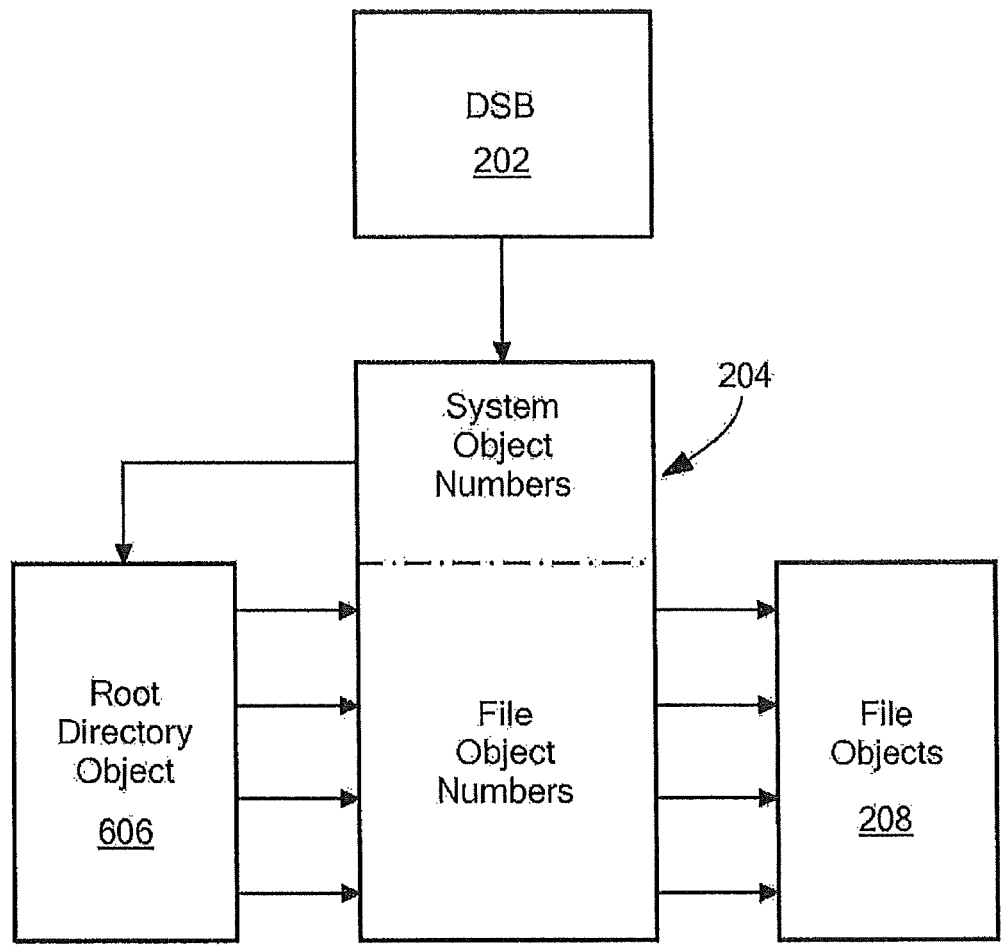
FIG. 17 is an exemplary schematic block diagram demonstrating the general relationship between the DSB, the indirection object, the root direction object, and the file objects, in accordance with an exemplary embodiment of the present invention.

FIG. 17 is a schematic block diagram demonstrating the general relationship between the DSB 202, the indirection object 204, the root directory object 606, and the file objects 208, in accordance with an exemplary embodiment of the present invention. As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

Multi-Way Checkpoints

In certain embodiment, multiple checkpoints may be taken so that multiple versions of the filesystem can be maintained over time. For example, multiple separate root structures (referred to hereinafter as "dynamic superblocks" or "DSBs") are used to manage multiple instantiations of the filesystem. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the filesystem back to a previous "checkpoint," there are multiple "checkpoints" from which to choose, providing a better chance that there will be an intact version of the filesystem to which the filesystem can be reverted or a checkpoint that contains a particular version of the filesystem.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, exemplary embodiments of the present invention maintain N DSBs (where N is greater than two, e.g., 16). The DSBs are used to take successive checkpoints.

Thus, at any given time, there is a current (working) version of the filesystem and one or more checkpoint versions of the filesystem. Because the storage system is typically quite dynamic, the current version of the filesystem will almost certainly begin changing almost immediately after taking a checkpoint. For example, filesystem objects may be added, deleted, or modified over time. In order to maintain checkpoints, however, none of the structures associated with stored checkpoints can be permitted to change, at least until a particular checkpoint is deleted or overwritten. Therefore, as objects in the current version of the filesystem are added, deleted, and modified, new versions of object tree structures are created as needed, and the various pointers are updated accordingly.

Figure 18:
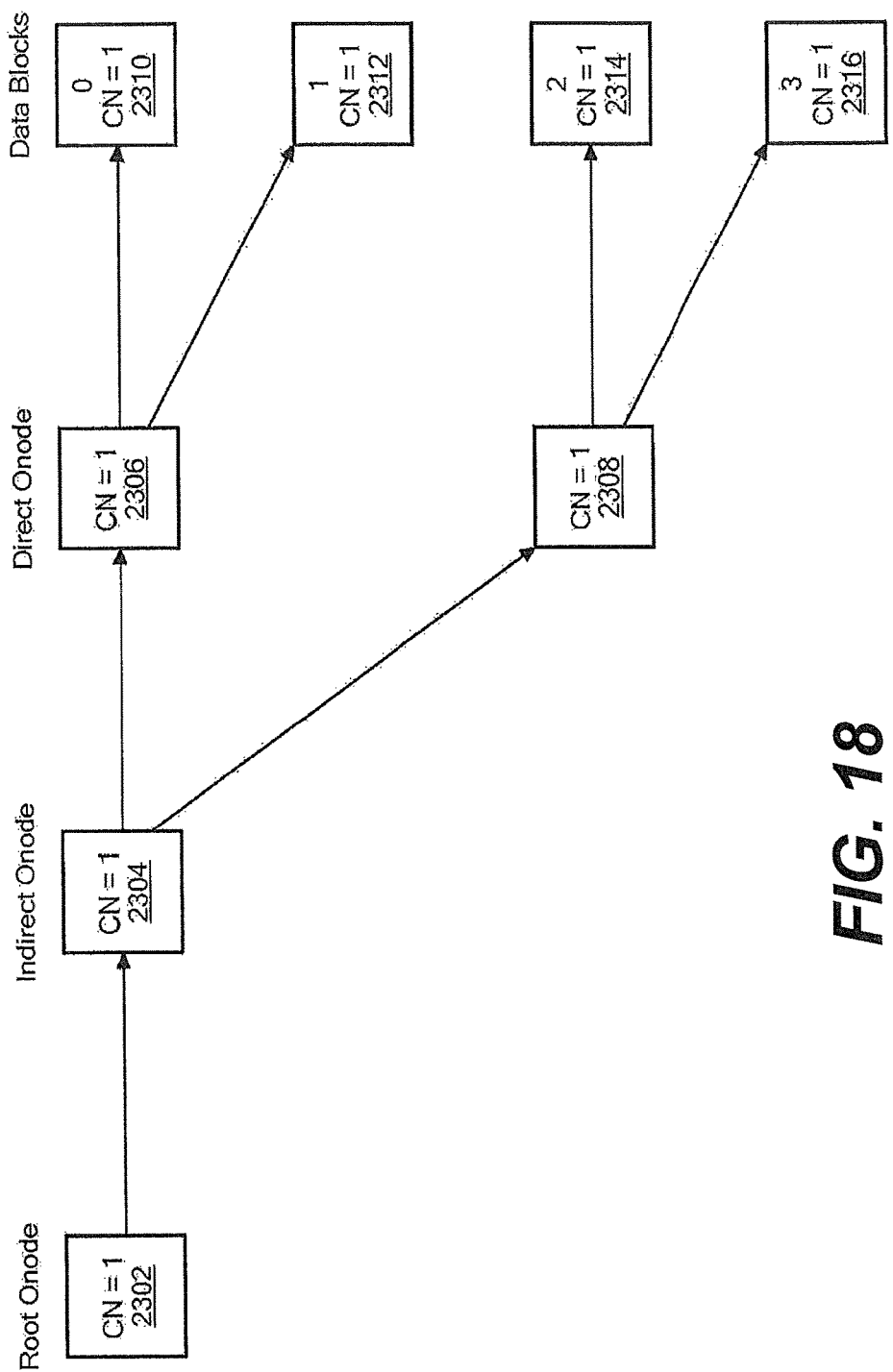
FIG. 18 is an exemplary schematic diagram that shows the structure of an exemplary object that includes four data blocks and various onodes at a checkpoint number 1 in accordance with an exemplary embodiment of the present invention.

For example, FIG. 18 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Figure 19:
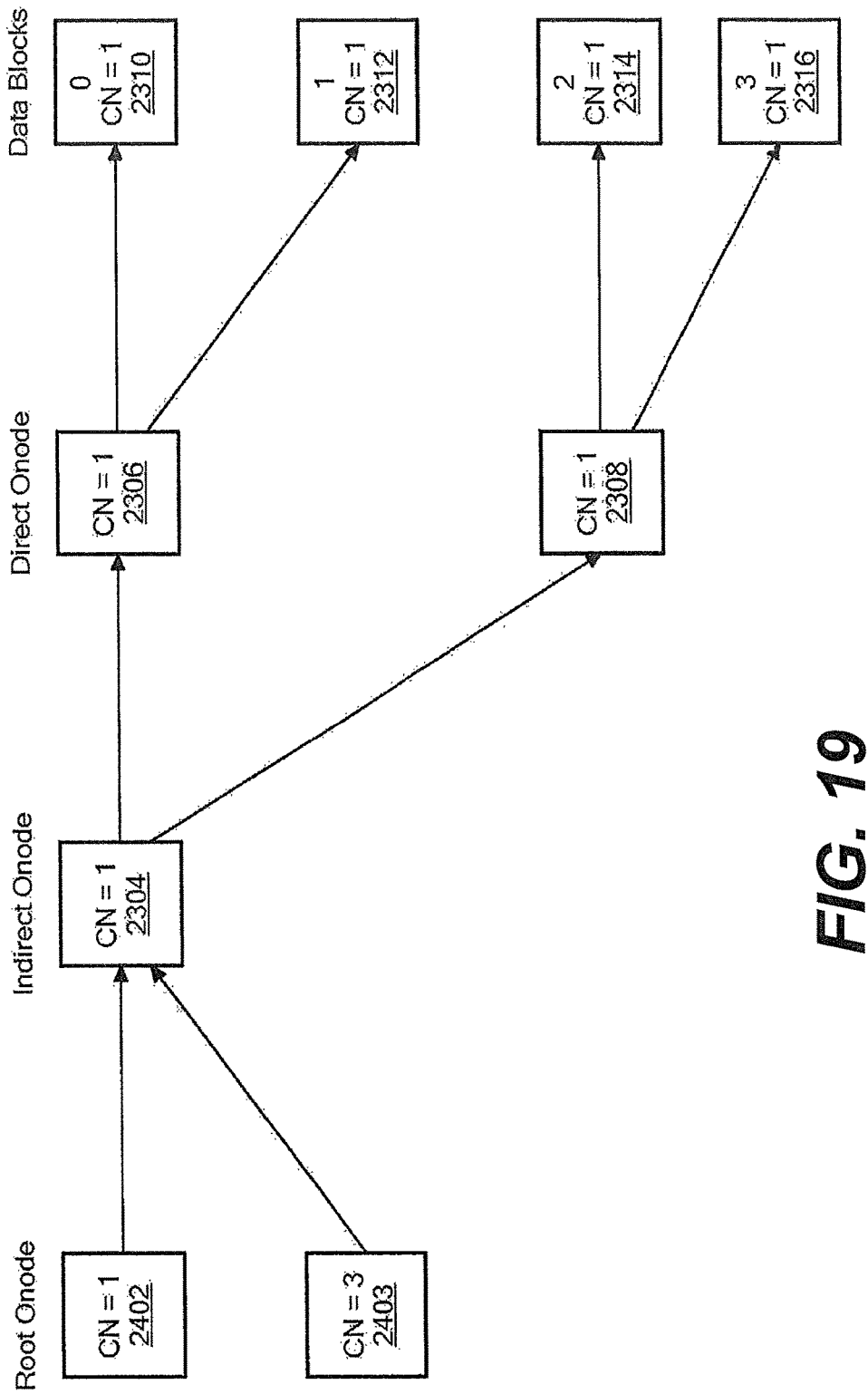
FIG. 19 is an exemplary schematic diagram that shows the structure of the exemplary object of FIG. 18 after a new root node is created for the modified object in accordance with an embodiment of the present invention.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). FIG. 19 schematically shows the object structure after creation of the new root node 2403. At this point, both root node 2402 and new root node 2403 point to indirect node 2304.

Figure 20:
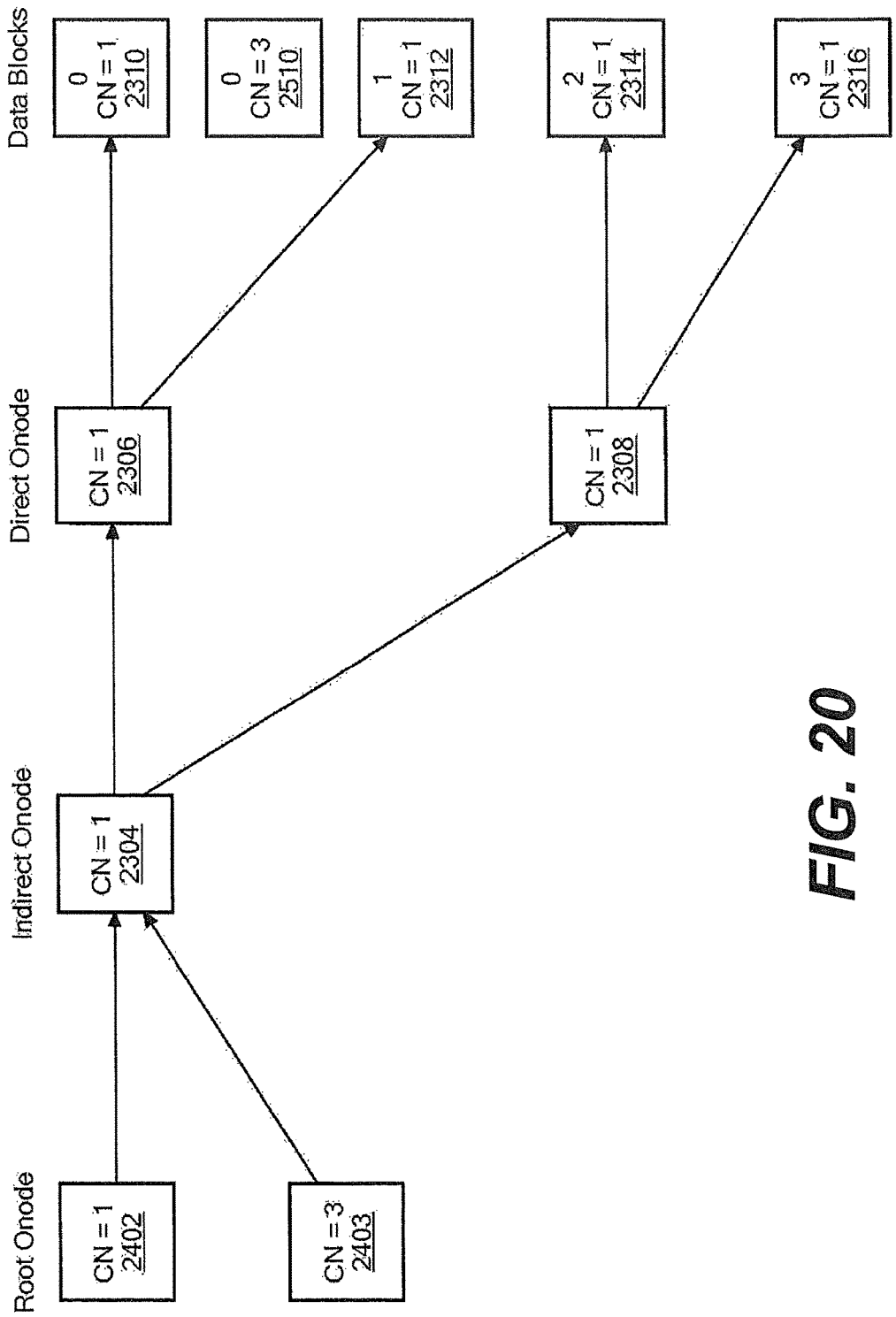
FIG. 20 is an exemplary schematic diagram that shows the structure of the exemplary object of FIG. 19 after a modified copy of a data block is created in accordance with an embodiment of the present invention.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created). FIG. 20 schematically shows the object structure after creation of the new data block 2510.

Figure 21:
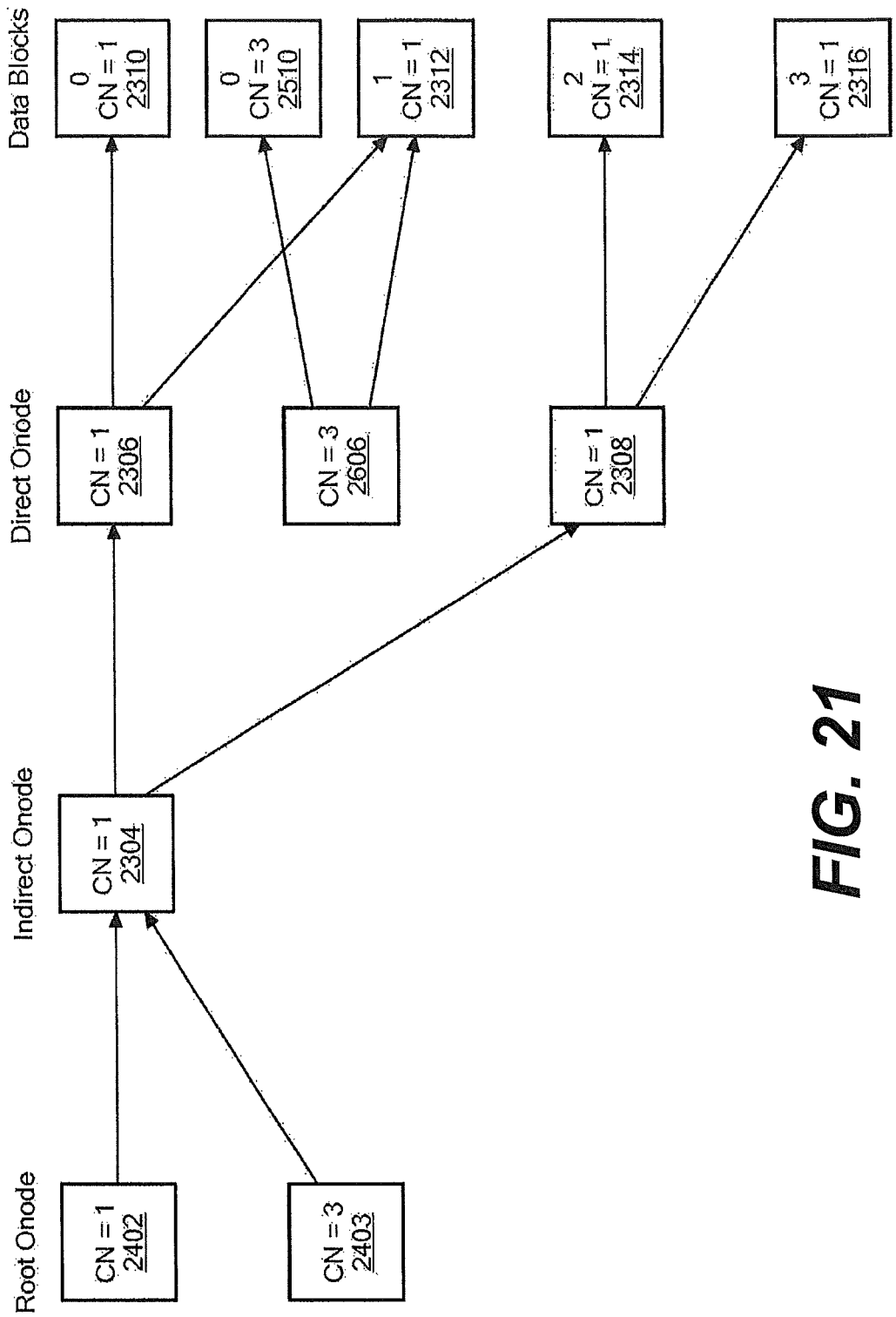
FIG. 21 is an exemplary schematic diagram that shows the structure of the exemplary object of FIG. 20 after a new direct onode is created to point to the modified copy of the data block in accordance with an embodiment of the present invention.

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created). FIG. 21 schematically shows the object structure after creation of the new direct node 2606 including pointers to the new data block 0 (2510) and the old data block 1 (2312).

Figure 22:
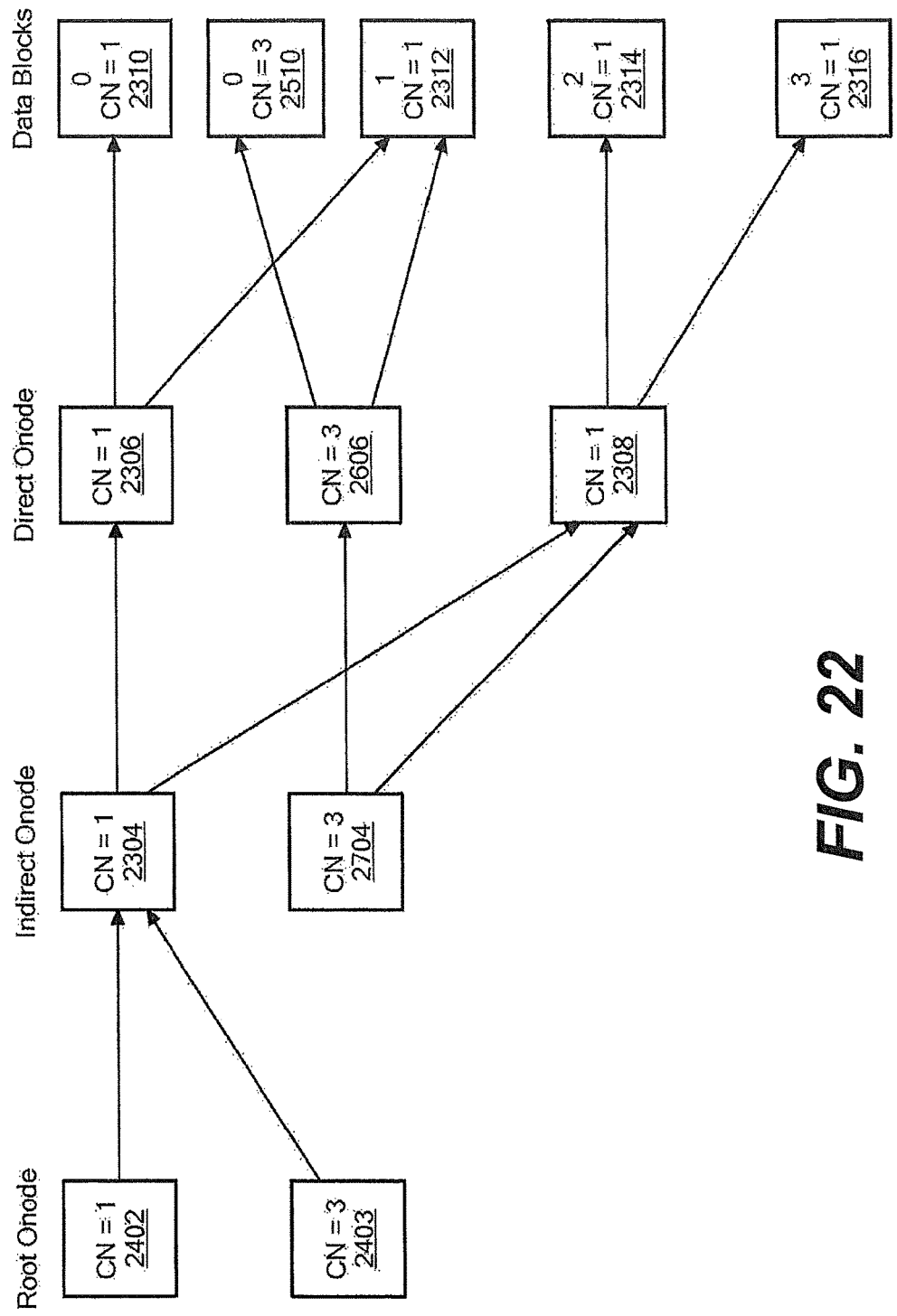
FIG. 22 is an exemplary schematic diagram that shows the structure of the exemplary object of FIG. 21 after a new indirect onode is created to point to the new direct onode in accordance with an embodiment of the present invention.

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. FIG. 22 schematically shows the object structure after creation of the new indirect node including pointers to the new direct node 2606 and the old direct node 2308.

Figure 23:
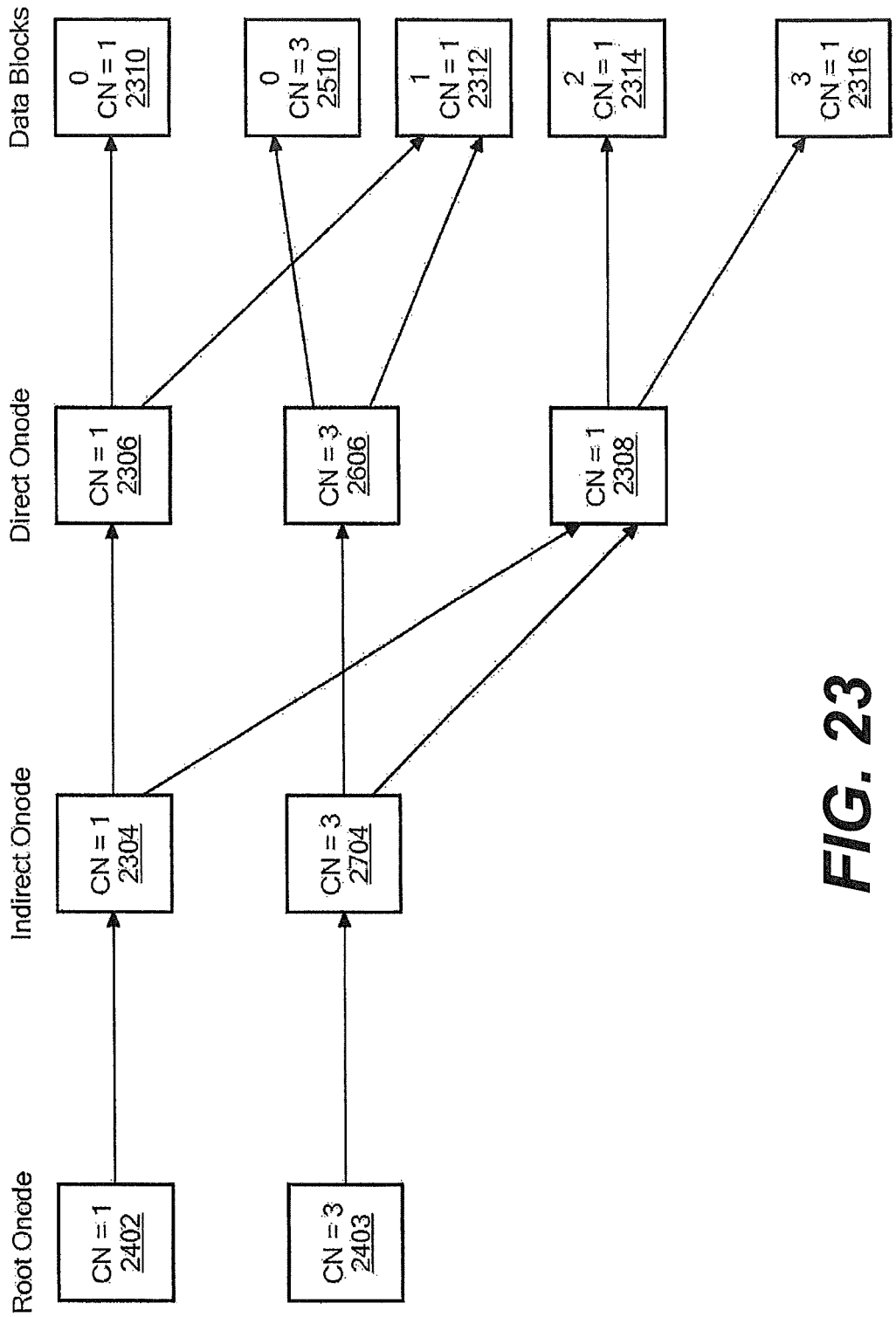
FIG. 23 is an exemplary schematic diagram that shows the structure of the exemplary object of FIG. 22 after the new root node is updated to point to the new indirect onode in accordance with an embodiment of the present invention.

Finally, the Object Store sub-module writes a pointer to the new indirect node 2704 in the new root node 2403. FIG. 23 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a filesystem object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the filesystem, the current indirection object is modified to point to the root node of the modified object rather than to the root node of the previous version of the object. For example, with reference again to FIG. 23, the current indirection object would be updated to point to root node 2403 rather than to root node 2402 for the object number associated with this object.

Similarly, if a new object is created or an existing object is deleted in the current version of the filesystem, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the filesystem (i.e., the current version and each checkpoint version) generally will include a separate version of the indirection object, each having a different indirection object root node (but possibly sharing one or more indirect nodes, direct nodes, and/or data blocks).

Figure 24:
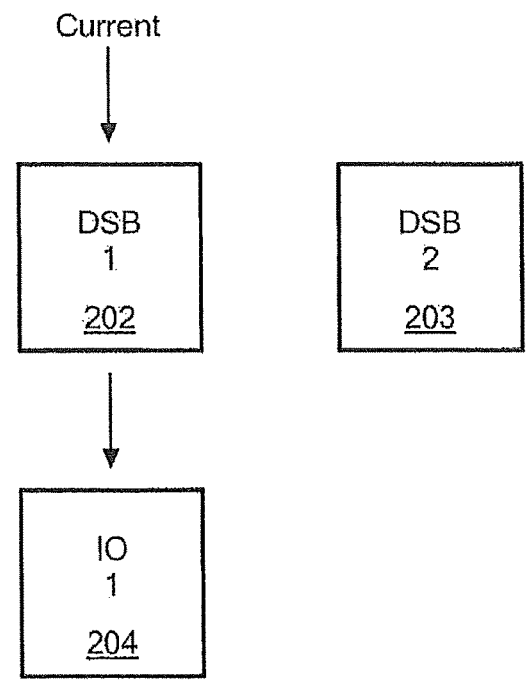
FIG. 24 is an exemplary schematic diagram showing various filesystem structures prior to the taking of a checkpoint, in accordance with an exemplary embodiment of the present invention using a circular list of DSBs to record checkpoints.

FIG. 24 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

Figure 25:
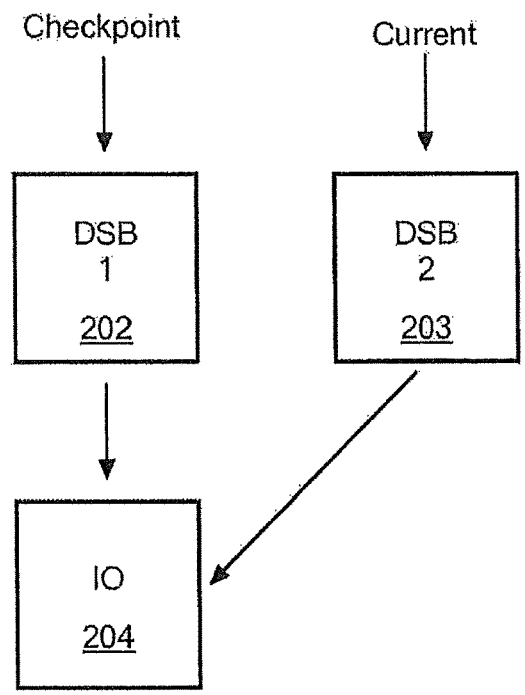
FIG. 25 is an exemplary schematic diagram showing the various filesystem structures of FIG. 24 after a checkpoint is taken, in accordance with an exemplary embodiment of the present invention using a circular list of DSBs to record checkpoints.

In order to create a checkpoint from the current version of the filesystem, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203. FIG. 25 is a schematic diagram showing the various filesystem structures after a checkpoint is taken, in accordance with an exemplary embodiment of the present invention. At this point, DSB 202 represents the most recent checkpoint version of the filesystem, while DSB 203 represents the current (working) version of the filesystem.

Figure 26:
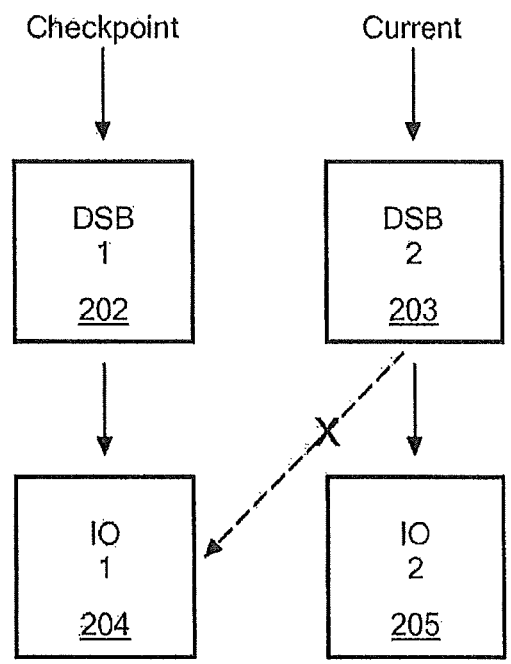
FIG. 26 is an exemplary schematic diagram showing the various filesystem structures of FIG. 25 after modification of the indirection object, in accordance with an exemplary embodiment of the present invention using a circular list of DSBs to record checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 25, such that a new indirection object root node is created, the DSB for the current filesystem version (i.e., DSB 203 in FIG. 25) is updated to point to the new indirection object root node rather than to the prior indirection object root node. FIG. 26 is a schematic diagram showing the various filesystem structures after modification of the indirection object, in accordance with an exemplary embodiment of the present invention. Here, DSB 202, which is associated with the checkpoint version of the filesystem, points to the checkpoint version of the indirection object 204, while DSB 203, which is associated with the current version of the filesystem, points to the root node of new indirection object 205.

Figure 27:
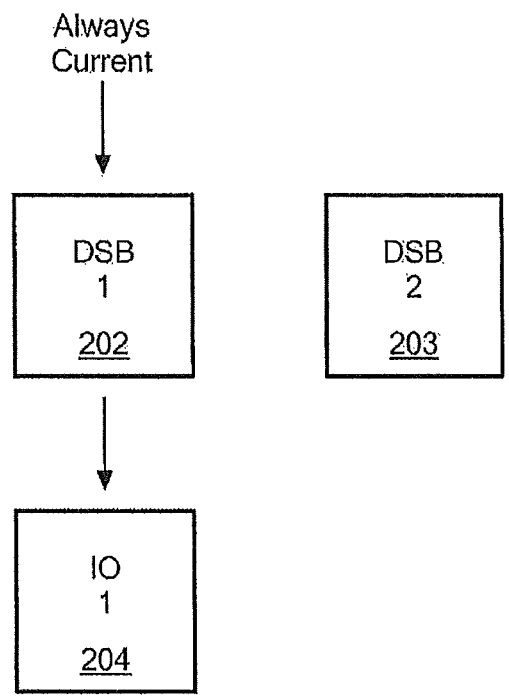
FIG. 27 is an exemplary schematic diagram showing various filesystem structures prior to the taking of a checkpoint, in accordance with an exemplary embodiment of the present invention in which one DSB is reused to create successive checkpoints.

FIG. 27 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

In order to create a checkpoint from the current version of the filesystem, the next DSB 203 is initialized for the new checkpoint. Among other things, such initialization includes writing the next checkpoint number into DSB 203 and storing a pointer to the root node of indirection object 204 into DSB 203. FIG. 25 is a schematic diagram showing the various filesystem structures after a checkpoint is taken, in accordance with an exemplary embodiment of the present invention. At this point, DSB 203 represents the most recent checkpoint version of the filesystem, while DSB 202 continues to represent the current (working) version of the filesystem.

Figure 28:
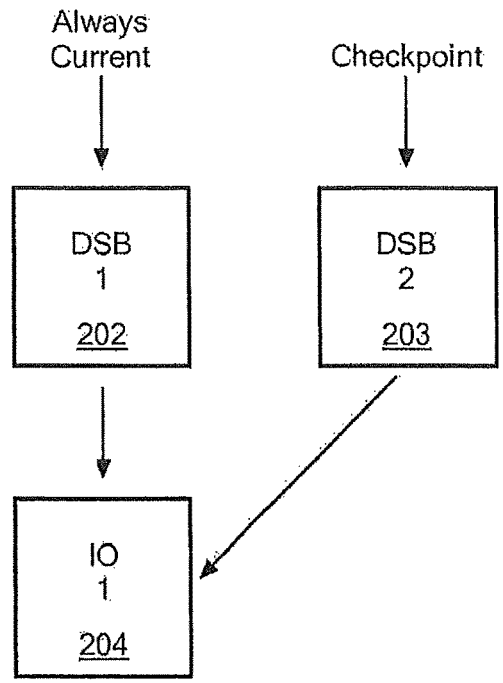
FIG. 28 is an exemplary schematic diagram showing the various filesystem structures of FIG. 27 after a checkpoint is taken, in accordance with an exemplary embodiment of the present invention in which one DSB is reused to create successive checkpoints.
Figure 29:
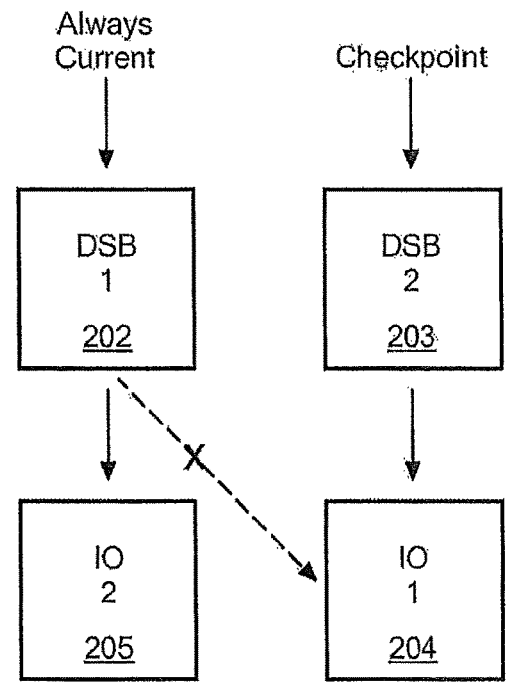
FIG. 29 is an exemplary schematic diagram showing the various filesystem structures of FIG. 28 after modification of the indirection object, in accordance with an exemplary embodiment of the present invention in which one DSB is reused to create successive checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 28, such that a new indirection object root node is created, the DSB for the current filesystem version (i.e., DSB 202 in FIG. 28) is updated to point to the new indirection object root node rather than to the prior indirection object root node. FIG. 29 is a schematic diagram showing the various filesystem structures after modification of the indirection object, in accordance with an exemplary embodiment of the present invention. Here, DSB 203, which is associated with the checkpoint version of the filesystem, points to the checkpoint version of the indirection object 204, while DSB 202, which continues to be associated with the current version of the filesystem, points to the root node of new indirection object 205.

File Cloning

The process of file cloning is explained in U.S. patent application Ser. No. 10/286,015, which is incorporated by reference above. Relevant portions of the process are reprinted below from U.S. patent application Ser. No. 10/286,015 and some portions are omitted. According to an embodiment of the present invention, file cloning is performed according to the following process.

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include:

The data stream of a filesystem object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot) of the source object, referred to hereinafter as a "data-stream-snapshot" object or "DSS," and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the filesystem users. Both the source object and the mutable clone object effectively become writable versions of the DSS object and effectively store their divergences from the DSS object.

Before creating the data-stream-snapshot object, the system preferably ensures that the source object is quiescent. In an exemplary embodiment, this involves the following steps:

Step A1. Lock the source object against mutations.

Step A2. Perform a filesystem checkpoint, which effectively serializes the creation of clones on a given filesystem (although the creation rate will be limited by the rate at which the filesystem can commit the previous checkpoint to disk such that storage-side delays will result in longer create times). As explained below, in some embodiments, a filesystem checkpoint is not necessary in order to clone the object.

Then, after completion of the checkpoint, the system creates the data-stream-snapshot object, which involves the following steps:

Step A3. Create a data-stream-snapshot object.

Step A4. Copy the block pointers from the source object's root onode to the data-stream-snapshot object's root onode.

Step A5. Record the current checkpoint number in the source object's root onode. This is the object's cloned-in-checkpoint number ("CON"); it defines the earliest checkpoint in which the object's data stream can diverge from its associated data-stream-snapshot object's data stream.

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root onode.

Further objects that have a mutable clone of the data-stream-snapshot object's data stream can be created as follows:

Step B1. Create a new file system object.

Step B2. Copy the block pointers from the data-stream-snapshot object's root onode to the new object's root onode.

Step B3. Record the current checkpoint number in the new object's root onode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labelled "CN" in FIG. 18), which records the checkpoint of the last modification of the object. Both are stored in the object root onode.

When modifying a user data or metadata block, the filesystem considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user/metadata block through a pointer with a checkpoint number greater than or equal to the clone's cloned-in-checkpoint number (a diverged block) follows the usual rules for objects in the "live" filesystem substantially as described above.

Some of the file cloning concepts described above can be demonstrated by the examples in U.S. patent application Ser. No. 10/286,015, which is incorporated by reference above.

Figure 30:
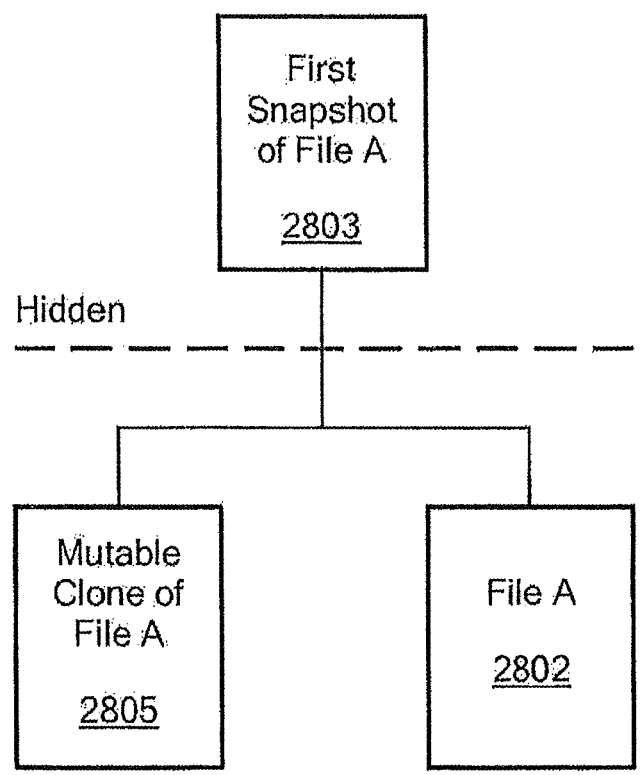
FIG. 30 exemplarily schematically shows the relationship between the source object (FileA) 2802, the hidden datastream-snapshot object 2803, and the mutable copy 2805, in accordance with an exemplary embodiment of the present invention.

FIG. 30 schematically shows the relationship between the source object (FileA) 2802, the hidden data-stream-snapshot object 2803, and the mutable clone 2805, in accordance with an exemplary embodiment of the present invention.

As is apparent from the following description of exemplary embodiments of the present invention, modifications to the cloning and checkpointing mechanisms described above are implemented.

Figure 31:
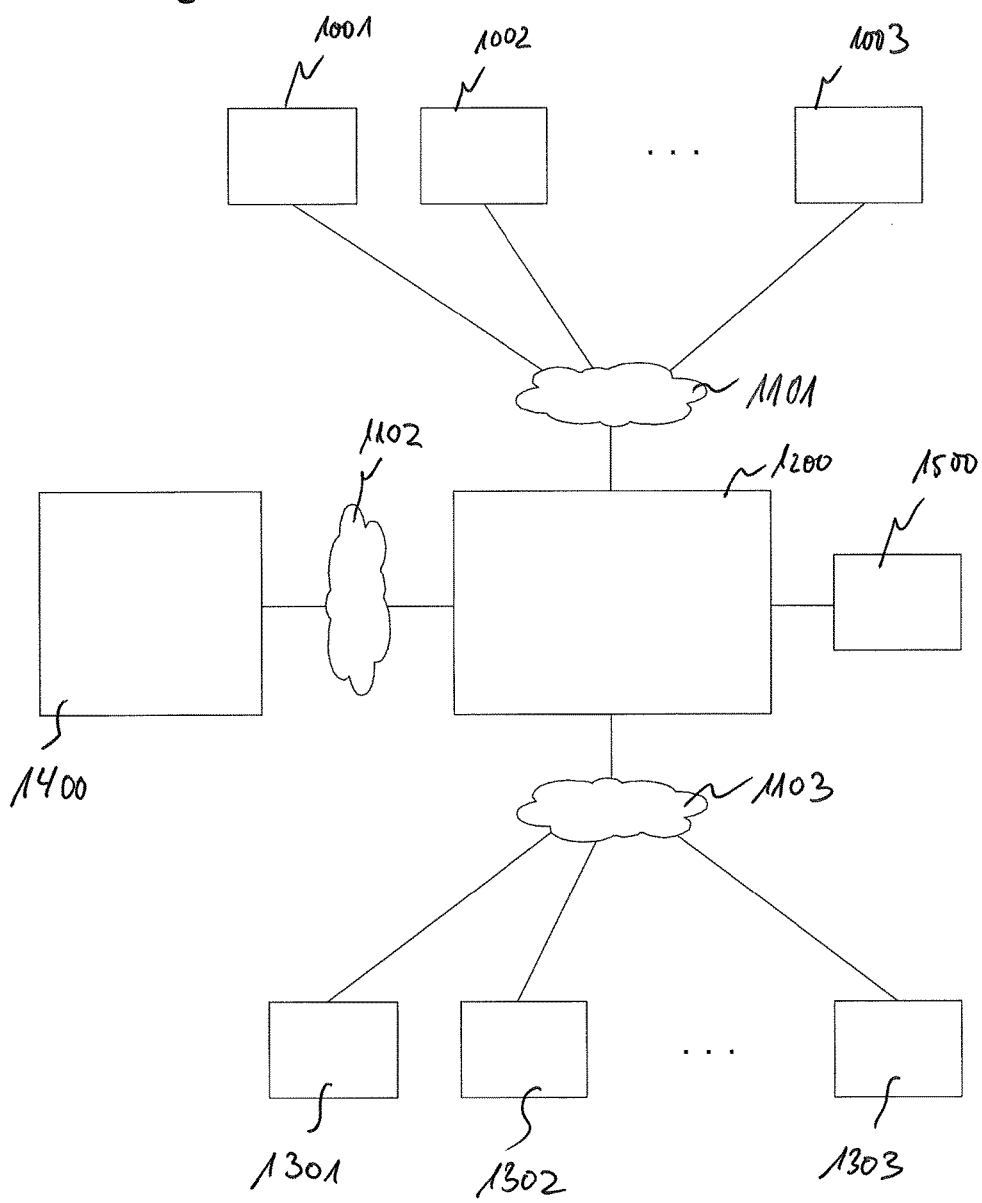
FIG. 31 is an exemplary schematic diagram showing a data storage system according to an exemplary embodiment of the present invention.

FIG. 31 exemplarily shows a schematic illustration of a configuration of a data storage system. The data storage system comprises a file system server 1200 connected to at least one host computer (client) and in FIG. 31 exemplarily a plurality of host computers (clients) 1001, 1002 and 1003 via a communication network 1101 (which may be organized and managed as a LAN, for example). The file system server 1200 is further connected to a plurality of storage apparatuses 1301, 1302 and 1303 via another communication network 1103 (which may be organized and managed as a SAN, for example). In other embodiments, only one storage apparatus may be connected to the file system server 1200, or in other embodiments the file system server and the one or more storage apparatuses may be implemented within one single device.

The file system server 1200 is adapted to manage one or a plurality of file systems, each file system being accessible by one or more of the host computers 1001 to 1003, possibly depending on individually set access rights, and, for accessing the one or more file systems, the host computers issue access requests to the file system server 1200.

Such access may include operations such as write new user data (e.g. write new files) and create new directories of the file system(s), read user data (read user data of one or more files), lookup directories, delete user data (such as delete existing files) and delete directories, modify user data (e.g. modify an existing file such as by modifying the file data or extend the file data by adding new user data to the file), create copies of files and directories, create soft links and hard links, rename files and directories etc. Also, the host computers 1001 to 1003 may issue inquiries with respect to metadata of the file system objects (e.g. metadata on one or more files and metadata on one or more directories of the file systems).

The file system server 1200 manages the access requests and inquiries issued from the host computers 1001 to 1003, and the file system server 1200 manages the file systems that are accessed by the host computers 1001 to 1003. The file system server 1200 manages user data and metadata. The host computers 1001 to 1003 can communicate via one or more communication protocols with the file system server 1200, and in particular, the host computers 1001 to 1003 can send I/O requests to the file system server 1200 via the network 1101.

A management computer 1500 is exemplarily connected to the file system server 1200 for enabling control and management access to the file system server 1200. An administrator/user may control and adjust settings of the file system management and control different functions and settings of the file system server 1200 via the management computer 1500. For controlling functions and settings of the file system management of the file system server 1200, the user can access the file system server 1200 via a Graphical User Interface (GUI) and/or via a Command Line Interface (CLI). In other embodiments such control of the file system management of the file system server 1200 can be performed via one or more of the host computers instead of the management computer 1500.

The file system server 1200 is additionally connected to the one or more storage apparatuses 1301 to 1303 via the network 1103, and the user data (and potentially also the metadata of the one or more file systems managed on the file system server 1200) is stored to storage devices of the storage apparatuses 1301 to 1303, wherein the storage devices may be embodied by plural storage disks and/or flash memory devices. In some embodiments, the storage devices of the storage apparatuses 1301 to 1303 may be controlled according to one or more RAID configurations of specific RAID levels.

Exemplarily, the file system server 1200 is additionally connected to a remote storage apparatus 1400 via another communication network 1102 for remote mirroring of the file system data (user data and/or metadata) to a remote site. Such remote mirroring may be performed synchronously and asynchronously, for example, and settings of the function of the remote mirror operation may be controlled also via the management computer 1500. The storage apparatus 1400 may be comprised of one or more apparatuses similar to the storage apparatuses 1301 to 1303 or it may be embodied by another remote file system server connected to one or more apparatuses similar to the storage apparatuses 1301 to 1303.

Figure 32:
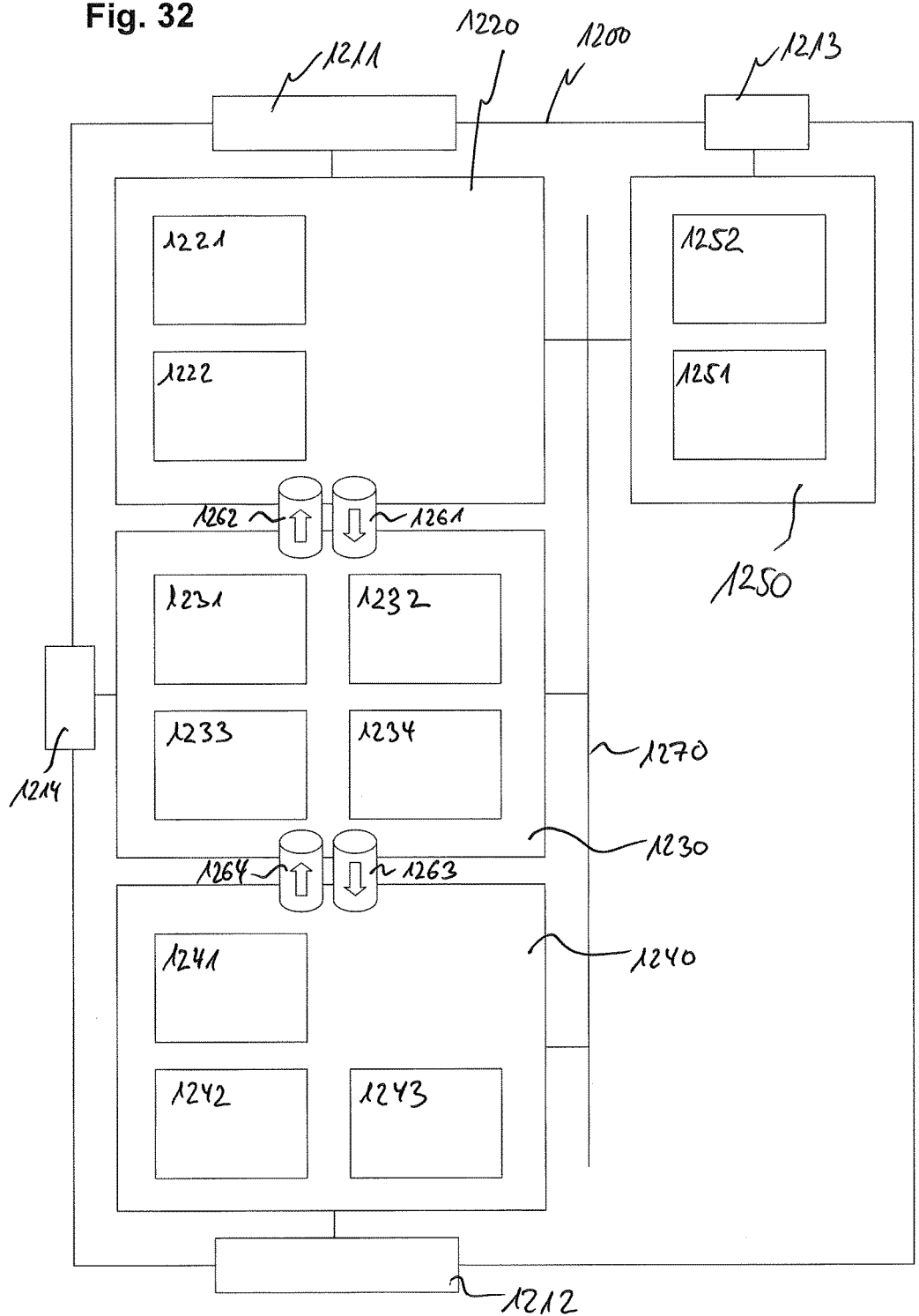
FIG. 32 is an exemplary schematic diagram showing an architecture of a file system server according to an exemplary embodiment of the present invention.

FIG. 32 exemplarily shows a schematic illustration of a configuration of a file system server 1200 (file system management apparatus) according to an embodiment, please also see FIGS. 1 to 3 for related implementations. The file system server 1200 comprises a network interface 1211 for connection to the host computers 1001 to 1003 (e.g. based on Ethernet connections or other technologies), a disk interface 1212 (or also referred to as a storage interface in that the "disk interface" of the file system server may not connect to a disk itself but rather connect to a network for communicating with a storage apparatus such as one or more storage arrays) for connection to the storage apparatuses 1301 to 1303 (e.g. based on Fibre Channel connections or other technologies), a management interface 1213 for connection to the management computer 1500 (e.g. based on Ethernet connections or other technologies), and a remote network interface 1214 for connection to the remote storage apparatus 1400 (e.g. based on Fibre Channel or Ethernet connections or other technologies).

The inner architecture of the file system server 1200 exemplarily comprises four functionally and/or structurally separated portions, each of which may be implemented as a software-based implementation, as a hardware-based implementation or as a combination of software-based and hardware-based implementations. For example, each of the portions may be provided on a separate board, in a separate module within one chassis or in a separate unit or even in a separate physical chassis.

Specifically, the file system server 1200 comprises a network interface portion 1220 (also referred to as NIP) that is connected to the network interface 1211, a data movement and file system management portion 1230 (also referred to as DFP) which may be further separated (functionally and/or structurally) into a data movement portion (also referred to as DMP) and a file system portion (also referred to as FMP), a disk interface portion 1240 (also referred to as DIP) that is connected to the disk interface 1212, and a management portion 1250 (also referred to as MP). The various components may be connected by one or more bus systems and communication paths such as, e.g. the bus system 1270 in FIG. 32. Exemplarily, the data movement and file system management portion 1230 is connected to the remote network interface 1214.

The network interface portion 1220 is configured to manage receiving and sending data packets from/to hosts via the network interface 1211. The network interface portion 1220 comprises a processing unit 1221 (which may comprises one or more processors such as one or more CPUs (in particular, here and in other aspects, one or more CPUs may be provided as single-core CPUs or even more preferably as one or more multi-core CPUs) and/or one or more programmed or programmable hardware-implemented chips or ICs such as for example one or more Field Programmable Gate Arrays referred to as FPGAs) and a network interface memory 1222 for storing packets/messages/requests received from the host(s), prepared response packets/messages prior to sending the packets to host(s), and/or for storing programs for control of the network interface portion 1220 and/or the processing unit 1221.

The network interface portion 1220 is connected to the data movement and file system management portion 1230 via the fastpath connections 1262 and 1261 for sending received packets, messages, requests and user data of write requests to the data movement and file system management portion 1230 and for receiving packets, messages, requests, file system metadata and user data in connection with a host-issued read request from the data movement and file system management portion 1230. The fastpath connections (communication paths 1261 and 1262) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 is configured to manage data movement (especially of user data) between the network interface portion 1220 and the disk interface portion 1240, and to further manage the one or more file system(s), in particular manage file system objects of the one or more file systems and metadata thereof, including the management of association information indicating an association relation between file system objects and actual data stored in data blocks on the storage devices or the storage apparatuses 1301 to 1303.

The data movement and file system management portion 1230 comprises a processing unit 1231 (which may comprises one or more processors such as one or more CPUs and/or one or more programmed or programmable hardware-implemented chips or ICs such as for example one or more Field Programmable Gate Arrays referred to as FPGAs) and a DFP memory 1232 for storing packets/messages/requests received from the NIP, prepared response packets/messages prior to sending the packets to the NIP, and/or for storing programs for control of the data movement and file system management portion 1230 and/or the processing unit 1231.

The data movement and file system management portion 1230 is connected to the disk interface portion 1240 via the fastpath connections 1263 and 1264 for sending received packets, messages, requests and user data of write requests to the disk interface portion 1240 and for receiving packets, messages, requests, and user data in connection with a host-issued read request from the disk interface portion 1240. The fastpath connections (communication paths 1263 and 1264) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 exemplarily further comprises a metadata cache 1234 for storing (or temporarily storing) metadata of the file system(s) and file system objects thereof used for managing the file system.

The data movement and file system management portion 1230 exemplarily further comprises a non-volatile memory 1233 (such as e.g. an NVRAM) for storing data of packets, messages, requests and, especially, for storing user data associated with write requests and read requests. Especially, since the data of write requests can be saved quickly and efficiently to the non-volatile memory 1233 of the DFP 1230, the response to the hosts can be issued quickly directly after the associated data has been safely stored to the non-volatile memory 1233 even before actually writing the data to one or more caches or to the storage devices of the storage apparatuses 1301 to 1303.

The disk interface portion 1240 is configured to manage receiving and sending user data, data packets, messages, instructions (including write instructions and read instructions) from/to storage apparatuses 1301 to 1303 via the network interface 1212.

The disk interface portion 1240 comprises a processing unit 1241 (which may comprises one or more processors such as one or more CPUs and/or one or more programmed or programmable hardware-implemented chips or ICs such as for example one or more Field Programmable Gate Arrays referred to as FPGAs) and a disk interface memory 1242 for storing packets/messages/requests received from the DFP and/or for storing programs for control of the disk interface portion 1240 and/or the processing unit 1241.

In addition, the disk interface portion 1240 exemplarily further comprises a user data cache 1243 (sometimes also referred to as disk interface cache or sector cache, not to be confused with a cache of a storage apparatus described later) for storing or temporarily storing data to be written to storage apparatuses and/or data read from storage apparatuses via the disk interface 1212.

Finally, the management portion 1250 connected to the management interface 1213 comprises a processing unit 1251 (which may comprises one or more processors such as one or more CPUs and/or one or more programmed or programmable hardware-implemented chips or ICs such as for example one or more Field Programmable Gate Arrays referred to as FPGAs) and a management memory 1252 for storing management information, management setting information and command libraries, and/or for storing programs for control of the management portion 1250 and/or the processing unit 1251, e.g. for controlling a Graphical User Interface and/or a Command Line Interface provided to the user of the management computer 1500.

Figure 33A:
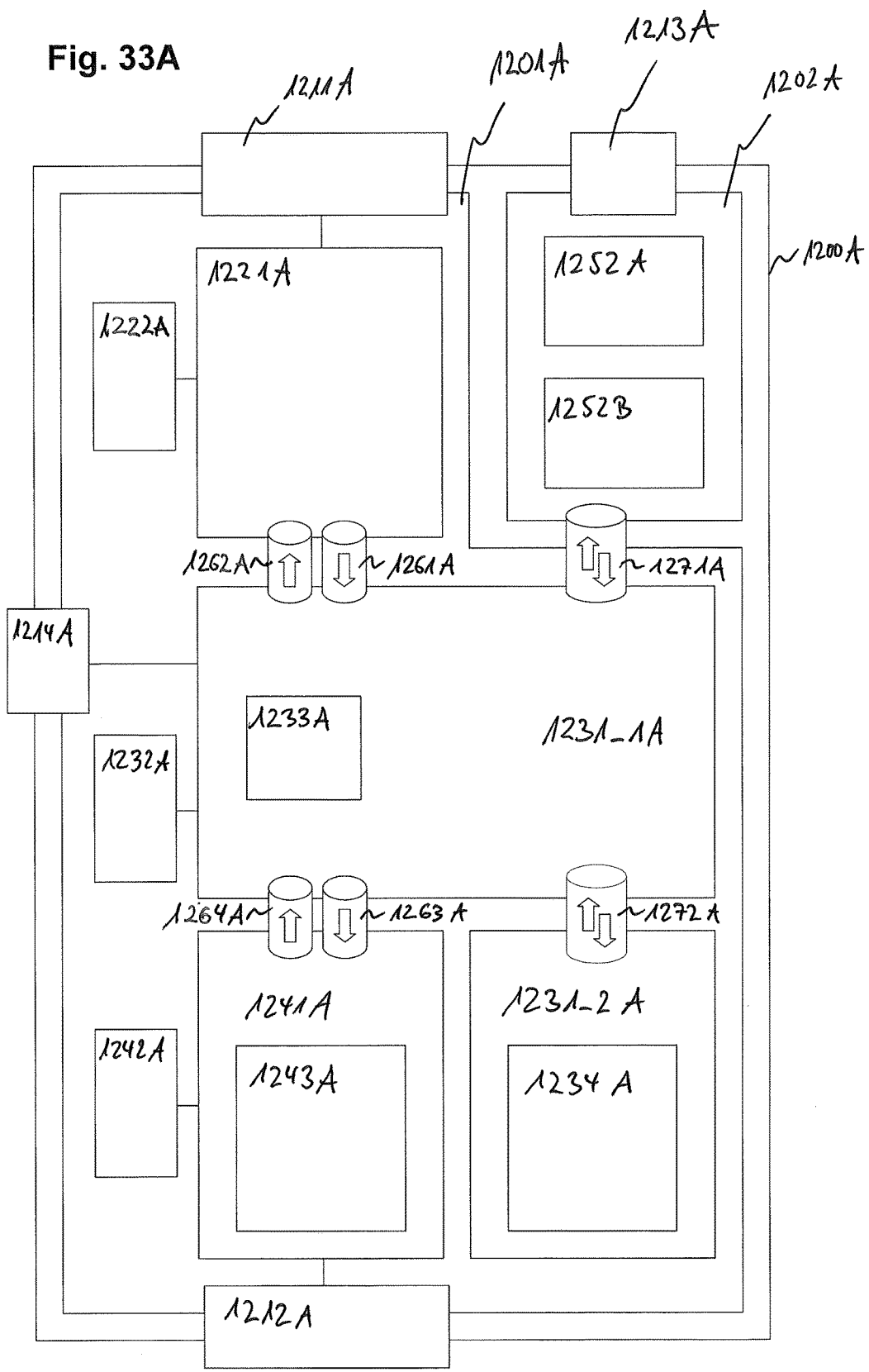
FIG. 33A is another exemplary schematic diagram showing an architecture of a file system server according to an exemplary embodiment of the present invention.

FIG. 33A exemplarily shows a schematic illustration of a more specific configuration of a file system server 1200A (file system management apparatus) according to an embodiment. Exemplarily, the file system server 1200A comprises a file system unit 1201A and a management unit 1202A. In some embodiments, the file system unit 1201A and the management unit 1202A may be embodied by separate boards, i.e. a file system board and a management board, that may be implemented in one server module (one or more of the modules may be implemented in one server chassis) or as separate modules, e.g. as a file system module and a management module, which may be implemented in one or more server chassis.

In this embodiment of FIG. 33A, the management unit 1202A may functionally and/or structurally correspond to the management portion 1250 of FIG. 32. The management unit 1202A (e.g. a management board) comprises the management interface 1213A (corresponding to the management interface 1213), the processing unit 1251A (corresponding to the processing unit 1251), preferably comprising one or more CPUs, and the management memory 1252A (corresponding to the management memory 1252).

The file system unit 1201A may functionally and/or structurally correspond to the portions 1220 to 1240 of FIG. 32. The file system unit 1201A (e.g. a file system board) comprises the network interfaces 1211A (corresponding to network interface 1211), the disk interface 1212A (corresponding to disk interface 1212), and the remote network interface 1214A (corresponding to remote network interface 1214).

Corresponding to the network interface portion 1220, the file system unit 1201A comprises a network interface memory 1222A and a network interface unit (NIU) 1221A which corresponds to processing unit 1221 and may be embodied by one or more programmed or programmable hardware-implemented chips or ICs such as for example one or more Field Programmable Gate Arrays referred to as FPGAs.

Corresponding to the disk interface portion 1240, the file system unit 1201A comprises a disk interface memory 1242A and a disk interface unit 1241A (DIU), which corresponds to processing unit 1241, and may be embodied by one or more programmed or programmable hardware-implemented chips or ICs such as for example one or more Field Programmable Gate Arrays referred to as FPGAs. The disk interface unit 1241A comprises the sector cache memory 1243A (corresponding to the sector cache memory 1243).

Corresponding to the data movement portion of the DFP 1230, the file system unit 1201A comprises a DM memory 1232A (corresponding to DMP memory 1232), a DM unit 1231_1A (data movement management unit—DMU) and a FS unit 1231_2A (file system management unit—FSU) corresponding to processing unit 1231, and both being possibly embodied by one or more programmed or programmable hardware-implemented chips or ICs such as for example one or more Field Programmable Gate Arrays referred to as FPGAs.

The DM unit 1231_1A comprises or is connected to the non-volatile memory 1233A (corresponding to the non-volatile memory 1233) and the FS unit 1231_2A comprises or is connected to the metadata cache memory 1234A (corresponding to the metadata cache memory 1234). The FS unit 1231_2A is configured to handle management of the file system(s), file system objects and metadata thereof and the DM unit 1231_1A is configured to manage user data movement between the network and disk interface units 1221A and 1241A.

The network interface unit 1221, the DM unit 1231_1A and the disk interface unit 1241A are respectively connected to each other by the data connection paths 1261A and 1262A, and 1263A and 1264A (e.g. fastpath connections corresponding to paths 1261 to 1264). In addition, the DM unit 1231_1A is connected to the management unit 1202A by communication path 1271A and to the DM unit 1231_1A by communication path 1272A (which may be implemented via fastpaths or regular data connections such as via an internal bus system etc.).

Figure 33B:
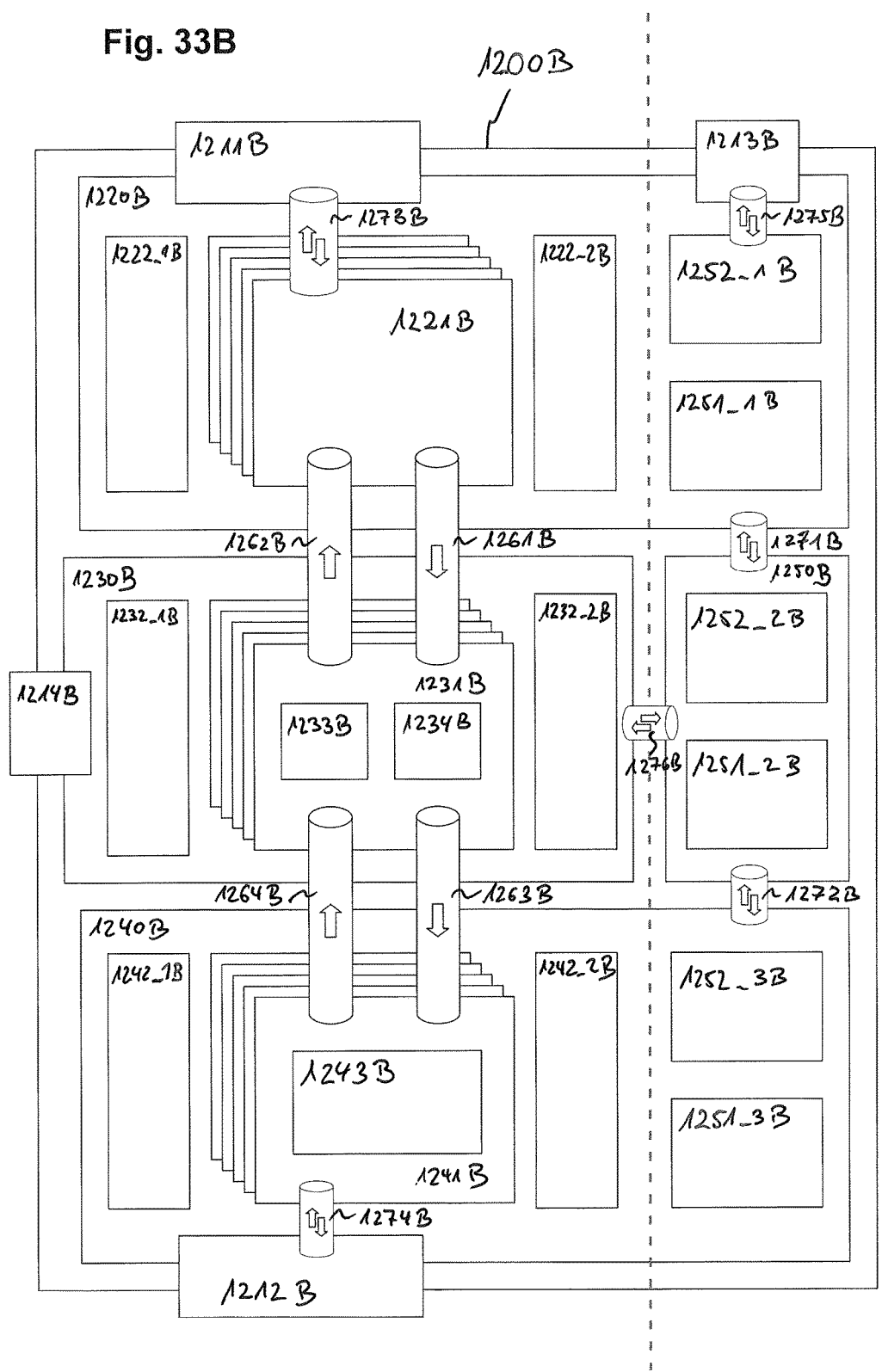
FIG. 33B is another exemplary schematic diagram showing an architecture of a file system server according to an exemplary embodiment of the present invention.

FIG. 33B exemplarily shows a schematic illustration of another more specific configuration of a file system server 1200B (file system management apparatus) according to an embodiment. Exemplarily, the file system server 1200B comprises a network interface module 1220B, a data movement and file system management module group comprising the data movement and file system module 1230B and a management module 1250B, and a disk interface module 1240B. In some embodiments, each of the above modules may be provided separately and inserted into a physical server chassis to be connected to each other according to a modular assembly (i.e. single modules may be exchanged if required, or some or all of the modules may be provided at a higher number depending on the requirements).

For management purposes, each of the network interface module 1220B, the management module 1250B and the disk interface module 1240B comprises a respective management memory 1252_1B, 1252_2B and 1252_3B and a respective processing unit 1251_1B, 1251_2B and 1251_3B (each of which may comprises one or more processors such as one or more CPUs).

Accordingly, the components on the right side of the dashed line in FIG. 33B correspond to the management portion 1250 of FIG. 33, however, exemplarily, different processing units and associated memories are provided for controlling management of the network interfaces, the file system and data movement management, and the disk interfaces. The respective portions of the modules are communicably connected via communication paths 1271B, 1272B and 1275B to allow for communication to the management computer 1500 via the interface 1213B (the communication paths 1271B, 1272B and 1275B may be implemented via fastpaths or regular data connections such as via a bus system etc.).

Corresponding to the network interface portion 1220, the network interface module 1220B exemplarily comprises two network interface memories 1222_1B and 1222_2B and a plurality of network interface units (NIU) 1221B (corresponding to processing unit 1221) which are connected to the network interface via communication path 1273B and may be embodied by a plurality of programmed or programmable hardware-implemented chips or ICs such as for example Field Programmable Gate Arrays referred to as FPGAs.

Corresponding to the disk interface portion 1240, the disk interface module 1240B exemplarily comprises two disk interface memories 1242_1B and 1242_2B and a plurality of disk interface units 1241B (DIU), which corresponds to processing unit 1241, and which may be embodied by a plurality of programmed or programmable hardware-implemented chips or ICs such as for example one or more Field Programmable Gate Arrays referred to as FPGAs. The disk interface units 1241B comprise or are connected to the sector cache memory 1243B (corresponding to the sector cache memory 1243) and are connected to the disk interface 1212B via communication path 1274B.

Corresponding to the DFP 1230, the file system and data movement management module 1201A comprises a data movement management memory 1232_1. B, a file system management memory 1232_2B and a plurality of DFP units 1231B (corresponding to processing unit 1231) and which may be embodied by a plurality of programmed or programmable hardware-implemented chips or ICs such as for example Field Programmable Gate Arrays referred to as FPGAs. Preferably, one or more of the DFP units 1231B is/are responsible mainly for management of data movement (e.g. similar to the responsibilities of unit 1231_1A) and one or more of the DFP units 1231B is/are responsible mainly for management of the file system and metadata (e.g. similar to the responsibilities of unit 1231_2A). The DFP units 1231B comprise or are connected to the non-volatile memory 1233B (corresponding to the non-volatile memory 1233) and the metadata cache memory 1234B (corresponding to the metadata cache memory 1234).

In the above aspects, data connection lines and data connection paths between modules, boards and units of the file server architecture, in particular those other than fastpaths, may be provided as one or more bus systems, e.g. on the basis of PCI, in particular PCI-E.

Figure 34:
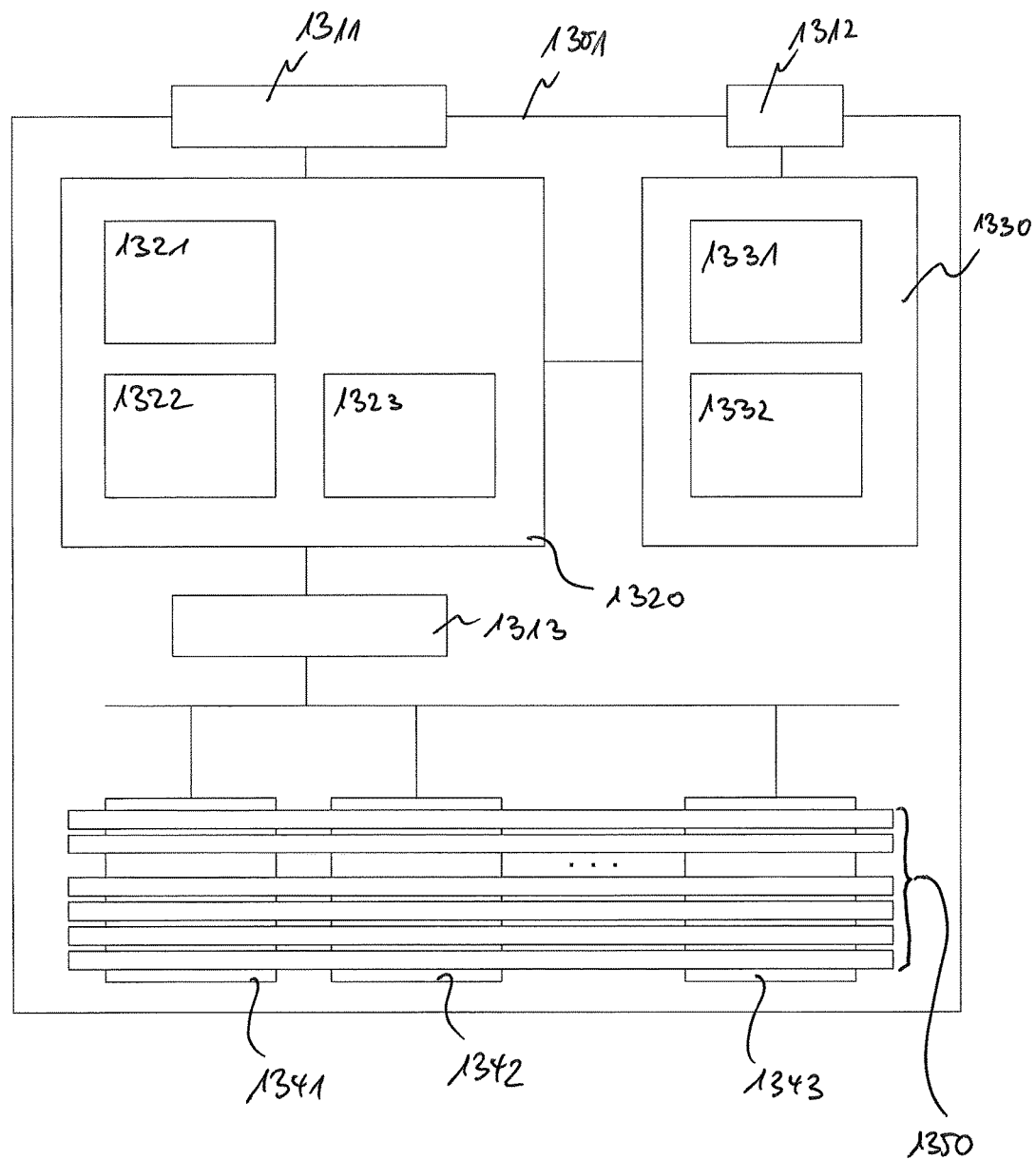
FIG. 34 is an exemplary schematic diagram showing an architecture of a storage apparatus according to an exemplary embodiment of the present invention.

FIG. 34 exemplarily shows a schematic illustration of a configuration of a storage apparatus 1301 according to an embodiment, please also see FIG. 4 for related implementations. The storage apparatus 1301 (e.g. a storage array) comprises a network interface 1311 for connection to the disk interface of the file system server 1200 via network 1103 and a memory control unit 1320 for controlling the data movement from/to the network interface 1311 and the disk interface 1313 that is connected to a plurality of storage devices 1341, 1342 and 1343 which may be embodied by storage drives such as storage disks such as Fibre Channel disks or SATA disks, by flash memory devices, flash memory drives, solid state drives, hybrid storage drives, magnetic drives and tapes and optical disks, or combinations thereof.

The memory control unit 1320 comprises a processing unit 1321, a memory 1322 and a cache memory 1323. The memory control unit 1320 is configured to manage receiving and sending user data, data packets, messages, instructions (including write instructions and read instructions) from/to the file system server 1200.

The processing unit 1321 may comprises one or more processors such as one or more CPUs and/or one or more programmed or programmable hardware-implemented chips or ICs such as for example one or more Field Programmable Gate Arrays referred to as FPGAs, and the memory 1322 is provided for storing packets/messages/requests received from the file system server and response packets to be sent to the file system server, and/or for storing programs for control of the memory control unit 1320 and/or the processing unit 1321. The cache 11323 (sometimes also referred to as disk cache) is provided for storing or temporarily storing data to be written to disk and/or data read from disk via the disk interface 1313.

Finally, a management unit 1330 of the storage apparatus 1301 is connected to a management interface 1312 and comprises a processing unit 1331 (which may comprises one or more processors such as one or more CPUs and/or one or more programmed or programmable hardware-implemented chips or ICs such as for example one or more Field Programmable Gate Arrays referred to as FPGAs) and a management memory 1332 for storing management information, management setting information and command libraries, and/or for storing programs for control of the management unit 1330 and/or the processing unit 1331, e.g. for controlling a Graphical User Interface and/or a Command Line Interface provided to a user of a management computer (not shown, or may be the management computer 1500) connected via the management interface 1312.

The data to be stored on the storage devices 1341 to 1343 (storage disks and/or flash memory devices, herein commonly referred to as disks) is controlled to be stored in RAID groups 1350. The management of RAID groups distributed over the plurality of storage devices 1341 to 1343, and calculation of required parities according to selected RAID configurations is preferably performed by the memory control unit 1320.

Figure 35:
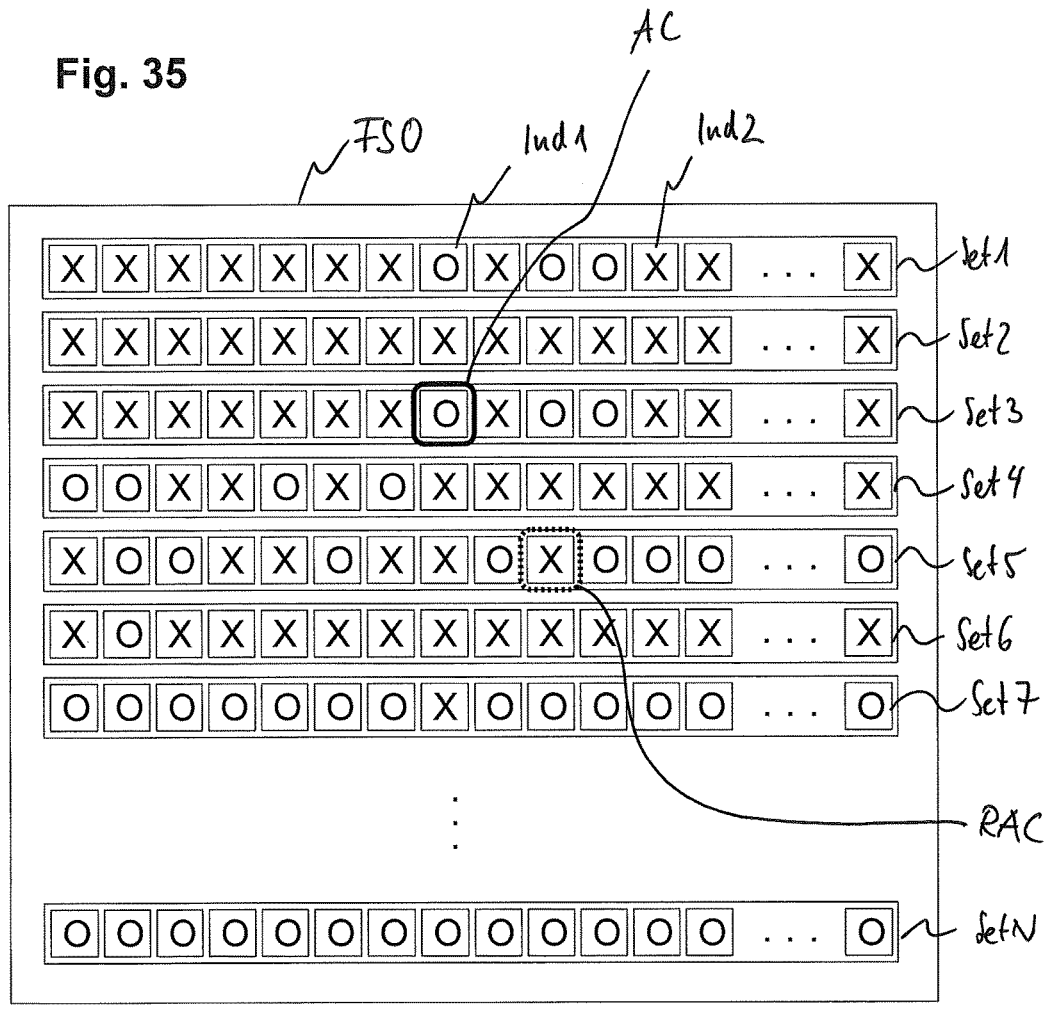
FIG. 35 is an exemplary schematic diagram showing a free space object according to an exemplary embodiment of the present invention.

FIG. 35 exemplarily shows a schematic view of a free space object FSO according to embodiments. The free space object FSO is an object that is stored in the metadata cache of the file system server 1200 (e.g. metadata cache 1234, 1234A or 1234B) and is used by the file system management portion/file system management unit/file system management module to manage allocation of storage blocks in the storage devices 1341 to 1343 when user data is to be written to disk upon receipt of a write request.

Basically, the indicators are provided in two types, wherein a first-type indicator Ind1 indicates that the associated storage block is free (i.e. it can be allocated to new user data and new user data can be written to the respective storage block, e.g. because no user data is yet stored in the respective storage block or because the user data stored in the storage block is not longer required, e.g. because an associated file system object such as the respective file is deleted), and a first-type indicator Ind2 indicates that the associated storage block is used (i.e. it cannot be allocated to new user data because it is used in that user data is stored already in the respective storage block and is still required, e.g. because the associated file system object such as the respective file not deleted, or deleted but still needed for older snapshots).

Exemplarily, in FIG. 35, the indicators of the free space object FSO are ordered in groups so as to form plural sets of Indicators referred to as Set1 to SetN in FIG. 35. The free space object FSO comprises an allocation cursor AC which indicates the current position of the block allocation operation. That is, the allocation cursor AC indicates the first free and non-allocated block in the storage devices 1341 to 1343 that is to be allocated next, when new user data is to be written.

Accordingly, when new data (user data and/or metadata) is to be written to the storage devices 1341 upon receipt of a write request from one of the host computers, the new user data (which may typically comprise data of the size of plural blocks) is allocated to storage blocks of the next free blocks indicated by the first-type indicators Ind1 starting at the allocation position of the allocation cursor AC.

Figure 36:
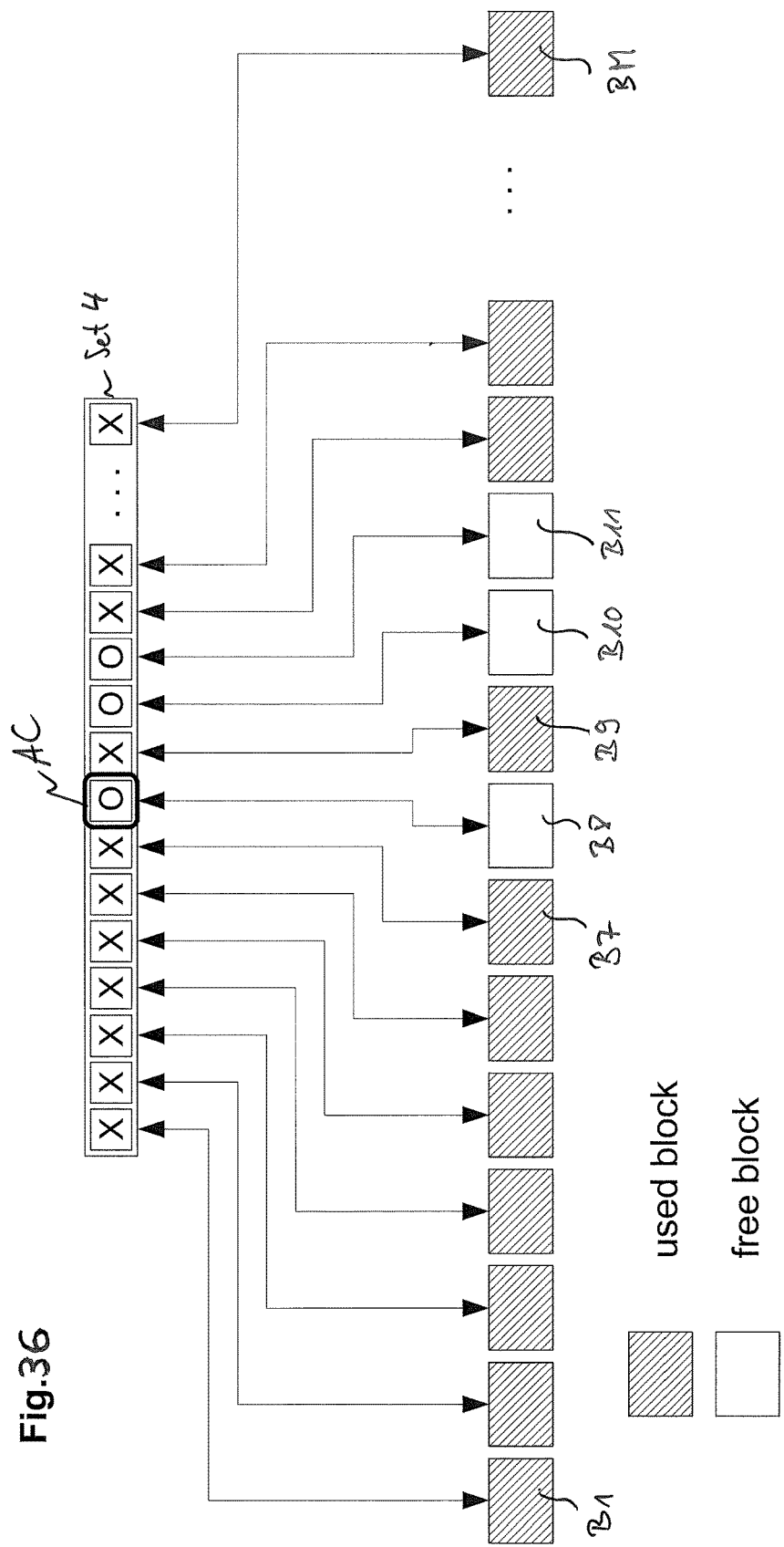
FIG. 36 is an exemplary schematic diagram showing a relationship between a set of indicators of a free space object and storage blocks according to an exemplary embodiment of the present invention.

As exemplarily shown in FIG. 35, the free space object FSO comprises a plurality of indicators Ind1 and Ind2, wherein each indicator is associated (directly or indirectly via one or more abstract layers) with a respective storage block in the storage devices 1341 to 1343. For example, FIG. 36 exemplarily shown the association between the indicators of the set of indicators referred to as Set4 and storage blocks B1 to BM. Exemplarily, the block B8 is the first unused (free) block and corresponds to the indicator that is indicated by the allocation cursor AC. Accordingly, if new user data is to be written to disk, the next block to be allocated is block B8, thereafter block B10 because block B9 is used etc.

In addition, as exemplarily shown in FIG. 35, the free space object FSO further comprises a read-ahead cursor RAC which relates to a read-ahead examination of an embodiment. The read-ahead cursor RAC in FIG. 35 is positioned ahead in the allocation cursor AC in the sense that the continuation of the allocation process will lead to a movement of the allocation cursor AC towards the current position of the read-ahead cursor RAC. The read-ahead cursor indicates the position in the free space object FSO from which a read-ahead examination can be continued, or it indicates the position of the ongoing read-ahead examination in the free space object FSO.

FIGS. 37A to 37L exemplarily illustrate the allocation examination procedure and read-ahead examination procedure of the free space object FSO according to exemplary embodiments, and a combined flush write operation according to exemplary embodiments.

Figure 37A:
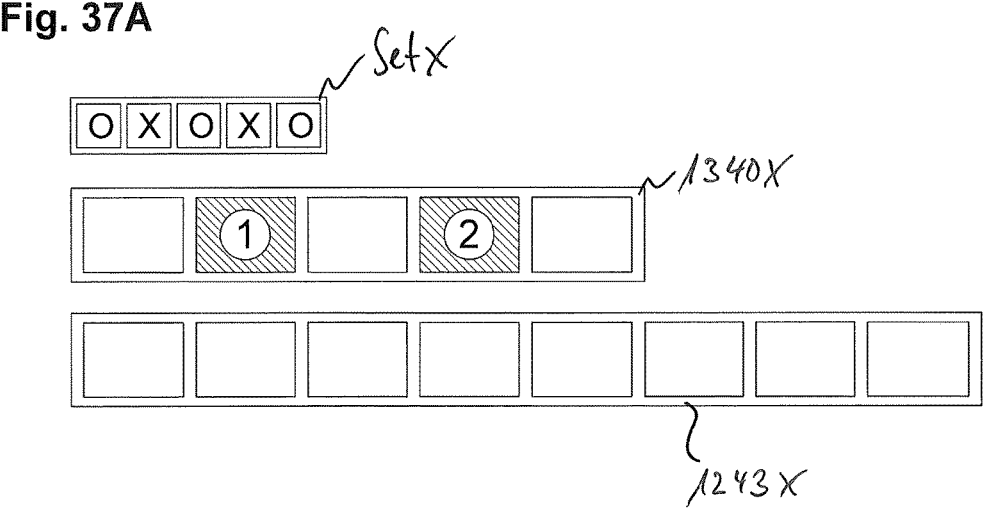
FIGS. 37A to 37L exemplarily illustrate a read-ahead examination, a read-ahead operation, am allocation operation and a combined flush write operation according to exemplary embodiments of the invention.

FIG. 37A is a simplified view in which a set of indicators (exemplarily 5 indicators: O, X, O, X, and O) referred to as SetX is examined. In a storage device of the storage apparatus, this corresponds to a set of storage blocks 1340X of storage, in particular blocks of a RAID stripe of a storage apparatus 1300.

As the second and fourth indicators of the set of indicators SetX indicate that their associated storage blocks are used, user data is already written to the second and fourth storage blocks of the group of blocks 1340X, while the first, third and fifth blocks are free, corresponding to the situation that the first, third and fifth indicators of the set of indicators SetX indicate that their associated storage blocks are free. Accordingly, the storage situation or storage status of the group of blocks 1340X is fragmented. The reference numeral 1243X refers to a group of blocks (e.g. a cache page) of a disk interface cache 1243 (or 1243A, 1243B; sector cache) which is currently empty according to the example.

Figure 37B:
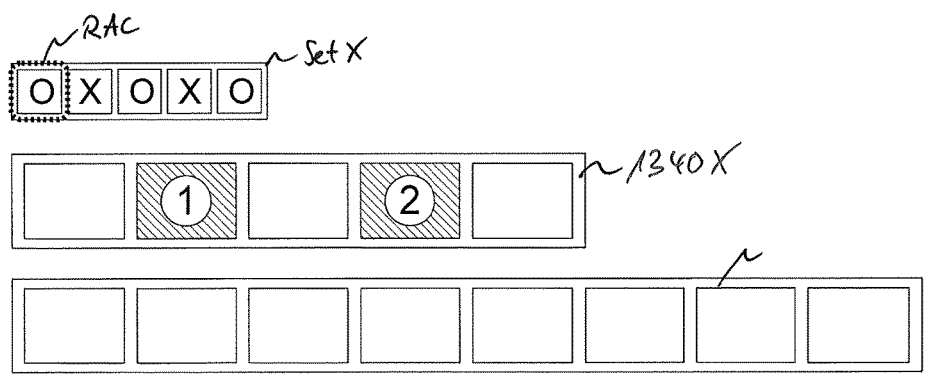

FIG. 37B is a simplified view in which the read-ahead cursor RAC has moved to the first indicator of the set of indicators SetX for performing a read-ahead examination. In further embodiments, the read-ahead examination may be performed only in case the set of indicators SetX fulfills a read-ahead condition, but in the present example, it will be assumed that the read-ahead examination will be performed without checking any read-ahead condition, for sake of simplicity.

In the present example, the read-ahead cursor RAC is moved from indicator to indicator to determine whether the respective indicator indicates a free block or a used block and, if a used block is indicated, the file system server is controlled to issue a request to the storage apparatus to read the data (user data and/or metadata) of the respective block and to send it to the file system server to store it in the disk interface cache memory 1243. In the example of FIG. 37B, the read-ahead cursor RAC is positioned at the first indicator of the set of indicators SetX and it is determined that the block is free.

Figure 37C:
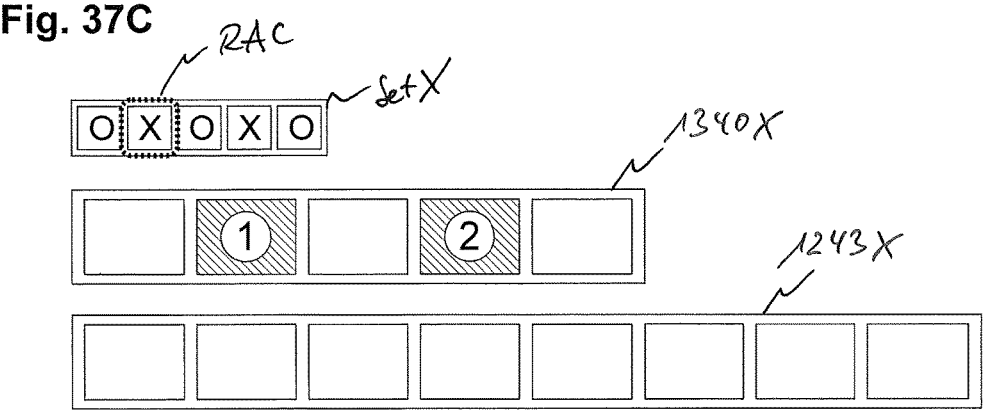

Accordingly, the read-ahead cursor RAC is moved to the next indicator as shown in FIG. 37C and it is determined that the respective block is a used block. According to the read-ahead process, the file system server is controlled to issue a request to the storage apparatus to read the user data of the respective block and to send it to the file system server for storing it to the disk interface cache memory 1243 so that, as exemplarily shown in FIG. 37D, the user data (labeled with No. 1) of the second block of the group of blocks 1340X is stored to the sector cache 1243X.

Figure 37D:
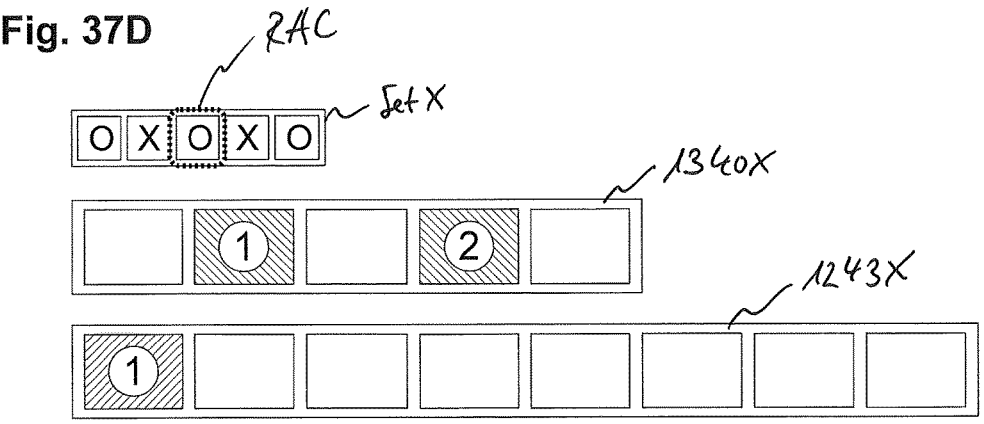
Figure 37E:
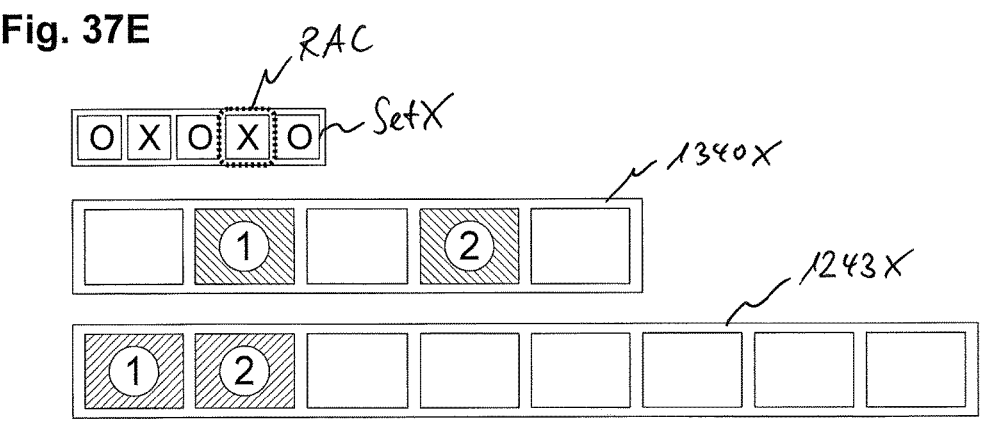

In addition, as further shown in FIG. 37D, the read-ahead cursor RAC is moved to the next indicator which indicates a free block so no read-ahead is performed, and the read-ahead cursor RAC is moved to the next indicator as shown in FIG. 37E. There, it is determined that the respective block is a used block, and according to the read-ahead process, the file system server is again controlled to issue a request to the storage apparatus to read the user data of the respective block and to send it to the file system server for storing it to the disk interface cache memory 1243 so that, as exemplarily shown in FIG. 37E, the user data (labeled with No. 2) of the fourth block of the group of blocks 1340X is stored to the sector cache 1243X.

Figure 37F:
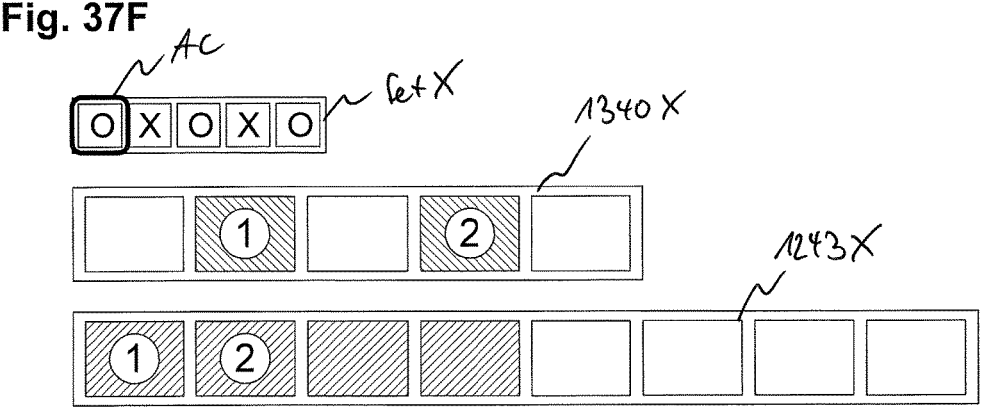
Figure 37G:
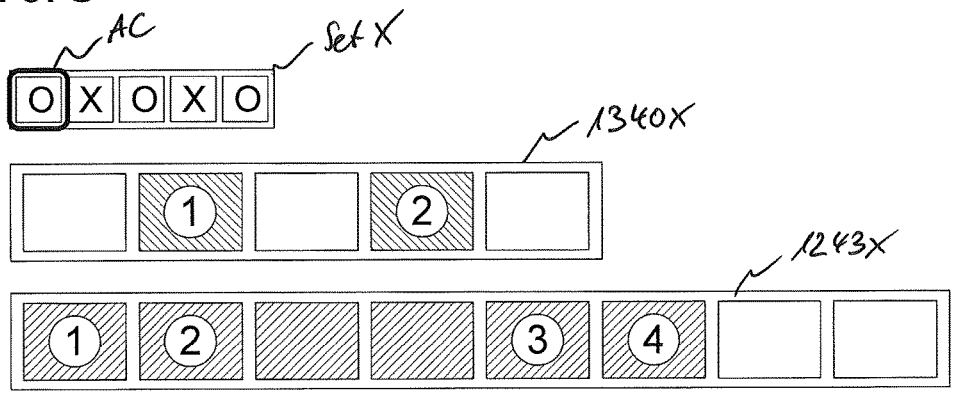

FIG. 37F shows an exemplary situation in which the read-ahead cursor RAC has moved to the next set of indicators already and the allocation cursor AC has moved, in the meantime, to the position of the first indicator in the set of indicators SetX. Also, exemplarily, two user data blocks (the two blocks right of the blocks labeled Nos. 1 and 2 in FIG. 37F) have been written to the sector cache 1243X (e.g. based on a write request including new user data of these two new data blocks), but these user data blocks have been exemplarily allocated already to earlier storage blocks being associated to indicators of an earlier set of indicators. This exemplarily illustrates that the read-ahead examination and the corresponding read-ahead operation of reading back the data blocks from the used storage blocks from the storage apparatus to the sector cache of the file system server may be way ahead of the actual allocation operation and it may occur that the ahead read data blocks may be held in sector cache for some time until they are actually needed for a flush write operation as explained further below.

Figure 37H:
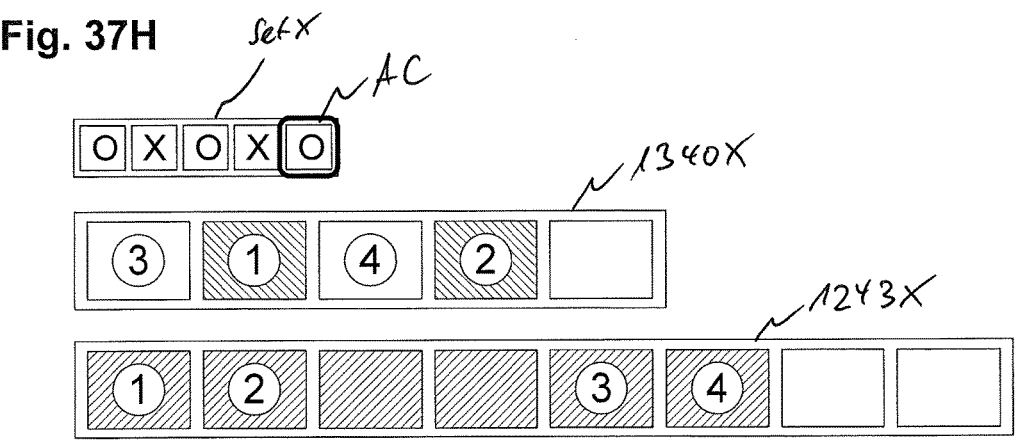
Figure 37I:
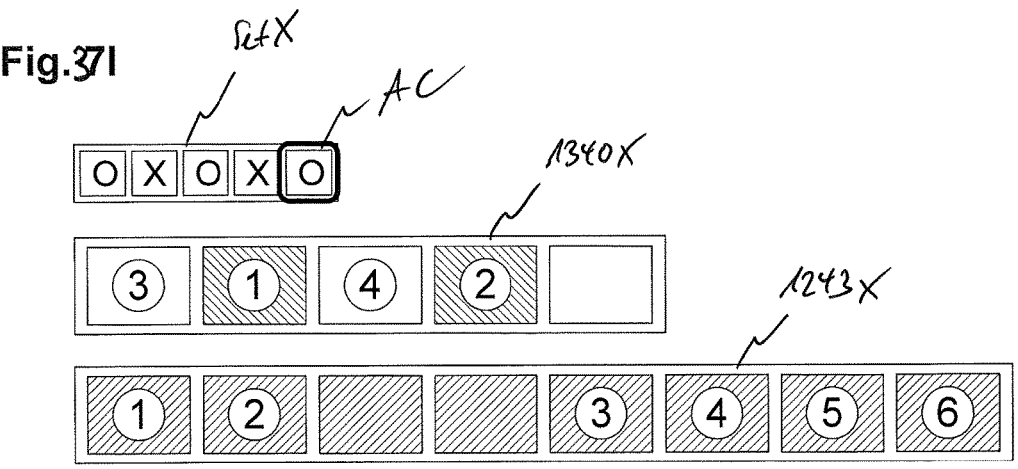

When a new write request including new user data of two new data blocks (labeled No. 3 and No. 4) are received, the new data blocks are written to the sector cache 1243X (cf. FIG. 37G) and the next two indicators of free blocks (first and third indicators of SetX) are used to allocate the first and third storage blocks of the group of blocks 1243X for the two new data blocks labeled No. 3 and No. 4 (see FIG. 37H). After allocation has been performed of the group of blocks 1243X for the two new data blocks labeled No. 3 and No. 4 (which may occur after, simultaneous or most preferably before writing the data blocks to sector cache 1243X), the allocation cursor AC is moved to the next indicator indicating a next non-allocated free block, i.e. to the fifth indicator of the set of indicators SetX in FIG. 37H.

Figure 37J:
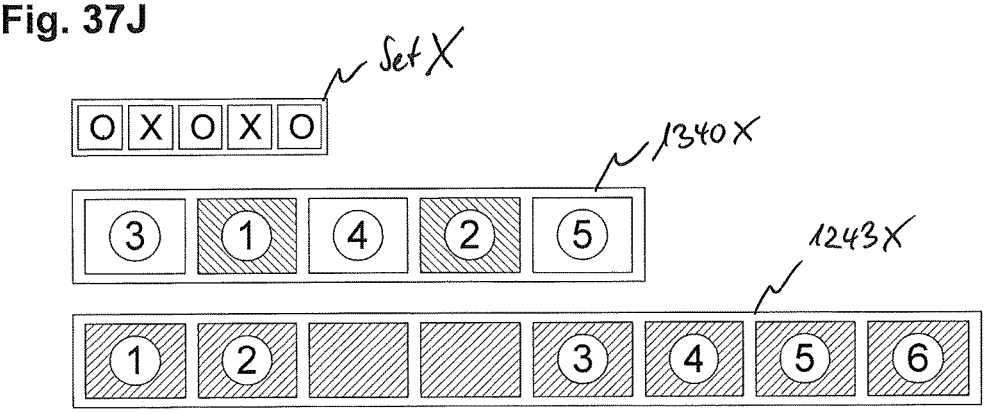

When a new write request including new user data of two new data blocks (labeled No. 5 and No. 6) are received, the new data blocks are written to the sector cache 1243X (cf. FIG. 37I) and the next two indicators of free blocks (i.e. the fifth indicator of SetX and one other indicator of one of the next sets) are used to allocate the fifth storage block of the group of blocks 1243X and another later block for the two new data blocks labeled No. 5 and No. 6 (see FIG. 37J in which the fifth block of the group 1340X is allocated for data block No. 5). After allocation has been performed of the group of blocks 1243X for the new data block labeled No. 5 (which may occur after, simultaneous or most preferably before writing the data blocks to sector cache 1243X), the allocation cursor AC is moved to the next indicator indicating a next non-allocated free block in one of the next sets outside of the shown set SetX, see FIG. 37J.

Figure 37K:
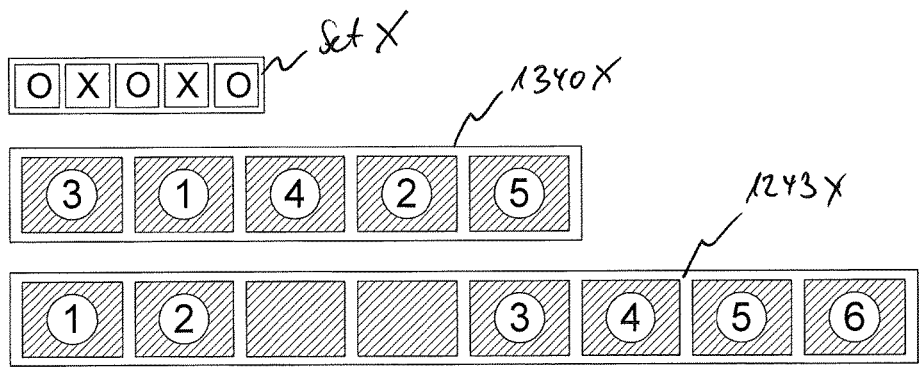
Figure 37L:
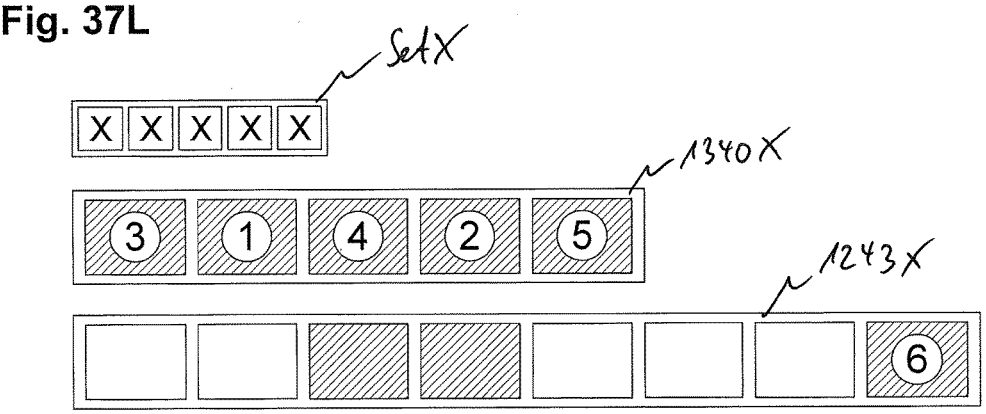

In view of the above, while FIGS. 37A to 37E were related to a read-ahead examination (observing the free space object with the read-ahead cursor ahead of the allocation cursor) and read-ahead operation (reading data from storage blocks of the storage apparatus based on the read-ahead examination, and storing the data to the disk interface cache/sector cache of the file system server), and while FIGS. 37F to 37J were related to an allocation examination (observing the free space object with the allocation cursor) and allocation operation (allocating storage blocks for storing data blocks to be written), the FIGS. 37K and 37L relate to an extended write operation that is efficiently performed based on the read-ahead examination and read-ahead operation.

Specifically, as illustrated in FIG. 37K, based on the efficient read-ahead operation as discussed exemplarily above, the data of all data blocks of Nos. 1 to 5 is held in the cache 1243X (disk interface cache/sector cache of the file system server) and instead of issuing or instructing three different (fragmented) data writes of the data of data blocks of Nos. 3, 4 and 5 to the first, third and fifth storage blocks of the group 1340X, a more efficient combined flush write operation is performed in which all data blocks No. 3, No. 1, No. 4, No. 2, and No. 5 are written contiguously to the storage blocks of group 1340X, including re-writing the data blocks of Nos. 1 and 2 to the second and fourth storage blocks of the group 1340X.

Here, the size of the set of indicators exemplarily corresponds to the number of blocks that are written in one combined flush write operation. In other embodiments, it may also correspond to an integer multiple of the number of blocks that are written in one combined flush write operation. Also, the size of the set of indicators can be selected so as to be optimized for or in accordance with characteristics or requirements of the respective storage apparatus or in accordance with a RAID configuration.

For example, in some storage apparatuses, it may be beneficial to select the size of the set of indicators in accordance with a stripe size of a RAID configuration, in order to reduce time required for parity calculations. Specifically, the size of the set of indicators may be selected such that the total storage size of all blocks that are written in one combined flush write operation corresponds to a stripe size of a RAID configuration of the RAID group to which the data is written (stripe size means user data of a RAID stripe excluding parity information), or such that the total storage size of all blocks that are written in one combined flush write operation corresponds to a integer multiple of stripe size of a RAID configuration of the RAID group to which the data is written. This has the advantage that write operations to fragmented storage areas can be handled much more efficiently by avoiding unnecessary parity calculations due to one combined flush write to a stripe size (excluding parity information) of a RAID configuration of the RAID group.

In addition, optionally the written data blocks can be removed from the cache 1243X as shown in FIG. 37L. That is, in some embodiments, the cache may be controlled to remove the read ahead data blocks when written to the storage devices of the storage apparatus e.g. upon completion of the combined flush write operation in order to increase cache memory space for new user data or for further data blocks that are read back to cache by the read-ahead operation.

On the other hand, in some embodiments in which the cache memories may be managed according to a first-in/first-out (FIFO) control (i.e. when the oldest data blocks are removed from cache upon loading new data blocks to the cache) or in even preferred embodiments in which the cache memories may be managed according to a least-recently-used (LRU) control (i.e. when the least-recently-used data blocks are removed from cache upon loading new data blocks to the cache), the data may be kept in the cache at least at first. Specifically, in least-recently-used (LRU) control of the sector cache in some embodiments, the sector cache can be managed on the LRU basis such that the written data blocks may be kept in the cache until a time at which these data blocks reach a bottom of an LRU list indicating that these blocks have been least recently used compared to the other data blocks loaded in the cache, at which point these least-recently-used data blocks may be removed from the cache when the next data blocks are loaded into the cache.

Finally, after performing the combined flush write operation, since the first, third and fifth block of group 1340X are used, the free space object is updated accordingly in the metadata cache by the file system management portion FMP, as shown exemplarily in FIG. 37L.

As becomes clear from the above, the progress of the allocation examination and the movement of the allocation cursor AC through the free space object FSO and speed thereof depends on the receipt of new user data to be written and blocks to be allocated per unit time. Specifically, as long as no further storage blocks need to be allocated, the allocation cursor AC does not move. On the other hand, when large data amounts are written by hosts, the allocation of storage blocks will progress quickly and the movement of the allocation cursor AC through the free space object FSO may be very fast. Accordingly, the movement of the allocation cursor AC cannot be controlled or predicted easily, while the movement of the read-ahead cursor and the read-ahead examination can be controlled more easily.

On the other hand, as the read-ahead examination may lead to the situation in which the sector cache 1243 is filled more and more with read-back data blocks that shall be maintained in the cache until the adjacent free block are allocated and a combined flush write operation can be performed, and especially in FIFO-managed cache, this may led to a situation in which read-back data blocks will be removed from the cache already prior to being used in a combined flush write operation, and when the adjacent blocks are thereafter allocated, a combined flush write operation may not be easily performed unless the removed data blocks are read-back again to cache. In order to avoid such situations and further improve performance, the position of the read-ahead cursor RAC can be controlled on the basis of observing the read-ahead distance of the read-ahead cursor RAC with respect to the allocation cursor AC.

Figure 38A:
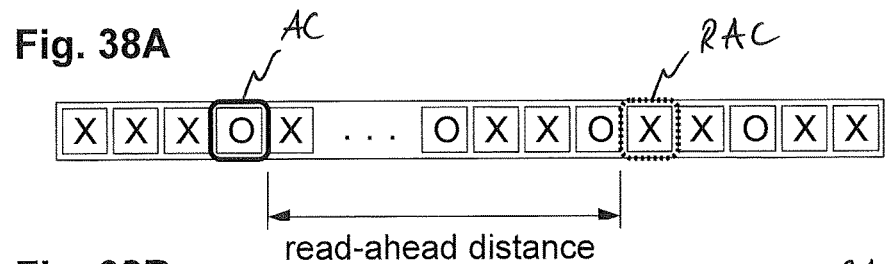
FIGS. 38A to 38G exemplarily illustrate functions of movement of an allocation cursor and a read-ahead cursor operation according to exemplary embodiments of the invention.
Figure 38B:
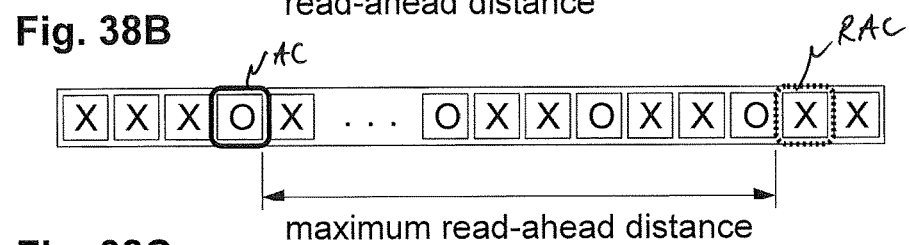

As exemplarily shown in FIG. 38A, the read-ahead distance may indicate the distance of the read-ahead cursor RAC with respect to the allocation cursor AC ahead of the allocation cursor AC. The units of the read-ahead distance may be given, for example, in numbers of indicators (or number of associated blocks), e.g. in case the read-ahead cursor RAC is a certain number of indicators (or number of associated blocks) ahead of the allocation cursor AC, or also in storage size of the number of blocks (in case the read-ahead cursor RAC is the certain number of blocks), or in storage size of the number of indicators (in case the read-ahead cursor RAC is the certain number of indicators).

For controlling the read-ahead distance, in some embodiments, there may be set a maximum read-ahead distance (see e.g. FIG. 28B) so that the movement of the read-ahead cursor RAC and the read-ahead examination is controlled based on the set maximum read distance. Such maximum read-ahead distance may be manually set by an administrator/user via the management computer 1500 by operating a GUI or inserting CLI commands. Alternatively, or in addition thereto, the maximum read-ahead distance may be automatically and dynamically adjusted on the basis of a filling status or available storage space in the sector cache 1243.

Then, e.g. if enabled via the management computer 1500 by operating a GUI or inserting CLI commands, the read-ahead examination and read-ahead operation will be performed until the read-ahead distance becomes the set (or automatically selected) maximum read-ahead distance, and the movement of the read-ahead cursor RAC and the read-ahead operation will wait for further movement of the allocation cursor AC.

Figure 38C:
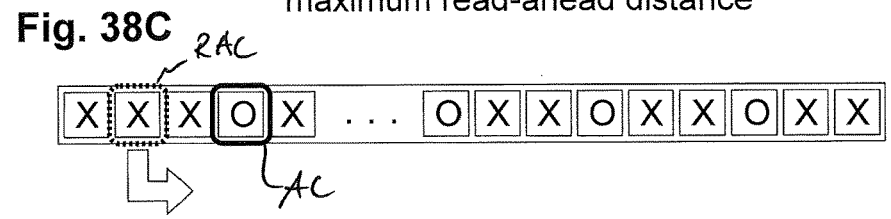

Also, it may occur that the allocation operation moves more quickly in some instances so that it may occur that the allocation cursor AC overtakes the read-ahead cursor RAC as indicated exemplarily in FIG. 38C, i.e. the read-ahead cursor RAC and the read-ahead examination/read-ahead operation may fall behind the allocation cursor AC/allocation operation.

Figure 38D:
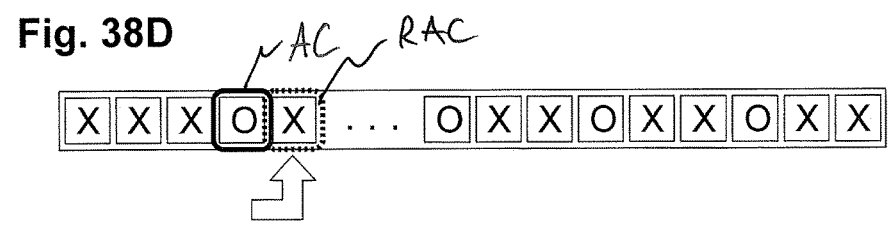

For such situations, in some embodiments, a function of resetting the read-ahead cursor RAC may be enabled (e.g. by an administrator/user via the management computer 1500 by operating a GUI or inserting CLI commands), and the read-ahead examination and the read-ahead cursor may be reset to the position of the allocation cursor (or one position ahead of the allocation cursor AC as exemplarily illustrated in FIG. 38D).

Figure 38E:
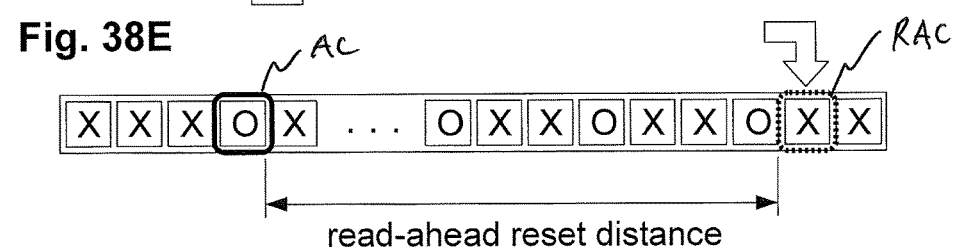

In other embodiments, the read-ahead cursor may be reset to a position ahead of the allocation cursor in accordance with a set read-ahead reset distance (as exemplarily illustrated in FIG. 38E) or to the first position of the set of indicators following the set of indicators in which the allocation cursor AC is currently positioned. Also the read-ahead reset distance may be manually set by an administrator/user via the management computer 1500 by operating a GUI or inserting CLI commands.

Figure 38F:
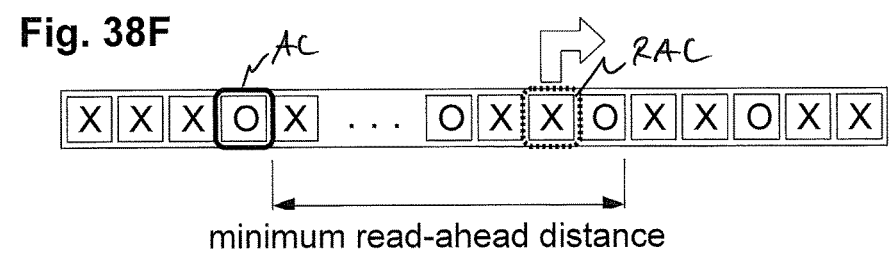
Figure 38G:
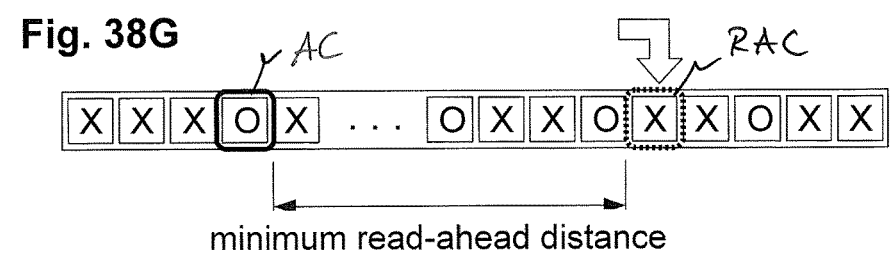

In other embodiments, the read-ahead cursor RAC may be reset, if the read-ahead distance falls below a minimum read-ahead distance as exemplarily illustrated in FIG. 38F. Here, the read-ahead cursor RAC may be reset to a position according to the minimum read-ahead distance as exemplarily illustrated in FIG. 38F, to a position ahead of the allocation cursor AC or the minimum read-ahead distance in accordance with the read-ahead reset distance, or to the first position of the set of indicators following the set of indicators in which the allocation cursor AC is currently positioned. Also the minimum read-ahead distance may be manually set by an administrator/user via the management computer 1500 by operating a GUI or inserting CLI commands.

When the read-ahead cursor is reset, an info alert may be issued, e.g. to be considered by a user, and based on the situation that it has been detected that the read-ahead cursor is reset, the target read-ahead distance, the minimum read-ahead distance and/or the maximum read-ahead distance may be changed automatically (or manually via GUI or CLI by a user upon notification of the allert), in particular for increasing automatically or manually the target read-ahead distance, the minimum read-ahead distance and/or the maximum read-ahead distance.

In the above, the free space object was discussed in a general manner. As mentioned, the free space object stores a plurality of indicators, each indicator being associated with one of a plurality of storage blocks for storing data blocks in the one or more storage apparatuses and each indicator indicating whether the associated storage block is free or used.

In some embodiments, as exemplarily shown in FIG. 39A, the free space object may be provided as a free space bitmap FSO_1 in which each indicator is provided as one bit, wherein exemplarily a bit "1" may indicate that the associated storage block is used and a bit "0" may indicate that the associated storage block is free, or vice versa.

On the other hand, it may occur that the free space object shall indicate plural states of the associated block such as "free", "used for a live file system" (i.e. referenced by a file system object of the live file system), "used for one or more snapshots" (i.e. referenced by a file system object of a snapshot of the file system at an earlier checkpoint) and "used for a live file system and for one or more snapshots" (i.e. referenced by a file system object of the live file system and referenced by a file system object of a snapshot of the file system at an earlier checkpoint). Then, such four states may be indicated in a free space bitmap FSO_2 as exemplarily shown in FIG. 39B by indicators corresponding to two bits, i.e. each indicator comprising two bits. Such indicators of a two-bit free space bitmap may indicate the four states by "00", "01", "10" and "11", wherein "00" may exemplarily indicate a free block, and "01", "10" and "11" may indicate a used block. For example, in embodiments, the four states by "00", "01", "10" and "11" may indicate "free", "used" (used by live file system), "snapshot" (used by a snapshot), and "root" (used for the root onode of a file system object).

Of course, if further states need to be indicated, the indicators may be provided such as to include more than two bits. For example, FIG. 39C shows an eight-bit (or 1 byte) free space bitmap FSO_3 in which each indicator comprises eight bits, and an indicator "00000000" may indicate a free block while the other 255 combinations of bits may indicate different states of used blocks. Also 4-bits per indicator are possible, or other numbers of bits per indicator depending the requirements. Such additional bits may be needed, for example, in file systems that are managed to avoid duplicated information (e.g. same data blocks being stored multiple times in different storage blocks) in order to indicate whether a storage block contains duplicate data.

In such file systems that are deduplicated in the in the sense of removing or at least avoiding duplicated information (e.g. same data blocks being stored multiple times in different storage blocks), a storage block can be freed to deduplicate, if the same data is stored as a duplicate already in another storage block, however prior to freeing the deduplicated block, all block pointers pointing to the to-be-freed storage block must be changed to point to the other (remaining) storage block also having the duplicate data block so that the reference count of the remaining storage block will be increased. Also, storage blocks can only be freed if the reference count becomes 0. Then, the indicators of the free space bitmap having more than two bits (e.g. 4 bits or even 8 bits per indicator) may be used to additionally indicate the reference count of a storage block (e.g. the 4 bits or 8 bits of the indictor may be used to indicate whether the storage block is free, used by the live file system and/or used by a snapshot, and to additionally indicate the reference count of the respective storage block).

Especially in case plural file systems are managed by the file system server, the file systems may be controlled differently and according to different snapshot policies, de-duplication policies etc. Then, different file systems may need different information included in the indicators. Then, in case free space bitmaps are used in embodiments, it may be preferable to provide plural free space objects of indicators of different bit size, e.g. a 2-bit-per-indicator bitmap for a first storage system, a 4-bit-per-indicator bitmap for a second storage system, and an 8-bit-per-indicator bitmap for a third storage system.

Furthermore, in addition to providing the free space object as a free space bitmap, the free space object may be provided in other forms such as e.g. in the form of a table such as free space table FSO_4 as exemplarily shown in FIG. 39D which exemplarily has four columns for indicating a storage apparatus (#SA), a storage device (disk or RAID group) in the storage apparatus (#SD), a block (#block) and the status of the block, e.g. "used" or "free".

FIG. 40 exemplarily shows a flow chart of a process of performing a read-ahead examination and a read-ahead operation according to embodiments. In a step S4001, it is checked whether the "Read-Ahead" is enabled or not.

For example, the read-ahead may be manually enabled (or disabled, when enabled) by an administrator/user via the management computer 1500 by operating a GUI or inserting CLI commands. Also, the read-ahead may be enabled (or disabled) automatically, depending on e.g. a movement speed of the allocation cursor, a filling state of the disk interface cache/sector cache, a determined ratio of flush write operations compared to regular write operations or the like. In case the file system management portion (DFP or FMP above) manages plural file systems, the read-ahead may be enabled (or disabled) globally (i.e. for all managed file systems) or on a per-filesystem basis for one or more selected file systems of the plural file systems.

If step S4001 returns NO, the process continues with step S4002 in which the read-ahead cursor RAC is only moved together with the allocation cursor AC (but no read-ahead examination and/or no read-ahead operation is performed) so as to be able to start the read-ahead examination and read-ahead operation at an appropriate position once it is enabled. Alternatively, the read-ahead cursor RAC can move synchronously with the allocation cursor AC and ahead of the allocation cursor AC at a predetermined read-ahead target distance or a minimum read-ahead distance that can be e.g. set by an administrator/user via the management computer 1500 by operating a GUI or inserting CLI commands. Further alternatively, e.g. in case a function of resetting the read-ahead cursor RAC is enabled (see e.g. FIGS. 38C to 38G and description thereof), the step S4002 can be omitted and, once read-ahead is enabled, the position of the read-ahead cursor can be automatically reset in accordance with the settings.

If step S4001 returns YES, the process continues with step S4003 in which the current indicator of the free space object FSO (as indicated by the position of the read-ahead cursor) is checked as to whether the respectively associated storage block is free or used, as part of the read-ahead examination.

In the embodiment of FIG. 40, the process then proceeds with the optional step of checking whether the current read-ahead distance (see FIG. 38A and description thereof) is smaller than the maximum read-ahead distance in step S4004, and if the step S4004 returns NO, the read-ahead examination and the movement of the read-ahead cursor RAC through the free space object waits for movement of the allocation cursor AC, and when the allocation cursor AC moves again, the read-ahead examination and the movement of the read-ahead cursor RAC moves to the next indicator in step S4005 (move together with the allocation cursor AC).

If step S4004 returns YES, the process continues with step S4006 in which the read-ahead examination and the movement of the read-ahead cursor RAC moves to the next indicator, and continues with step S4007 in which the current indicator of the free space object FSO (as indicated by the new position of the read-ahead cursor) is checked as to whether the respectively associated storage block is free or used, as part of the read-ahead examination.

In the step S4008, as part of the read-ahead examination, it is checked whether the current indicator of the free space object FSO (as indicated by the new position of the read-ahead cursor) is the last indicator of a current set of indicators of the free space object FSO, and if the step S4008 returns NO, the process continues with step S4004 again.

Otherwise, as part of the read-ahead examination, since the full set of indicators has been observed, it is checked in step S4009 whether a read-ahead condition is fulfilled. If step S4009 returns NO, no read-ahead operation may be performed for the used storage blocks of the currently observed set of indicators, and the process continues with step S4004 again (for the first indicator of the next set of indicators).

The read-ahead condition may be set by an administrator/user via the management computer 1500 by operating a GUI or inserting CLI commands. In embodiments of the invention, the read-ahead condition may be that at least one storage block of the currently observed set of indicators is indicated to be free (otherwise no blocks can be allocated within the current set, and performing read-ahead is not required for the current set) and that at least one storage block of the currently observed set of indicators is indicated to be used (otherwise, i.e. if all blocks of the observed set are indicated to be free, no blocks need to be read-ahead as all are indicated to be free).

In some embodiments, the read-ahead condition may include that the number of storage blocks of the currently observed set of indicators being indicated to be free exceeds a first threshold and/or that the number of storage blocks of the currently observed set of indicators being indicated to be used exceeds a second threshold. Then, the first and/or second thresholds may be set by an administrator/user via the management computer 1500 by operating a GUI or inserting CLI commands. Also, in some embodiments the read-ahead condition may include a condition that the currently observed set of indicators indicates that the associated blocks include at least one chain of successive free blocks above a third threshold and/or a condition that the currently observed set of indicators indicates that the associated blocks include at least one chain of successive used blocks above a fourth threshold. Then, the third and/or fourth thresholds may be set by an administrator/user via the management computer 1500 by operating a GUI or inserting CLI commands.

Regarding the combined flush write operation, it is to be noted that, in a case in which all blocks of the observed set are indicated to be free, it is possible to perform a combined flush write operation for a current set even without executing a read-ahead operation for blocks of the current set, because all storage blocks of the observed set can then be allocated to newly written data blocks, and then the newly written data blocks can be written in connection with one combined flush write operation.

Specifically, independent of the above-mentioned read-ahead condition, a combined flush write operation can be performed e.g. in case a flush write condition is fulfilled, the flush write condition being, e.g., that all data blocks, for which the consecutive storage blocks of a set have been allocated, are currently stored in the sector cache (e.g. independent of whether all data blocks represent newly written data or whether some of the data blocks represent read-ahead data blocks that have been previously read back to sector cache from the storage devices of the storage apparatus). In some embodiments, the flush write condition may be that at least a number of data blocks, for which the consecutive storage blocks corresponding to the selected "set size" have been allocated, are currently stored in the sector cache (e.g. independent of whether all data blocks represent newly written data or whether some of the data blocks represent read-ahead data blocks that have been previously read back to sector cache from the storage devices of the storage apparatus).

If the step S4009 returns YES, e.g. in case the current set of indicators indicates that at least one free block and at least one used block exist within the group of blocks associated with the indicators of the currently observed set of indicators, the process continues with a read-ahead operation in connection with the used blocks associated with indicators of the currently observed set of indicators, and the file system server 1200 issues a read request to the respective storage apparatus to read the data of the respective used blocks associated with indicators of the currently observed set of indicators in step S4010.

For example, in the exemplary embodiment of FIG. 32, since the read-ahead examination is performed by the processing unit 1231 upon the free space object stored in the metadata cache 1234, the processing unit 1231 compiles a read request for each of the respective used blocks associated with indicators of the currently observed set of indicators, or a combined read request for the respective used blocks associated with indicators of the currently observed set of indicators, and transfers the read request(s) to the disk interface portion 1240 via the fastpath 1263 or via the bus system 1270, and the processing unit 1241 of the disk interface portion 1240 stores the read request(s) to the disk interface memory 1242, and transfers the read request(s) to the respective storage apparatus via disk interface 1212.

In the exemplary embodiment of FIG. 33A, when the read-ahead examination is performed by the file system unit 1231_2A upon the free space object stored in the metadata cache 1234A, the respective file system unit 1231_2A compiles a read request for each of the respective used blocks associated with indicators of the currently observed set of indicators, or a combined read request for the respective used blocks associated with indicators of the currently observed set of indicators, and transfers the read request(s) to the data movement management unit 1231_1A which transfers the read request(s) to the disk interface unit 1241A via the fastpath 1263A. Alternatively, when the read-ahead examination is performed by the data movement management unit 1231_1A upon the free space object stored in the metadata cache 1234A, the data movement management unit 1231_1A compiles a read request for each of the respective used blocks associated with indicators of the currently observed set of indicators, or a combined read request for the respective used blocks associated with indicators of the currently observed set of indicators, and transfers the read request(s) to the disk interface unit 1241A via the fastpath 1263A. disk interface unit 1241A stores the read request(s) to the disk interface memory 1242A, and transfers the read request(s) to the respective storage apparatus via disk interface 1212A.

In the exemplary embodiment of FIG. 33B, when the read-ahead examination is performed by one of the processing units 1231B upon the free space object stored in the metadata cache 1234B, the respective processing unit 1231B compiles a read request for each of the respective used blocks associated with indicators of the currently observed set of indicators, or a combined read request for the respective used blocks associated with indicators of the currently observed set of indicators, and the same processing unit 1231B transfers the read request(s) to the disk interface unit 1240B via the fastpath 1263B. Alternatively, the respective processing unit 1231B stores the read request(s) to the memory 1232_1B, and another processing unit 1231B reads the read request(s) from the memory 1232_1B and transfers the read request(s) to the disk interface module 1240B via the fastpath 1263B.

In yet another embodiment, the processing unit 1251_2B of the management module 1250B processes the free space object stored in the metadata cache 1234B and the read-ahead examination is performed by the processing unit 1251_2B upon the free space object stored in the metadata cache 1234B, the processing unit 1251_2B may transfer the compile the read request(s) and transfer the read request(s) directly via the communication path 1272B (or indirectly via the communication path 1276B), to the disk interface module 1240B.

One of the processing units 1241B of the disk interface module 1240B stores the read request(s) to the disk interface memory 1242_1B, and transfers the read request(s) to the respective storage apparatus via disk interface 1212B.

Regarding step S4010, in some embodiments, the issuance of read requests may be executed also in a combined simultaneous read request that contiguously/simultaneously issues a single read request addressed to plural data blocks in plural storage blocks to enhance read performance, e.g. reading a concurrent set of blocks with one read request (even if one or more of the read-ahead blocks may not be actually required for the read-ahead).

Also, to further enhance read performance, plural read request (typically only to one file system) may be issued in a combined read burst, a so-called sim-read. The number of read requests that are combined in a sim-read may be limited by a maximum number "sim-read max" which indicates a maximum numbers of read requests to be aggregated into a single sim-read operation. The parameter "sim-read max" may be set by an administrator/user via the management computer 1500 by operating a GUI or inserting CLI commands.

In the next step S4011, the file system server receives the data of the used blocks of the current set in accordance with the issued read request(s) and stores the read-back data in the disk interface cache (sector cache). Specifically, in exemplary embodiments, the disk interface units/modules (or processing units thereof) receive the read-back data via the disk interfaces 1212, 1212A or 1212B and store the read-back data in the disk interface cache memory 1243, 1243A or 1243B.

Figure 41A:
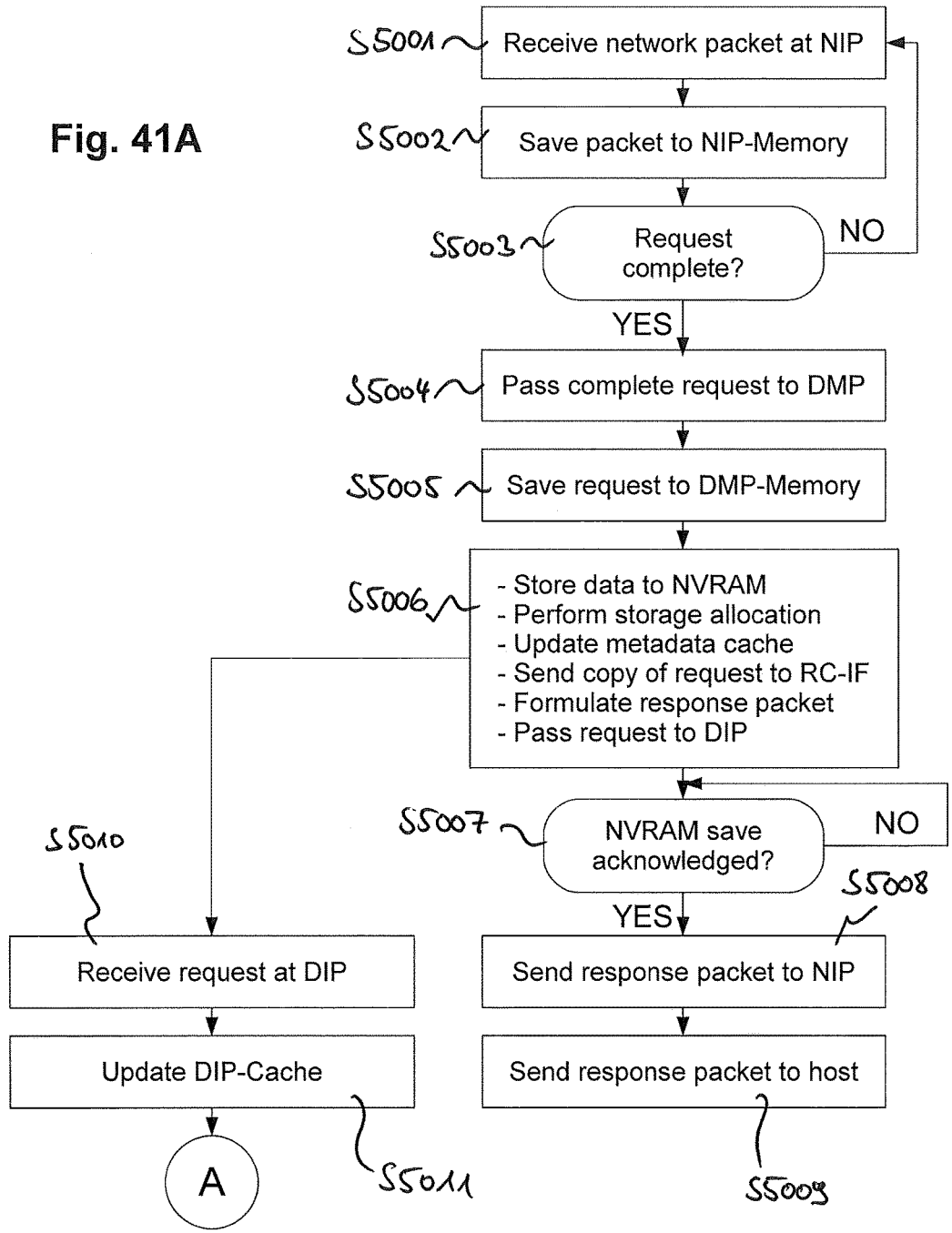
FIGS. 41A and 41B exemplarily show a flow chart of a process of performing a write operation according to exemplary embodiments of the invention.
Figure 41B:
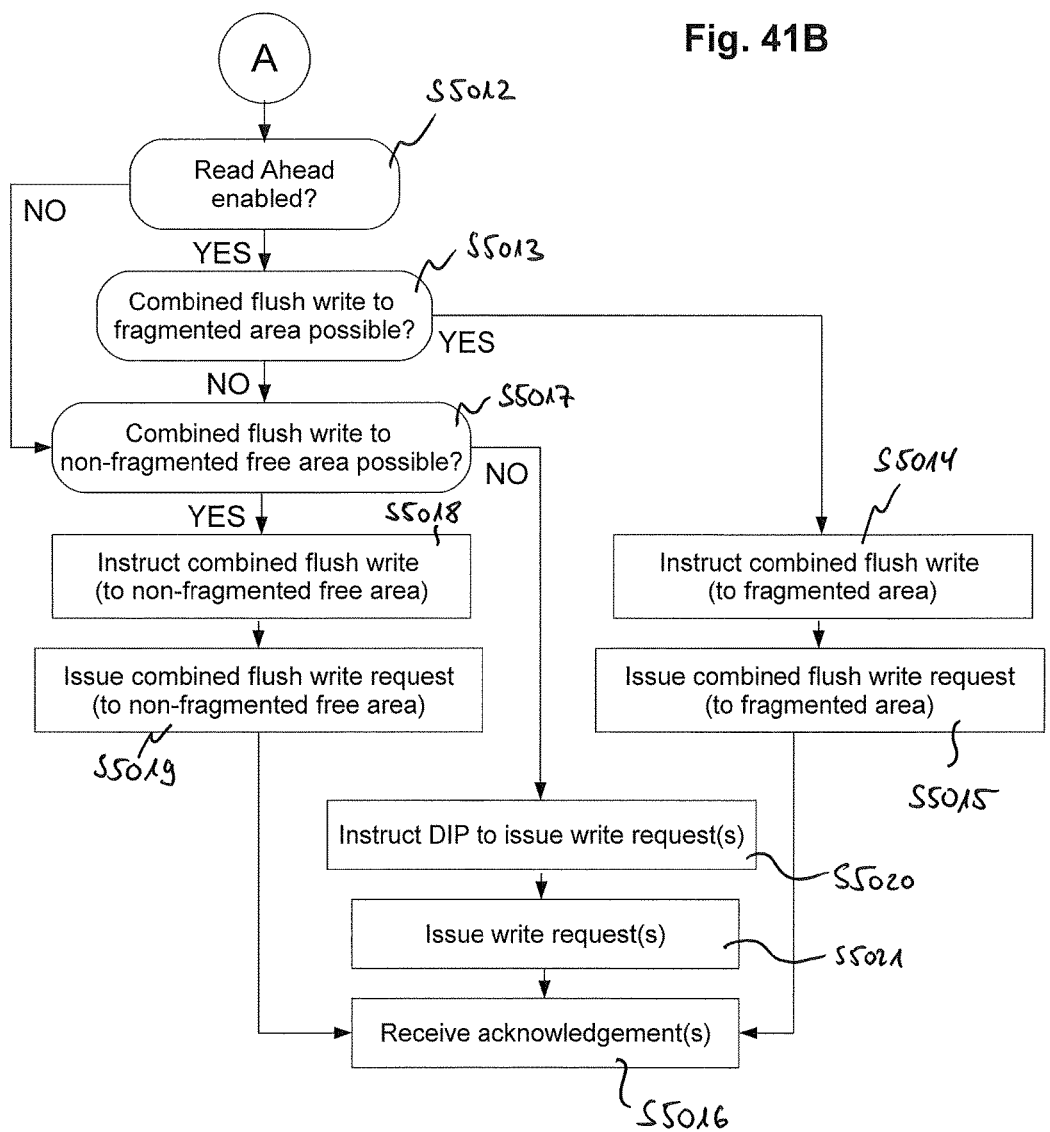

FIGS. 41A and 41B exemplarily show a flow chart of a process of performing a write operation of new user data according to embodiments.

In a step S5001, the file system server receives a data packet of a write request via the network interface at the network interface portion. Specifically, in the exemplary embodiment of FIG. 32, the data packet is received via the network interface 1211 at the network interface portion 1220. In the exemplary embodiment of FIG. 33A, the data packet is received via the network interface 1211A at the network interface unit 1221A and, in the exemplary embodiment of FIG. 33B, the data packet is received via the network interface 1211B at the network interface module 1220B.

In step S5002, the received data packet is stored to the network interface memory of the network interface portion. Specifically, in the exemplary embodiment of FIG. 32, the processing unit 1221 stores the received data packet in the network interface memory 1222. In the exemplary embodiment of FIG. 33A, the network interface unit 1221A stores the received data packet in the network interface memory 1222A and, in the exemplary embodiment of FIG. 33B, the one of the processing units 1212B of the network interface module 1221B stores the received data packet in the network interface memory 1222_1B.

Then, it is checked in step S5003 whether the write request is complete (i.e. the complete header information is received and all associated user data packets have been received). If the step S5003 returns NO, the process goes to step S5001 again to receive the next packet of the write request.

If the request is complete and all packets have been received and stored to network interface memory (step S5003 returns YES), the complete request is transferred to the data movement management portion (DFP, specifically DMP) via a fastpath communication connection (Step S5004), and the received packet is stored to the memory of the data movement management portion (DFP-memory, specifically DMP-memory).

Specifically, in the exemplary embodiment of FIG. 32, the processing unit 1221 transfers the complete request via the connection 1261 (fastpath) to the data movement and file system management unit 1230 and the processing unit 1231 stores the request to the memory 1232. In addition, the processing unit 1231 may decode the request based on header information included in the request. In the exemplary embodiment of FIG. 33A, the network interface unit 1221A transfers the complete request via the connection 1261A (fastpath) to the data movement management unit 1230_1A which stores the request to the memory 1232A. In addition, the header information of the quest may be transferred to the management unit 1202A for decoding the request based on the header information included in the request. In the exemplary embodiment of FIG. 333B, one of the processing units 1221B transfers the complete request via the connection 1261B (fastpath) to the module 1230B and one of the processing units 1231B stores the request to the memory 1232_1B. In addition, the processing unit 1231B may decode the request based on header information included in the request.

Next, in step S5006 multiple operations are performed in sequence (in any order or in the below order) or in parallel: The user data of the write request is stored to the non-volatile memory such as an NVRAM, e.g. non-volatile memory 1233, non-volatile memory 1233A or non-volatile memory 1233B. In addition, the file system management portion (e.g. the processing unit 1231 in FIG. 32, the file system unit 1231_2A in FIG. 33A or one of the processing units 1231B in FIG. 33B) performs an allocation operation based on the allocation examination free space object and the allocation cursor movement as discussed above, and metadata stored in the metadata cache is updated (including updating metadata of file system objects corresponding to the new user data, e.g. of modified files, newly created file or newly created directories etc., and including updating of the free space object). In addition, a response packet may optionally be formulated already e.g. by the processing unit 1231 in FIG. 32, the file system unit 1231_1A in FIG. 33A or one of the processing units 1231B in FIG. 33B. Also, the request is transferred to the disk interface portion e.g. by the processing unit 1231 via the communication connection 1263 (fastpath) in FIG. 32, by the unit 1231_1A via the communication connection 1263A (fastpath) in FIG. 33A or by one of the processing units 1231B via the communication connection 1263B (fastpath) in FIG. 33B. Further (optionally), a copy of the write request is transferred to the remote site via the interface 1214, 1214A or 1214B in FIG. 32, 33A or 33B, respectively.

In step S5007, it is checked whether the full write request has been written to non-volatile memory already, i.e. whether the writing of the complete write request to non-volatile memory is acknowledged yet, wherein if the step returns NO, the process waits and if the step returns YES, the process continues with transferring the response packet to the disk interface portion (where it may be stored in memory) in step S5008 and transferring the response packet to the host via the network interface in step S5009. This has the advantage that the response time is quick and the process does not need to wait until the data is actually written to disk on the storage apparatus. In addition to the condition of step S5008 above, the condition may additionally wait for the acknowledgement from the disk interface portion upon step S5010 below.

In parallel with (or independent of) step S5007, the process also continues with step S5010 after step S5006 and the write request is received at the disk interface portion (and potentially acknowledged back by the disk interface portion). The user data of the write request is written to the disk interface cache/sector cache of the disk interface portion, e.g. by processing unit 1241 in FIG. 32, by the disk interface unit 1241A in FIG. 33A or by one of the processing units 1241B in FIG. 33B.

In the step S5012 it is checked whether the read-ahead function is enabled or not, and if the step S5012 returns YES, the method continues with step S5013 in which it is checked whether a combined flush write to a fragmented area (i.e. a storage range including free storage blocks and used storage blocks) is possible (i.e. whether all data blocks of a corresponding set of indicators/blocks are stored in the sector cache, e.g. due to the read-ahead operation of FIG. 40; flush write condition fulfilled), and if step S5013 returns NO (e.g. because some read-back data blocks have been removed from sector cache in the meantime e.g. by LRU or FIFO cache control as mentioned above; flush write condition not fulfilled), the process continues with step S5017. It is to be noted that step S5013 returning NO may be used as a trigger to automatically lower the set maximum read-ahead distance.

Otherwise, if step S5013 returns YES, a combined flush write operation to the fragmented area (comprising used and free storage blocks) is instructed in step S5014 (e.g. by the processing unit 1231 in FIG. 32, the data movement unit 1231_1A in FIG. 33A or one of the processing units 1231B in FIG. 33B, e.g. immediately, at regular intervals or in case the available storage capacity of the non-volatile memory falls below a threshold) for contiguously writing all data blocks of the related set to the respective allocated storage blocks, including re-writing the data blocks that have been previously read back to the sector cache in the read-ahead operation and writing the new data blocks of new data (new user data and/or metadata) so as to contiguously write concurrent data blocks to the fragmented area.

In step S5015, the disk interface portion/disk interface unit issues the combined flush write instruction to the respective storage apparatus via the disk interface (this allows to aggregate large I/O operations to disk in order to maximize the throughput to storage) so that the respective storage apparatus will execute the combined flush write operation to the fragmented area, and the acknowledgement of the combined flush write operation is received at the disk interface portion of the file system server in step S5016.

As mentioned above, if the step S5013 returns NO, the method continues with step S5017 in which it is checked whether a combined flush write to a non-fragmented area (i.e. a storage range including only free storage blocks) is possible (i.e. whether all data blocks of a corresponding set of indicators/blocks are stored in the sector cache, e.g. due to allocation of all free storage blocks of the range/set for new user data and/or new metadata; flush write condition fulfilled), and if step S5017 returns NO (flush write condition not fulfilled), the process continues with step S5020.

Otherwise, if step S5017 returns YES, a combined flush write operation to the non-fragmented area (consisting of only free storage blocks) is instructed in step S5018 (e.g. by processing unit 1231 in FIG. 32, the data movement unit 1231_1A in FIG. 33A or one of the processing units 1231B in FIG. 33B, e.g. immediately, at regular intervals or in case the available storage capacity of the non-volatile memory falls below a threshold) for contiguously writing all data blocks of the related set to the respective allocated storage blocks, including only writing the new data blocks of new data (new user data and/or metadata) so as to contiguously write concurrent data blocks to the non-fragmented area.

In step S5019, the disk interface portion/disk interface unit issues the combined flush write instruction to the respective storage apparatus via the disk interface (this allows to aggregate large I/O operations to disk in order to maximize the throughput to storage) so that the respective storage apparatus will execute the combined flush write operation to the non-fragmented area, and the acknowledgement of the combined flush write operation is received at the disk interface portion of the file system server in step S5016.

On the other hand, if step S5017 returns NO, the data movement management portion (e.g. processing unit 1231 in FIG. 32, the data movement unit 1231_1A in FIG. 33A or one of the processing units 1231B in FIG. 33B) instructs the disk interface portion/disk interface unit to perform the regular write operation (e.g. immediately, at regular intervals or in case the available storage capacity of the non-volatile memory falls below a threshold), wherein the write request(s) is/are then issued to the respective storage apparatus via the disk interface of the file system server in step S5021, and the acknowledgement(s) is/are received via the disk interface at step S5016. Here, even if the read-ahead is enabled but a combined flush write operation is not possible, the write requests of step S5021 are corresponding to fragmented writes at regular performance.

In the above, it is to be noted that in some embodiments, the step S5012 can be omitted, and steps S5013 and S5014 can be executed as one step in which, independent of the read-ahead operation and independent of whether read-ahead is enabled or not, it is checked whether a flush write condition is fulfilled or not (e.g. whether all data blocks of a set of storage blocks of a set flush write size, independent of whether they are free or used, are held in sector cache so that a combined flush write operation can be instructed), in order to instruct the flush write operation in a step that represents S5018 and S5014 in one step, if the step S5013/S5014 returns YES, and to issue the combined flush write request in a step that represents S5019 and S5015.

Such mechanism is independent of the output of step S5013 (which can be omitted in some embodiments), but with read-ahead enabled in the background, the likelihood for a given storage area (to be written to) that an efficient flush write operation is possible is significantly increased, and the ratio of efficient flush write operation over regular write operations can become very high (even advantageously up to 100%).

According to exemplary aspects and embodiments of the present invention, by providing the exemplary functions of background read-ahead examination, read-ahead operation and/or combined flush write operations as described in various modifications and implementations above, significant improvements in write performance efficiency and reliability become possible, while the additional burden by the potential additional read-ahead of data from the storage apparatus can be handled easily due to the easy handling of read operation compared to write operations so that the efficiency improvement of the high possible ratio of efficient flush write operation over regular write operations can become very high (even advantageously up to 100%) clearly outperform the additional I/O processing of the read-ahead operations.

In some embodiments, the management portion, especially the memory of the management portion of the file system server (e.g. memory 1252 in FIG. 32, memory 1252A in FIG. 33A, and memory 1252_2B in FIG. 33B) may store one or more registers for storing settings of the read-ahead operation that may be accessed, set and adjusted (also and especially during an operation of the file system server, in which one or more file systems are managed live, i.e. accessible for I/O operations) by an administrator/user via the management computer 1500 by means of a Graphical User Interface (GUI) or Command Line Interface (CLI). Such settings may comprise:

enable/disable read-ahead (globally or per-filesystem): the register then may store the setting whether read-ahead is enabled/disabled globally or per file system in case of plural file systems set parameters for the control of the read-ahead distance: including setting one or more of the minimum read-ahead distance, the target read-ahead distance, and the maximum read-ahead distance; may be set globally or per file system; the register stores the set parameters globally or per file system in case of plural file systems enable/disable "reset" of the read-ahead cursor: the register may then may store the setting whether "reset" is enabled/disabled globally or per file system in case of plural file systems, in addition the rest distance may be set set "sim-read max" (maximum number of concurrently issued sim-read request/inquiry combined in one sim-read), may be globally or per file system; the register then stores the maximum value "sim-read max" globally or per file system in case of plural file systems enable/disable read-ahead condition, may be globally or per file system, the register then may store the setting whether the read-ahead condition is enabled/disabled globally or per file system in case of plural file systems; in addition, the type of condition or parameters thereof may be set, e.g. by setting the first, second, third and/or fourth threshold mentioned above setting the size of a combined flush write operation, may be globally or per file system, the register then stores the respective size (in units of blocks or storage amount) globally or per file system in case of plural file systems the register may also store, per file system, the type of free space object, and in case of a free space bitmap, the register may indicate the number of bits per indicator (preferably per file system, but also possible globally, e.g. if all file systems are managed similarly)

In view of the above, it is to be noted that embodiments of the present invention aim at providing one or more functions to improve the write performance of the data storage system and the data throughput of the file system server, especially when using storage systems that may have a significant differentiation in write performance between smaller fragmented writes and larger contiguous writes.

In some embodiments, the functions include an additional read-ahead examination of the free space object to be performed ahead of the allocation examination, e.g. by providing an additional read-ahead cursor for the read-ahead examination being moved ahead of the allocation cursor position, and to execute a read-ahead operation (user data reads to be issued) on relevant locations in the file system(s), e.g. when the related areas of the free space object being examined in the read-ahead examination are indicated to have fragmented space.

This helps to load the disk interface cache/sector cache and allow to provide a high ratio of contiguous writes (flush write operation) with respect to regular smaller fragmented writes (i.e. when user data is written successively and separately to fragmented areas of the file system).

The newly implemented read-ahead cursor in exemplary embodiments of the invention allows to indicate the next location of any possible user data read-aheads in the file system to be issued, and the read-ahead cursor preferably sits in front of the allocation cursor. For example, it may be controlled how far the read-ahead cursor sits in front of the allocation cursor by setting parameters such as a target read-ahead distance, a maximum read-ahead distance and/or a minimum read-ahead distance (globally, i.e. for all file systems, or on a per-filesystem basis).

Before issuing any userdata inquiries, in exemplary embodiments, the free space object can be examined ahead of the allocation examination to understand whether the free space fragmentation at the observed area of the file system indicates that the system may benefit from reading ahead the userdata, e.g. by checking whether a read-ahead condition is fulfilled. For example, it may be checked in an observed area whether any read-ahead may be required by checking whether there is at least free allocation (free block) and one non-free allocation (non-free block).

It should be noted that headings are used above for convenience and readability of the detailed description and are not to be construed as limiting the present invention in any way.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A computer program product comprising computer-readable program instructions which, when running on or loaded into a file system server or computer connected to the file system server or when being executed by one or more processors or processing units of the file system server or the computer, cause the file system server to execute a method for controlling write operations in a data storage system comprising one or more storage apparatuses and the file system server connected to the one or more storage apparatuses and to one or more host computers, the method comprising:
- providing a free space object which stores a plurality of indicators, each indicator being associated with one of a plurality of storage units for storing data units in the one or more storage apparatuses and each indicator indicating whether the associated storage unit is free or used,
- executing a read-ahead examination which comprises examining a set of indicators of the free space object for identifying one or more used storage units associated with indicators of the set, in particular for observing a fragmentation status of the storage units associated with the indicators of the set,
- executing an allocation examination which comprises examining one or more indicators of the set of the free space map object for identifying one or more free storage units to be allocated upon receiving one or more write instructions from one of the one or more host computers at the file system server, and
- controlling one or more write operations to the one or more storage apparatuses on the basis of the read-ahead examination and the allocation examination.

2. The computer program product according to claim 1, further comprising:
- executing a read-ahead operation which comprises:
- reading, from the one or more storage apparatuses, one or more data units stored in used storage units being associated with indicators of the set based on the read-ahead examination, and
- storing the read data units in a memory of the file system server.

3. The computer program product according to claim 2, wherein controlling one or more write operations comprises:
- storing write data units to the memory of the file system server based on the one or more received write instructions,
- executing an allocation operation comprising allocating, for each of the stored write data units, one of the one or more free storage units being associated with indicators of the set based on the allocation examination, and
- executing a combined flush write operation of contiguously writing to all storage units associated with indicators of the set including writing the write data units from the file system server to the thereto allocated free storage units and re-writing the read data units from the file system server to the thereto allocated used storage units.

4. The computer program product according to claim 1, wherein
- executing the read-ahead examination further comprises determining whether a read-ahead condition is fulfilled for the examined set of indicators, in particular based on the observed fragmentation status of the storage units associated with the indicators of the set, and,
- if the read-ahead condition is fulfilled for the examined set of indicators, the method further comprises executing a read-ahead operation which comprises:
- reading, from the one or more storage apparatuses, one or more data units stored in used storage units being associated with indicators of the set based on the read-ahead examination, and
- storing the read data units to the memory of the file system server.

5. The computer program product according to claim 2, wherein
- reading, from the one or more storage apparatuses, one or more data units stored in used storage units comprises executing a combined read-ahead operation of contiguously reading data units of a plurality of storage units and/or concurrently issuing a plurality of read instructions to the one or more storage apparatuses.

6. The computer program product according to claim 5, wherein
- a number of data units being read in the combined read-ahead operation is controlled based on at least one of a target read number parameter, a minimum read number parameter, and a maximum read number parameter, and/or
- a number of concurrently issued read instructions is controlled based on at least one of a target read request number parameter, a minimum read request number parameter, and a maximum read request number parameter.

7. The computer program product according to claim 4, wherein
- controlling one or more write operations comprises:
- storing write data units to the memory of the file system server based on the one or more received write instructions,
- executing an allocation operation comprising allocating, for each of the stored write data units, one of the one or more free storage units being associated with indicators of the set based on the allocation examination,
- checking whether a flush write condition is fulfilled, the flush write condition being that all data units associated with storage units being associated with indicators of the examined set are stored in the memory of the file system server, and
- executing, if the flush write condition is fulfilled for the examined set of indicators, a combined flush write operation of contiguously writing to all storage units associated with indicators of the set including writing the write data units from the file system server to the thereto allocated free storage units and re-writing the read data units from the file system server to the thereto allocated used storage units, or
- executing, if the flush write condition is not fulfilled for the examined set of indicators, a write operation of writing the write data units from the file system server to the thereto allocated free storage units.

8. The computer program product according to claim 7, wherein,
- if the flush write condition is not fulfilled for the examined set of indicators and all indicators of the set indicate a free storage unit, the write operation is a combined flush write operation of contiguously writing to all storage units associated with indicators of the set.

9. The computer program product according to claim 4, wherein
- the read-ahead condition for the examined set of indicators comprises at least one of:
- the number of indicators of the set indicating a free storage unit is equal to or larger than a first threshold, the first threshold being one or more,
- the number of indicators of the set indicating a used storage unit is equal to or larger than a second threshold, the second threshold being one or more, the set of indicators comprises a chain of successive indicators indicating free storage units having a length being equal to or larger than a third threshold, the third threshold being two or more, and the set of indicators comprises a chain of successive indicators indicating used storage units having a length being equal to or larger than a fourth threshold, the fourth threshold being two or more.

10. The computer program product according to claim 1, wherein the free space object comprises at least one of:
a free space table, each row or column of the free space table represents one of the indicators, and
a free space bitmap, each indicator being represented by one bit or each indicator being represented by a set of two or more bits.

11. The computer program product according to claim 1, further comprising:

providing an allocation cursor indicating a position of the allocation examination in the free space object,
providing a read-ahead cursor indicating a position of the read-ahead examination in the free space object, and
controlling the read-ahead cursor so as to be positioned ahead of the allocation cursor in the free space object.

12. The computer program product according to claim 11, wherein controlling the read-ahead cursor to be positioned ahead of the allocation cursor comprises:
controlling a distance between the read-ahead cursor and the allocation cursor in the free space object based on a target distance parameter,
controlling a distance between the read-ahead cursor and the allocation cursor in the free space object based on a minimum distance parameter, and/or
controlling a distance between the read-ahead cursor and the allocation cursor in the free space object based on a maximum distance parameter.

13. The computer program product according to claim 12, further comprising setting the target distance parameter, the minimum distance parameter and/or the maximum distance parameter on the basis of at least one of a total storage capacity of the memory, a total amount of available storage space of the memory and a filling ratio of the memory.

14. The computer program product according to claim 11, wherein controlling the read-ahead cursor to be positioned ahead of the allocation cursor comprises:
detecting whether the read-ahead cursor is positioned ahead of the allocation cursor, and
resetting, if it is determined that the read-ahead cursor is not positioned ahead of the allocation cursor, the position of the read-ahead cursor to the position of the allocation cursor or to a position ahead of the allocation cursor.

15. The computer program product according to claim 11, wherein the method further comprises enabling the execution of the read-ahead examination and/or disabling the execution of the read-ahead examination, and, when execution of the read-ahead examination is disabled, the read-ahead cursor is moved through the free space object together with the movement of the allocation cursor.

16. The computer program product according to claim 1, further comprising: setting a size of the set of indicators.

17. A method for controlling write operations in a data storage system comprising one or more storage apparatuses and a file system server connected to the one or more storage apparatuses and to one or more host computers, the method comprising:

providing a free space object which stores a plurality of indicators, each indicator being associated with one of a plurality of storage units for storing data units in the one or more storage apparatuses and each indicator indicating whether the associated storage unit is free or used,
executing a read-ahead examination which comprises examining a set of indicators of the free space object for identifying one or more used storage units associated with indicators of the set, in particular for observing a fragmentation status of the storage units associated with the indicators of the set,
executing an allocation examination which comprises examining one or more indicators of the set of the free space map object for identifying one or more free storage units to be allocated upon receiving one or more write instructions from one of the one or more host computers at the file system server, and
controlling one or more write operations to the one or more storage apparatuses on the basis of the read-ahead examination and the allocation examination.

18. An apparatus, in particular a file system server, being connectable to one or more storage apparatuses and to one or more host computers, the apparatus being adapted for use in a data storage system comprising the one or more storage apparatuses and the apparatus connected to the one or more storage apparatuses and to the one or more host computers, the apparatus comprising:

a memory storing a free space object which stores a plurality of indicators, each indicator being associated with one of a plurality of storage units for storing data units in the one or more storage apparatuses and each indicator indicating whether the associated storage unit is free or used, and
a controller adapted to control one or more write operations to the one or more storage apparatuses,
wherein the controller is adapted to:
execute a read-ahead examination which comprises examining a set of indicators of the free space object for identifying one or more used storage units associated with indicators of the set, in particular for observing a fragmentation status of the storage units associated with the indicators of the set, and
executing an allocation examination which comprises examining one or more indicators of the set of the free space map object for identifying one or more free storage units to be allocated upon receiving one or more write instructions from one of the one or more host computers at the file system server,
so as to control the one or more write operations to the one or more storage apparatuses on the basis of the read-ahead examination and the allocation examination.

19. A data storage system comprising:
one or more storage apparatuses, and
an apparatus according to claim 18 being connected to the one or more storage apparatuses and being connectable to one or more host computers.

* * * * *